(12) United States Patent
Lawrence

(10) Patent No.: US 11,836,688 B1
(45) Date of Patent: Dec. 5, 2023

(54) METHOD AND APPARATUS TO TOKENIZE NATURAL RESOURCES

(71) Applicant: Mark Lawrence, Monrovia, CA (US)

(72) Inventor: Mark Lawrence, Monrovia, CA (US)

( * ) Notice: Subject to any disclaimer, the term of this patent is extended or adjusted under 35 U.S.C. 154(b) by 240 days.

(21) Appl. No.: 17/386,538

(22) Filed: Jul. 28, 2021

Related U.S. Application Data

(60) Provisional application No. 63/060,672, filed on Aug. 4, 2020.

(51) Int. Cl.
| | |
|---|---|
| *G06Q 10/00* | (2023.01) |
| *G06Q 20/06* | (2012.01) |
| *G06Q 10/087* | (2023.01) |
| *G06Q 10/0835* | (2023.01) |
| *H04L 9/08* | (2006.01) |
| *G06F 21/60* | (2013.01) |
| *H04L 9/30* | (2006.01) |
| *G06F 21/31* | (2013.01) |

(52) U.S. Cl.
CPC ........... *G06Q 20/065* (2013.01); *G06F 21/31* (2013.01); *G06F 21/606* (2013.01); *G06Q 10/087* (2013.01); *G06Q 10/08355* (2013.01); *H04L 9/0861* (2013.01); *H04L 9/30* (2013.01)

(58) Field of Classification Search
CPC . G06Q 20/065; G06Q 10/08355; G06F 21/31
USPC ....................................................... 705/7.12
See application file for complete search history.

(56) References Cited

U.S. PATENT DOCUMENTS

| | | | |
|---|---|---|---|
| 4,670,848 A | 6/1987 | Schramm | |
| 6,418,420 B1 | 7/2002 | DiGiorgio et al. | |
| 6,871,137 B2 | 3/2005 | Scaer et al. | |
| 7,213,750 B1 | 5/2007 | Barnes et al. | |
| 7,590,937 B2 | 9/2009 | Jacobus et al. | |
| 8,156,090 B1 | 4/2012 | Curles | |
| 8,271,545 B2 | 9/2012 | Butcher et al. | |
| 8,326,715 B2 | 12/2012 | Feuser et al. | |
| 8,346,682 B2 | 1/2013 | Steed, II et al. | |
| 8,374,354 B2 | 2/2013 | Berggren | |
| 10,022,613 B2 | 7/2018 | Tran et al. | |
| 10,044,756 B2 | 8/2018 | Overby, Jr. et al. | |
| 10,716,747 B2 | 7/2020 | Lehman | |
| 2007/0244780 A1* | 10/2007 | Liu ........................ | G06Q 40/06 705/35 |
| 2007/0288392 A1 | 12/2007 | Peng et al. | |
| 2008/0195433 A1 | 8/2008 | Glenn et al. | |
| 2009/0254474 A1 | 10/2009 | Gladstone | |
| 2015/0170112 A1 | 6/2015 | DeCastro | |

(Continued)

FOREIGN PATENT DOCUMENTS

| | | |
|---|---|---|
| WO | 2019036804 | 2/2019 |

OTHER PUBLICATIONS

U.S. Appl. No. 15/268,591, filed Aug. 10, 2021, Mark Lawrence.
Deloitte Tracking the Trends Global Mining Study.

*Primary Examiner* — Rokib Masud

(57) ABSTRACT

The invention teaches a value exchange for natural resources that is transparent and assured by a layer of distributed trust where tokenized inventory collateralizes derivative products, which enables the inventory to be monetized while located anywhere in the world including in major buying hubs, whereby suppliers, buyers and market makers can execute and settle authenticated transactions, both outright sales and derivative transactions, for natural resources in near real time.

20 Claims, 20 Drawing Sheets

(56) References Cited

U.S. PATENT DOCUMENTS

| | | |
|---|---|---|
| 2017/0098291 A1 | 4/2017 | Code et al. |
| 2017/0140408 A1* | 5/2017 | Wuehler ............ G06Q 30/0207 |
| 2018/0005186 A1 | 1/2018 | Hunn |
| 2018/0089758 A1 | 3/2018 | Stradling et al. |
| 2019/0013931 A1 | 1/2019 | Benini |
| 2019/0036957 A1 | 1/2019 | Smith et al. |

* cited by examiner

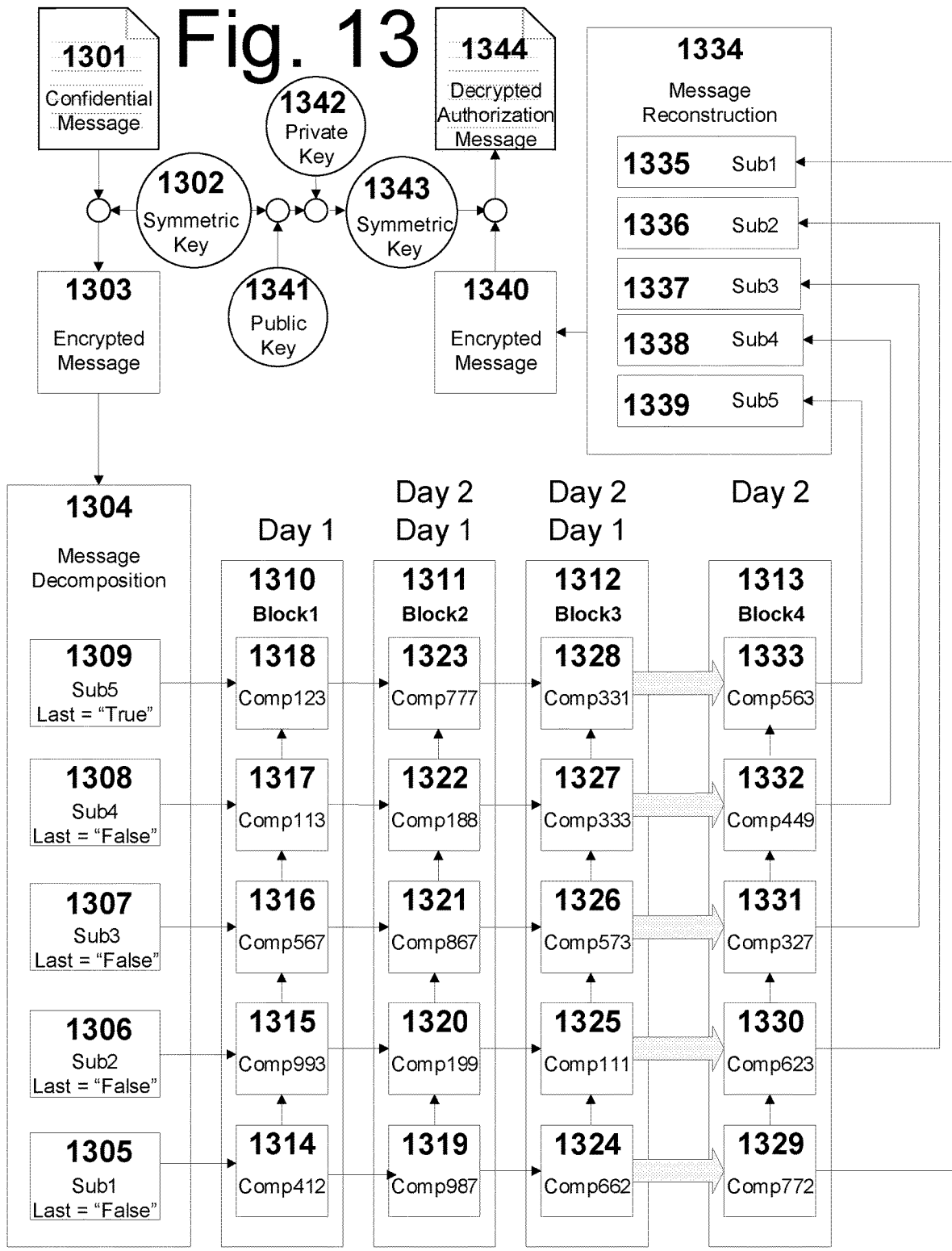

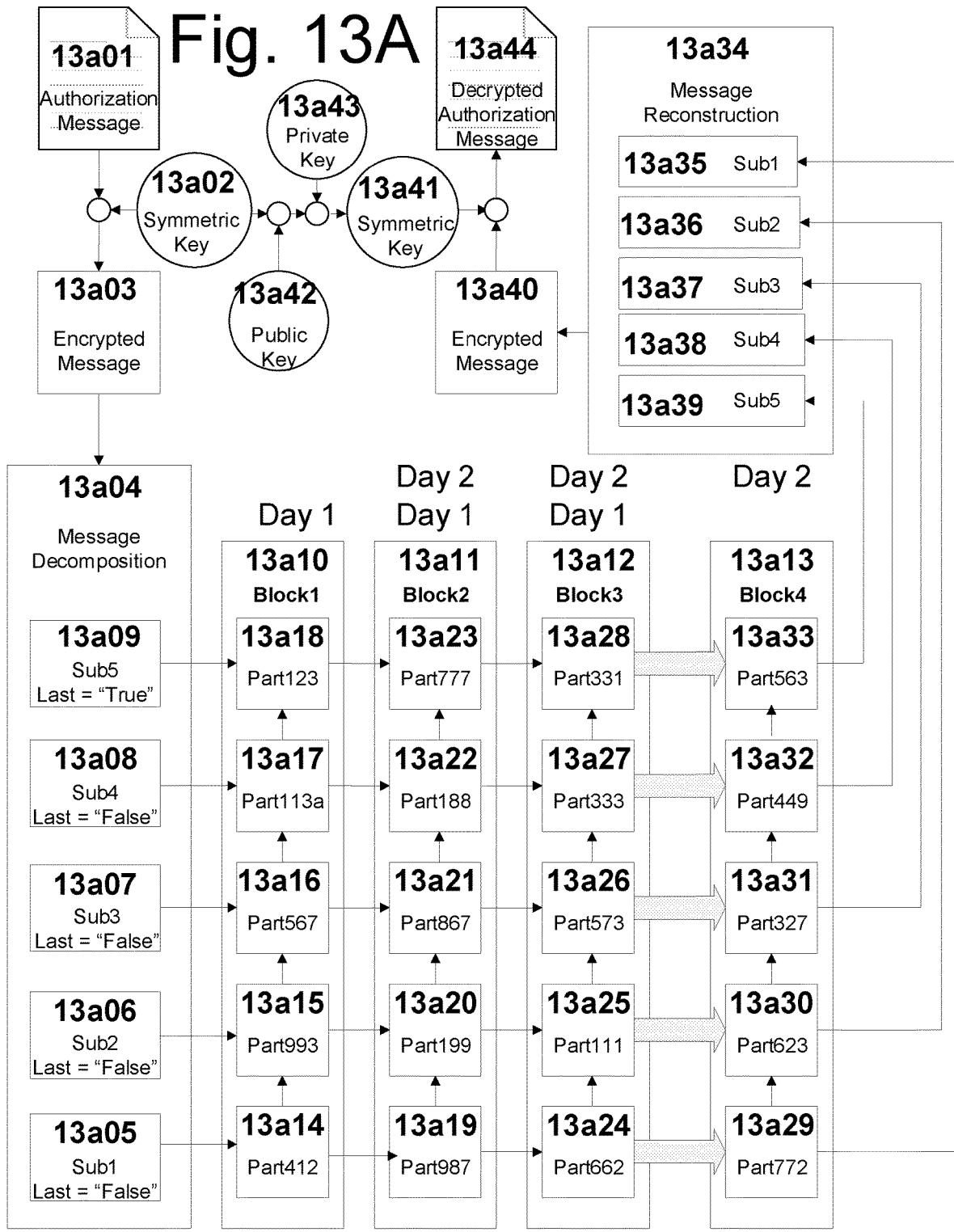

1701 Distributed Inventory

1704 Distributed Inventory IoT Device

1705 Inventory Consensus Computer

1706 Inventory Consensus Database

1703 Authenticated Natural Resource

1707 Power

1702 Tracking information for distributed Inventory

1708 Infographic of Distributed Inventory

1709 Authenticated Natural Resource

1710 Quality

1711 Value

1712 Provenance

1713 Certainty

1714 Value Capture

1715 Location

1716 eSignature

Fig. 17

METHOD AND APPARATUS TO TOKENIZE NATURAL RESOURCES

CROSS REFERENCE TO RELATED APPLICATION

This application claims the benefit of provisional patent application Ser. No. 63/060,672 filed 2020 Aug 4 by the present inventor.

FEDERALLY SPONSORED RESEARCH

None.

SEQUENCE LISTING

None.

BACKGROUND OF THE PRESENT INVENTION

1.1) Field of the Invention

This invention relates generally to the field of tokenizing natural resources.

1.2) Background

Throughout history, gold has been an attractive investment because it is rare, it is extremely difficult to create and is nearly indestructible. In addition, it is unaffected by water, time or fire. However, it is malleable, ductile and beautiful. It can be smelted into bullion and shaped for use as jewelry. Its use as jewelry is supplemented by its use in smartphones, microprocessors, memory chips and other industrial applications, including in medical care and aerospace. These characteristics contribute to gold's perception as a perfect precious metal and its use as a store of value and medium of exchange. In fact, in the past, countries used gold to back their currencies.

Investors also use gold in a number of different ways, including as a hedge against inflation, a hedge against global instability, for speculation, and for portfolio diversification. Investors also trade in gold derivatives. For example, a contract for difference ("CFD") is the difference between the price of gold at the time of purchase and the current price. CFDs enable traders to speculate on gold prices without actually owning physical gold, gold mine shares or gold derivatives. Gold futures are derivatives that allow traders to speculate on the future price of gold through the purchase of exchange-traded contracts. Gold options are a leveraged derivative instrument for trading gold. Exchange Traded Funds ("ETFs") are financial instruments that trade like stocks.

For these and other reasons, natural resources, such as gold, have a high perceived value and significant worldwide demand. However, their physical distribution does not match the location and other preferences of their demand. This creates a demand for trade to transport natural resources from their current location to the preferred location that will meet the expectations of this demand. To maximize the benefits to all parties, this trade should be efficient and effective. However, the current value chain for natural resources, such as gold, has multiple deficiencies.

The current value chain lacks efficiency, trust, liquidity, transparency, advanced financial controls, advanced decision support and enhanced information security.

Gold mines lack efficient and predictable production value, which impairs forecasting and efficient market making.

The value chain for gold lacks efficient authentication of identity, ownership, provenance, quality and transactions. Stakeholders do not easily trust the identity of their trading partners, the authenticity of the title, the source of the gold, the gold's purity and the certainty of a transaction. Uncertain title and provenance increase purchase risk for buyers. Uncertain purity leads to variations in estimated volume versus actual volume after smelting. The timing of shipments has many dependencies that lead to uncertain delivery times. Buyers want the seller to assume responsibility for shipping and insurance (e.g., CIF) but the seller wants the buyer to assume this responsibility (e.g., FOB). Both the buyer and seller lack trust regarding shipments and payment.

The market for physical gold lacks liquidity. Although it is a commodity, unacquainted buyers and sellers cannot buy and sell gold then quickly settle the transaction. Substantial time-consuming due diligence and contracting is required to execute and settle a deal due to a lack of trust. This prevents rapid decision-making and innovation of new business opportunities that require rapid decision-making. For example, it is very difficult for a buyer of gold to quickly flip a purchase to another buyer. Also, it is very difficult for a seller of gold to leverage standard drop shipping techniques.

Gold mines do not provide open access to their operational and business information. Also, both the participants in the distribution value chain and the end buyer currently minimize access to their information which is critical for effective decision support across the value chain.

The distribution value chain for gold inhibits decision-making because it is difficult to visualize the value map, supply data, demand data and distribution data in value streams that highlight dependencies.

Manual, cumbersome security techniques are used during the transportation of gold from supplier to buyer. Modern information technology is not used to tracked gold shipments to enhance security.

Manual, inefficient accounting techniques are used to govern expenditures of budgets derived from the monetization of gold.

These challenges associated with providing a value exchange for natural resources that is transparent, assured by a layer of distributed trust and enforces budget rules are not resolved by the prior art. Further, authentication of confidential information is an important task. The confidential information may be subjected to various attacks, such as phishing attacks, social engineering attacks, dictionary attacks and the like. The confidential information may be hacked by a hacker using several hacking techniques. In addition, confidential information may be leaked due to inappropriate encryption and decryption of authentication information. Conventional methods of encryption and decryption may be hacked without much effort. Moreover, physical loss of authentication information may occur in several instances. The recovery of authentication information during physical loss of authentication information is also an important aspect. Hence, there exists a need for a system which provides secure authentication information, recovery of the authentication information, and storing the authentication information securely.

1.3) Background Art

The "Deloitte Tracking the Trends Global Mining Study" describes the application of analytics in the mining industry.

For predictive analytics, U.S. Pat. No. 6,871,137B2 teaches a web-based transportation decision support system and geographic information system (GIS) application that leverages intelligent transportation system (ITS) information available from federal, state, local, and commercial transportation sources. For distributed trust, US20190036957A1 teaches a distributed transaction application to process a transaction in a computing environment based on a centralized trust topology or a diffused trust topology. For authentication, US20070288392A1 teaches an online payment system and a secure authentication method, including a customer, a merchant and a payment gateway connected over Internet that is responsible for authenticating identities of the customer and the merchant and validating the validity of transactions. For provenance, WO2019036804A1 teaches a method for tracking the provenance of an item, service, and/or payment. For inventory management, U.S. Pat. No. 7,590,937B2 teaches a procurement risk management method, including a resource sourcing mix that is computed from a sourcing portfolio of one or more forward contracts, spot market purchases, and inventory depletion for each period of a planning horizon based on forecast scenarios for resource demand, resource price, and resource availability and a specified inventory carrying policy for the resource. For liquidity of physical assets, US20090254474A1 teaches a method for liquefying an illiquid asset for the purpose of extracting liquidity, where the extracted liquidity is a portion of the value of the asset and is provided to the asset owner from an asset buyer as an earnest money purchase deposit. For transparency, US20170140408A1 teaches a system and method for using a smart contract block chain configuration to implement a secure and transparent self-managing rewards program between an entity (or firm) and its customers. For geovisual analytics, U.S. Pat. No. 8,346,682B2 teaches an information assisted visual interface, system, and method for identifying and quantifying multivariate associations. The "Geovisual Analytics for Spatial Decision Support: Setting the Research Agenda" describes the approach to spatial decision support using Geovisual Analytics. For derivative products, U.S. Pat. No. 8,326,715B2 teaches a method of creating and trading derivative contracts based on a statistical property that reflects variance of an underlying asset. US20070244780A1 teaches a method for property owners and investors to temporarily swap their respective economic interests in owning/disowning an underlying property for a certain period of time, directly or through some middlemen. For enhanced information security, Utility application Ser. No. 15/268,591 teaches a method to encrypt authentication information, decompose it into subcomponents, distribute those subcomponents dynamically across randomly selected member computers and use biometrics to secure and recover the information. For the Internet of Things ("IoT"), U.S. Ser. No. 10/022,613B2 teaches a method for an internet of things device to collect information that is distributed over a wireless network and processed using a smart contract on a blockchain. For Tokenization, US20170098291A1 teaches a digital token comprising a set of stored rules that govern the obligations between parties to a contractual agreement that is implemented in a smart contract. For budget management, U.S. Pat. No. 6,418,420B1 teaches a distributed budgeting and accounting system with secure token device access that governs the procurement of internal resources in accordance with predetermined budget rules. U.S. Pat. No. 7,213,750B1 teaches a method where a host computer may receive a request from a point of sale (POS) device to authorize payment for one or more items. The host computer may transmit a payment authorization to the POS device if the item is in a permitted product category then the host computer will debit at least one flexible spending account.

None of these disclosures, or any other prior art, teaches a value exchange for natural resources that is transparent and assured by a layer of distributed trust where tokenized inventory collateralizes derivative products, which enables the inventory to be monetized while located anywhere in the world including in major buying hubs, whereby suppliers, buyers and market makers can execute and settle authenticated transactions, both outright sales and derivative transactions, for natural resources in near real time while enforcing budgeting rules.

Accordingly, there is a need for a distributed value exchange for natural resources that is transparent and assured by a layer of distributed trust where suppliers, buyers, market makers and investors can execute and settle authenticated transactions in near real time for both direct sales and derivative transactions collateralized by a distributed inventory, while enforcing budgeting rules.

The present invention is designed to improve decision making related to monetizing distributed inventories by automating and enhancing human capabilities to analyze, envision, reason, and deliberate in the present context where key decision drivers include geographic space, time, multiple stakeholders and tacit knowledge about natural resources, derivatives, budget management and trade. Where near real time, transactions require efficiency, trust, liquidity, transparency and geovisual decision support. Where predictive analytics are captured from devices in mines and made available to stakeholders to improve real time monitoring, increase production efficiency, enable continuous improvement, facilitate forecasting and optimize decision-making. Where trust is distributed throughout the value chain and includes authentication of users and devices, product provenance and predictable product delivery, quality and payments. Where supplies are authenticated at the source and provenance is tracked to the destination. Where inventory is tokenized to facility revenue generation, has flexible volume to accommodate purity discrepancies; and can be made available at the buyer's destination in near real time with minimal transportation delays and cost. Where liquidity enables efficient market making by bridging the unpredictable variation between forecasted and actual demand and supply; and liquidity also enables near real-time transactions and settlement for physical assets. Where the major stakeholders provide enhanced transparency to facilitate choice and decision-making. Where rapid decision-making is enhanced by transparency and geovisual analytics. Where near real-time transactions enable more derivative products for natural resources and new types of transactions for natural resources. Where budgets are based on projected profits and expenditures are controlled in compliance with approved budgets and spending rules.

The applicant is not aware of any other commercially viable system that addresses the shortcomings of the prior art and also includes the features stated above. It is therefore an object of the present invention to set forth a system that offers suppliers, buyers, market makers and investors a system that provides the aforementioned features.

These features and other objects of the present invention will be apparent to those skilled in the art from the following detailed description of the present invention, the accompanying drawings and the appended claims.

BRIEF SUMMARY OF THE PRESENT INVENTION

In a preferred embodiment, the present invention provides a method and apparatus for tokenizing natural resources.

The present invention receives a confidential message as meta data or as a secure authorization from any eligible user as an access request. The present invention encrypts this confidential message then decomposes it into a plurality of linked subcomponents then makes a plurality of copies of the linked subcomponents. For each copy, each subcomponent is written, based on an authorization identifier, to a different member computer selected randomly from a plurality of member computers. For each copy, the present invention selects the first member computer randomly from the plurality of member computers. The first member computer, which stores the first subcomponent, selects the second member computer randomly, which stores the second subcomponent. Each member computer selects the successive member computer randomly that stores the successive subcomponent. Periodically, the present invention uses this same process to create a new copy of the subcomponents then delete an old copy. This enables the subcomponents of each copy of the encrypted confidential message to move randomly and dynamically among the plurality of member computers.

The present invention predicts the receipt of a first authenticated natural resource based on a first analytic associated with a first device; predicts a preferred location for said first authenticated natural resource in a distributed inventory based on a second analytic associated with a second device; receives a notification that said first authenticated natural resource has been added to said distributed inventory and has also been associated with a first node in a distributed database; stores a plurality of meta data about said first authenticated natural resource in said first node including a confidential message; calculates a preferred route plan to transport said first authenticated natural resource to said preferred location; exchanges meta data between said first node and a second node in said distributed database to attain a consensus about the history of said distributed inventory; and creates a first cryptographic token, based on a first value of said first authenticated natural resource, that is used for a plurality of insurance and financial products.

In the present invention, the first analytic includes a plurality of supply chain data that includes at least one of the received date, received location, quality and provenance of said first authenticated natural resource; the second analytic includes market data that is indicative of the likelihood that at least one buyer in an area served by a first warehouse will purchase a unit of inventory that has a specific provenance; the plurality of meta data about said first authenticated natural resource includes at least one of a quality, a market value, an authenticated provenance, a location history, authentication information and at least one electronic signature from a trusted authority; the first node in said distributed database includes a plurality of components including at least one of an internet of things device, an internet of things computer and an internet of things database; the preferred route plan includes off peak segments that reduce a transportation and storage cost for said first authenticated natural resource and said first authenticated natural resource is monetized including while in transit; and the first node in the distributed database exchanges meta data with said second node when said first node and said second node are within wireless communication range of each other. The present invention further comprises receiving a first biometric signature, from a user, to initiate a process that encrypts and decomposes said confidential message into said block of linked subcomponents; and receiving a second biometric signature, from a said user, to initiate a recovery of said confidential message from said block of linked subcomponents.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 13 illustrates a first embodiment of the high level authentication approach for the present invention.

FIG. 13A illustrates a first embodiment of the high level authentication approach within a single node for the present invention.

FIG. 17 illustrates a first embodiment of the distributed inventory node and user interface for the present invention.

DETAILED DESCRIPTION OF THE INVENTION

The detailed description set forth below is intended as a description of various configurations of the present invention and is not intended to represent the only configurations in which the present invention may be practiced. The appended drawings are incorporated herein and constitute a part of the detailed description. The detailed description includes specific details for the purpose of providing a thorough understanding of the present invention. However, it will be apparent to those skilled in the art that the present invention may be practiced without these specific details. Like or similar components are labeled with identical element numbers for ease of understanding.

System Overview

Generally, embodiments of the present invention provide a system and process for a distributed value exchange for natural resources that is transparent and assured by a layer of distributed trust where suppliers, buyers, market makers and investors can execute and settle authenticated transactions in near real time for both direct sales and derivative transactions collateralized by a distributed inventory, while enforcing budgeting rules. Embodiments disclosed below generally exist within an electronic online environment.

Figure 1:
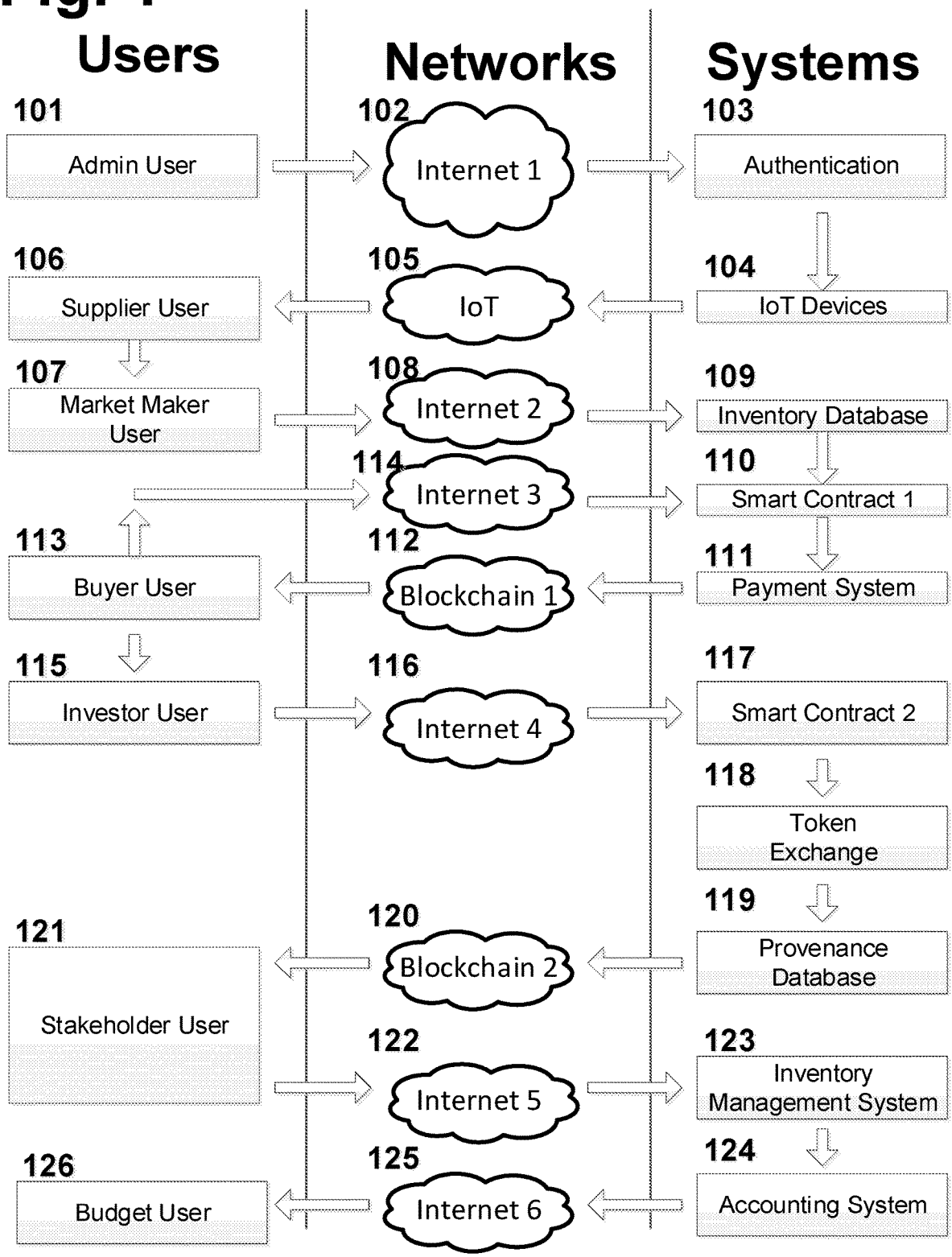
FIG. 1 illustrates a first embodiment of an overview of the present invention.

Referring now to FIG. 1, a system administrator ("Admin User") 101 maintains the present invention in all its forms, including a smartphone app and the web site. This maintenance effort includes updating the user interface, adding new features, monitoring and improving system performance, configuring the system, interfacing with new systems, upgrading enabling technologies, making system backups, resolving system issues, developing and implementing system policies and procedures, generating system reports and updating system documentation. The system administrator communicates via a network, such as the first internet (internet 1) 102, to configure the authentication system 103. The authentication system encrypts authentication information, decomposes it into subcomponents, distributes those subcomponents dynamically across randomly selected member computers and uses biometrics to secure and recover the authentication information. This includes securing authentication information for users, systems, payments, transactions and devices, such as IoT devices 104. IoT devices capture data, such as operational data from mines, such as gold mines, and distributes that data via the Internet of Things (IoT) network 105 to suppliers who operate mines, such as gold suppliers who operate gold mines 106. This includes operational data from monitoring devices installed on mining equipment, wearable devices that are worn by workers and devices that monitor the environment, such as devices that monitor water quality. The supplier sells their product, such as gold, to the market maker 107. The present invention receives information about this sale of the natural resource from both the supplier and market maker via a network, such as the second internet (internet 2) 108, then stores that information in an inventory database 109. When the present invention receives the notice of sale of the first natural resource from the supplier to the market maker, its first smart contract (smart contract 1) triggers a payment. If that payment is in fiat currency then the first smart contract executes this payment through a payment processor system (payment system) 111. The first smart contract records the payment by entering a string of bytes into an electronic ledger or first blockchain (blockchain 1) 112. If the payment is in a crypto currency then the first smart contract debits the market maker's crypto currency account and credits the supplier's crypto currency account via the first blockchain (Blockchain 1) 112. The first smart contract is a set of rules that are implemented in computer executable instructions. The first smart contract is configured to monitor a plurality of input conditions, process that information, apply the business rules then initiate a predetermined set of actions in accordance with those business rules without human intervention. In an exemplary embodiment, the first smart contract receives confirmation inputs from the supplier and market maker which confirms that all conditions have been met to consummate the sale of a first natural resource. The first blockchain, Blockchain 1, can be any blockchain that supports smart contracts. In an exemplary embodiment, the present invention uses the Ethereum blockchain for blockchain 1. The present invention updates the status of the inventory which can be viewed, via the first blockchain 112, by buyer users 113. The user interface, provided by the present invention, gives users a view of its data including its data in databases and on networks, such as the blockchain, the internet and the IoT network. Buyers can use the information displayed by the present invention to make decisions about buying gold from the market maker. If the buyer chooses to buy a second natural resource from the market maker then the buyer communicates via the third internet (internet 3) 114 with the present invention's first smart contract 110 and payment system 111. Again, the first smart contract records the transaction in the payment system 111 and on the first blockchain 112. Buyers can continue to purchase gold from the market maker in a loop. Similarly, suppliers can continue to supply additional gold to the market maker to replenish the inventory. The second natural resource that is sold to the buyer may be completely unrelated to the first natural resource that is received from the supplier. Conversely, the second natural resource may be all of, or a subset of, the first natural resource. Investor users 115 can use the information displayed by the present invention to make decisions about buying and selling gold and gold derivative products. The present invention receives requests to buy and sell derivative products from investors 115 via a network, such as the fourth internet (internet 4) 116, then uses a second smart contract 117 to process those requests. The second smart contract may be combined with the first smart contract into one smart contract or may be completely separate and distinct. However, the first smart contract and the second smart contract are both implemented using similar underlying technology. The present invention uses its own crypto currency token to represent predetermined rights to a subset of its inventory. In an exemplary embodiment, a derivative, such as a gold derivative product, may be created under a set of rules stored in the form of a digital token. This digital token is a string of bytes entered into an electronic ledger or second blockchain (Blockchain 2). The second blockchain (Blockchain 2) 120 may be the same as the first blockchain (Blockchain 1) 112. In an exemplary embodiment, the digital token includes computer executable instructions that change the string of bytes from one state to another based upon a condition in the instructions being fulfilled. For example, the present invention uses a script to track inventory criteria, such as value and ownership, and modifies the instructions in response to changes in that criteria. In exemplary applications, the token has tangible value that can appreciate and depreciate based on the appreciation and depreciation of the value of the unit of inventory, such as gold or another natural resource. The token is therefore a tradeable asset or commodity that is a derivative of the gold, or other natural resource, in the inventory. The token can be configured to self-modify based on predetermined criteria that is monitored by the business rules. For example, if the price of gold changes relative to a predetermined threshold then stop selling gold and focus on derivative revenues. The second smart contract 117, supported by the present invention, interoperates with a token exchange 118 to enable investors to buy and sell tokens that represent a stake in the market maker's inventory. The present invention offers a number of other derivative products that are collateralized by the inventory in addition to the standard token, such as token swaps and leasing tokens to clients seeking credit enhancement. A token swap gives an investor the opportunity to swap a speculative token for a stable token, backed by gold for example, if the price of the speculative token declines. The investor will pay the market maker a fee for the right to use the present invention's stable token as a swap option for a speculative token that was purchased by the investor. This is an insurance product. Credit enhancement enables an investor to offer a stable token, backed by gold for example, as collateral to a lender to secure a loan to finance the investor's business plan. The investor will pay the market maker an annual fee to lease the present invention's stable token as collateral for the investor's third-party loan. The name of the mine, that is the source of each gold bar in the inventory, is received by the present invention along with other source information, such as a time stamp and GPS coordinates that are indicative of the location and time that the gold was extracted from its ore, and tracked in the provenance database 119. This provenance information is recorded on a second blockchain (blockchain 2) 120. Stakeholder users 121 can access the provenance information on the second blockchain (Blockchain 2) 120. The present invention also enables stakeholder users to access decision making information via a network, such as the fifth internet (internet 5) 122. The present information displays this decision-making information via the inventory management system 123. The graphical inventory management and decision support system enhances rapid decision-making by providing transparent access to geovisual analytics and context sensitive decision-making knowledge. The inventory management system calculates the value captured from the inventory and the forecasted revenue based on projected value capture. The accounting system 124 uses the forecasted revenue to calculate an operating budget then enforces spending controls within that budget. The accounting system then communicates via the sixth internet (internet 6) 125 to authorize or decline expenditures attempted by the budget user 126 depending on whether each expenditure complies with the predetermined budget rules. In FIG. 1, the first internet 102, may be the same as the second internet 108, which may be the same as the third internet 114, which may be the same as the fourth internet 116, which may be the same as the fifth internet 122, which may be the same as the sixth internet 125. Similarly, the first blockchain 112 may be the same as the second blockchain 120.

The present invention leverages market information to predict demand and mining analytics to predict supply. It also leverages logistics, including distribution and storage cost information, to determine the optimal time and method to transport inventory to its optimal location to satisfy ad hoc demand in near real time. Since the monetization of derivative tokens is decoupled from the location of the underlying natural resource, such as gold, the natural resource can be located anywhere. The present invention uses its logistics system, within the inventory management system, to determine how and when to transport the inventory to the sales location that has the highest probability for a physical sale. Consequently, a buyer can decide to purchase gold from a specific supplier and receive that gold in near real time so long as the market maker has gold from that supplier in its inventory in the buyer's closest location. The market maker provides liquidity for a transaction that often takes months to consummate. In this case, the time between a buyer placing an order and receiving the gold is not impacted by negotiating a unique contract between an unfamiliar buyer and seller, resolving CIF versus FOB conflicts, supply lead times after receiving an order, supply transportation to the refinery, smelting to remove impurities, export, transportation, insurance, import, tax uncertainty and receiving. This usually takes many months. Instead, the buyer decides to purchase a natural resource, such as gold, selects a supplier, if preferred, for provenance then receives the product in near real time from the market maker's expansive inventory. Meanwhile, the inventory can be expansive because it is monetized by selling derivative products that are collateralized by that inventory and decoupled from the location of each unit of inventory. A specific unit of inventory can be sitting in a warehouse generating derivative revenues while waiting for an order that the present invention has forecasted to be received from a buyer close to that specific warehouse.

System Context

Figure 2:
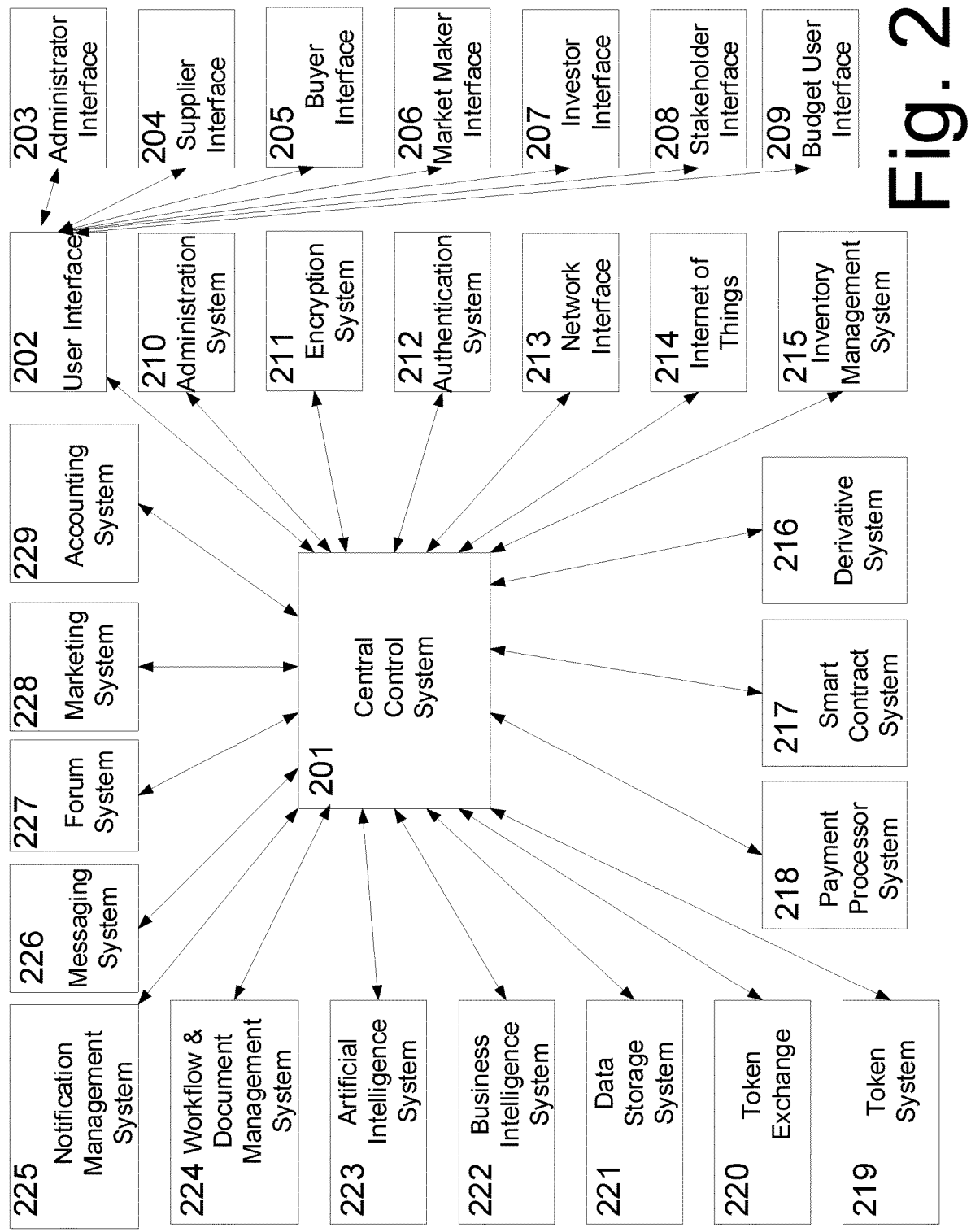
FIG. 2 illustrates a first embodiment of the system architecture of the present invention.

FIG. 2 illustrates the system context of a first embodiment of the apparatus and process for the present invention.

The central control system ("CCS") 201 is operatively coupled to a plurality of other systems and user interfaces. Operative coupling is the preferred procedure to exchange information between systems. In the present invention, the systems are inter-connected via a combination of wide area networks including the public switched telephone network, local area networks, such as an Ethernet network, token ring networks, wireless networks, the internet, the internet of things and at least one blockchain. Most systems, such as modern computers, include a built-in interface to a local network, such as an Ethernet or 802.11b wireless network. The communications protocol used by these networks follow an international standard, such as 802.11b, that enables these systems to exchange data using a pre-determined method. However, local area network connectivity only ensures the integrity of data transfer. It is also necessary to specify the information to transfer, its source location and its intended location in the destination system. Each system has its key information stored in pre-determined locations in its database. When the installation engineers configure the interface between two systems, they specify the pre-determined location of the required information in the source system's database and the pre-determined location for that information in the destination system's database. The engineers also specify the pre-determined frequency of information transfer (e.g., continuous, every day at 10:00 PM PT), the pre-determined format to use (e.g., synchronous, flat file Extract Transform Load "ETL") and the pre-determined error checking protocol to use. The combination of network connectivity and the configuration of the communication method by installation engineers enable systems to be operatively coupled to the CCS.

The CCS 201 is operatively coupled to the user interfaces. The different types of users access the CCS through a plurality of user interfaces. The user interfaces include the system administrator interface 203, the supplier interface 204, the buyer interface 205, the market maker interface 206, the investor interface 207 and the stakeholder interface 208, and the budget user interface 209, collectively "the user interfaces". The user interfaces are the input and output gateways for communications with the CCS 201.

The administration system 210 is operatively coupled to the CCS 201. The administration system enables an administrator user to administer the CCS. For example, the system administrator can use the administration system to update the look, feel and content of the web and mobile interfaces. The administration function also provides customer service features that handle customer enquiries, support community discussions and also enable technical support and maintenance functions for the present invention.

The encryption system 211 is operatively coupled to the CCS 201. The encryption system enables a symmetric encryption key, public encryption key and private encryption key to be generated for each user or transaction. It also provides an algorithm that is used to encrypt and decrypt information. It supports a multitude of encryption techniques including symmetric encryption that uses the same key to encrypt and decrypt information as well as asymmetric encryption that uses a public encryption key to encrypt information and a private encryption key to decrypt the same information.

The authentication system 212 is operatively coupled to the CCS 201. The authentication system encrypts authentication information, decomposes it into subcomponents, distributes those subcomponents dynamically across randomly selected member computers and uses biometrics to secure and recover the authentication information. This includes securing authentication information for users, systems, payments, transactions and devices, such as IoT devices.

The network interface 213 is operatively coupled to the CCS 201. The networks available to the CCS through the network interface include, the internet, the internet of things (IoT) and at least one blockchain in addition to standard computer networks that include local area networks, WIFI networks, wide area networks, ethernet networks, token ring networks, wireless networks, cable networks, broadband networks, satellite networks and the public switched telephone network.

The Internet of Things platform 214 is operatively coupled to the CCS 201. It is comprised of a number of sensors that capture data from their surroundings, such as water quality monitors, and IoT actuators the give out data to their surroundings, such as control devices for autonomous vehicles. The internet of things platform processes this data into useful information then analyzes and transforms into knowledge that supports decision making. The objective is to deliver the right data, at the right time, to the right people to drive the right business outcomes. The Internet of Things platform is detailed below.

The inventory management system 215 provides logistics and decision support capabilities. It is operatively coupled to the CCS 201. The logistics module is a web-based transportation system that leverages transportation information from commercial transportation companies, such as airlines and delivery companies. The decision support module helps users develop, evaluate and select proper policies, plans, scenarios, projects or interventions. The inventory management system is detailed below.

The derivative system 216 is operatively coupled to the CCS 201. The derivative system manages derivative products that are collateralized by the present invention's inventory of natural resources. This includes a plurality of asset backed derivative products including a proprietary crypto currency token that represents rights to a subset of the inventory. The plurality of derivative products also include token swap products and leasing collateral to clients for credit enhancement. In a first embodiment of the present invention, a proprietary derivative system is coded using standard programming techniques and is coupled to the CCS. The derivative system in the first embodiment of the present invention is coded using standard programming languages and techniques. It is similar to the derivative system taught in U.S. Pat. No. 8,326,715B2. It enables similar features, such as creating and trading derivative contracts based on a statistical property that reflects the variance in the value of the underlying natural resource, such as gold. An adaptation of the system taught in U.S. Pat. No. 8,326,715B2 is an alternative solution.

The smart contract system 217 is operatively coupled to the CCS 201. The smart contract system manages the smart contracts used by the present invention. Smart contracts are computer programs designed to automate the execution of the terms of a machine-readable contract or agreement. Each smart contract is implemented as a machine executable program which comprises rules that can process inputs in order to produce results, which can then cause actions to be performed dependent upon those results. In a first embodiment of the present invention, the smart contracts receive input conditions, such as supplier and market maker confirm the sale of a first natural resource, then the smart contract initiates the payment transfer from market maker to supplier. US20180005186A1 teaches a smart contract management system that can be used by the present invention.

US20180089758A1 teaches an example smart contract. The following is sample code that enables a buyer to use a crypto currency token to purchase an offering. To one skilled in the art, it is clear that this code can be easily modified to enable a buyer, such as a market maker, to use a fiat currency, such as U.S. dollars, to purchase from a supplier a natural resource, such as gold. Also, the following code can be modified to enable a buyer to purchase gold from a market maker and for an investor to buy gold derivative products from a market maker. The following code is exemplary and is not intended to represent the only script that the present invention can use to implement a smart contract or token. It will be apparent to those skilled in the art that the present invention may be practiced without this specific script.

```
ethereum.org
ethereum.stackexchange.com
pragma solidity ^0.4.16;
interface tokenRecipient { function receiveApproval(address _from, uint256 _value, address _token, bytes _extraData) public; }
contract TokenERC20 {
    // Public variables of the token
    string public name;
    string public symbol;
    uint8 public decimals = 18;
    // 18 decimals is the strongly suggested default, avoid changing it
    uint256 public totalSupply;
    // This creates an array with all balances
    mapping (address => uint256) public balanceOf;
    mapping (address => mapping (address => uint256)) public allowance;
    // This generates a public event on the blockchain that will notify clients
    event Transfer(address indexed from, address indexed to, uint256 value);
    // This notifies clients about the amount burnt
    event Burn(address indexed from, uint256 value);
    /**
     * Constructor function
     *
     * Initializes contract with initial supply tokens to the creator of the contract
     */
    function TokenERC20(
        uint256 initialSupply,
        string token Name,
        string token Symbol
    ) public {
        totalSupply = initialSupply * 10 ** uint256(decimals); // Update total supply with the decimal amount
        balanceOf[msg.sender] = totalSupply;        // Give the creator all initial tokens
```

```
        name = token Name;           // Set the name
for display purposes
        symbol = tokenSymbol;        // Set the symbol
for display purposes
    }
    /**
    * Internal transfer, only can be called by this contract
    */
    function _transfer(address _from, address _to, uint _value)
internal {
        // Prevent transfer to 0x0 address. Use burn( ) instead
        require(_to != 0x0);
        // Check if the sender has enough
        require(balanceOf[_from] >= _ value);
        // Check for overflows
        require(balanceOf[_to] + _value > balanceOf[_to]);
        // Save this for an assertion in the future
        uint previousBalances = balanceOf[_from] + balanceOf[_to];
        // Subtract from the sender
        balanceOf[_from] -=_ value;
        // Add the same to the recipient
        balanceOf[_to] + =_ value;
        Transfer(_from, _to, _value);
        // Asserts are used to use static analysis to find bugs in your
code. They should never fail
        assert(balanceOf[_from] + balanceOf[_to] ==
previousBalances);
    }
    /**
    * Transfer tokens
    *
    * Send '_value' tokens to '_to' from your account
    *
    * @param _to The address of the recipient
    * @param _value the amount to send
    */
    function transfer(address_to, uint256 _value) public {
        _transfer(msg.sender, _to, _value);
    }
    /**
    * Transfer tokens from other address
    *
    Send '_value' tokens to '_to' on behalf of '_from'
    *
    * @param _from The address of the sender
    * @param _to The address of the recipient
    * @param _value the amount to send
    */
    function transferFrom(address _from, address_to, uint256
_value) public returns (bool success) {
        require(_value <= allowance[_from][msg.sender]);   // Check
allowance
        allowance[_from][msg.sender] -= _ value;
        _transfer(_from, _to, _value);
        return true;
    }
    /**
    * Set allowance for other address
    *
    * Allows '_spender' to spend no more than '_value' tokens on
your behalf
    *
    * @param _spender The address authorized to spend
    * @param _value the max amount they can spend
    */
    function approve(address_spender, uint256 _value) public
        returns (bool success) {
        allowance[msg.sender][_spender] = _ value;
        return true;
    }
    /**
    * Set allowance for other address and notify
    *
    * Allows '_spender' to spend no more than '_value' tokens on
your behalf, and then ping the contract about it
    *
    * @param _spender The address authorized to spend
    * @param _value the max amount they can spend
    * @param _extraData some extra information to send to the
approved contract
    */
    function approveAndCall(address_spender, uint256 _value,
bytes _extraData)
        public
        returns (bool success) {
        tokenRecipient spender = tokenRecipient(_spender);
        if (approve(_spender, _value)) {
            spender.receiveApproval(msg.sender, _value, this,
_extraData);
            return true;
        }
    }
    /**
    * Destroy tokens
    *
    * Remove '_value' tokens from the system irreversibly
    *
    * @param _value the amount of money to burn
    */
    function burn(uint256 _value) public returns (bool success) {
        require(balanceOf[msg.sender] > =_ value);   // Check if the
sender has enough
        balanceOf[msg.sender] -= _ value;            // Subtract from the
sender
        totalSupply -= _ value;                      // Updates totalSupply
        Burn(msg.sender, _value);
        return true;
    }
    /**
    * Destroy tokens from other account
    *
    * Remove '_value' tokens from the system irreversibly on behalf
of '_from'.
    *
    * @param from the address of the sender
    * @param _value the amount of money to burn
    */
    function burnFrom(address _from, uint256 _value) public
returns (bool success) {
        require(balanceOf[_from] > =_ value);        // Check if the
targeted balance is enough
        require(_value <= allowance[_from][msg.sender]);   // Check
allowance
        balanceOf[_from] -= _ value;                 // Subtract from
the targeted balance
        allowance[_from][msg.sender] -= _ value;     // Subtract
from the sender's allowance
        totalSupply -= _ value;                      // Update
totalSupply
        Burn(_from, _value);
        return true;
    }
}
```

The payment processor system 218 is operatively coupled to the CCS. The payment processor system enables payments to be transferred from buyer to seller. A number of service providers offer payment processor systems that meet the needs of the present invention, such as Paypal, Google, WePay and Stripe.

The token system 219 is operatively coupled to the CCS 201. It enables crypto currency tokens to be created, transferred and stored on a blockchain. A token is a cryptographic string of numbers and letters that is stored on a distributed ledger, or blockchain, as a transaction. A first user creates a message, such as transfer 10 of my cryptocurrency tokens to another user whose address is 0x7e5f4552091a69125d5dfcb7b8c2659029395bef. The first user then signs (e.g., encrypts) that message using their private key. The first user then submits the encrypted message to the blockchain. A second user can access that message then use the first user's public key to decrypt the message. The encrypted message can describe a crypto currency token and its transactions. The present invention uses its own crypto currency tokens to represent predetermined rights to a subset of its inventory. In addition, the present invention offers a number of derivative products. Each derivative product is represented by its own token. Each token that represents a derivative product is governed by its own set of predetermined rules that define the rights of each derivative product. For example, the present invention may submit a transaction to a blockchain that creates 10 million debt tokens, each worth $1. This represents a loan of $10 Million from at least one lender to the market maker. These tokens have rules, such as each token gives the owner rights to 10% interest per year and repayment of $1 for each token at the end of the 3 year term. An additional rule may be that the present invention reserves $1 in gold from its inventory as collateral for each debt token. Similarly, the present invention may submit a transaction to a blockchain that creates 100 million collateral tokens, each worth $1. These tokens allow an investor to collateralize a loan from a third-party lender. These tokens also have rules, such as each token gives the owner rights to $1 in gold from the present invention's inventory. The lender or investor can issue transactions on the blockchain to transfer their rights, that are conveyed by each derivative token, to a second lender or investor. This type of secondary transfer is typically executed on a token exchange. Also, in the present invention, a token is not a physical object or even a digital representation of a physical object. Rather, it is a string characters that represent a transaction that creates, transfers or destroys virtual tokens. The following contract is exemplary and is not intended to represent the only script that the present invention can use to mint a token (or coin). It will be apparent to those skilled in the art that the present invention may be practiced without this specific contract.

```
pragma solidity ^0.5.0;
contract Coin {
//The keyword "public" makes those variables
//easily readable from outside.
address public minter;
mapping (address→uint) public balances;
//Events allow light clients to react to
//changes efficiently.
event Sent(address from, address to, uint amount);
//This is the constructor whose code is
//run only when the contract is created.
constructor( ) public {
   minter=msg.sender;
}
function mint(address receiver, uint amount) public {
   require(msg.sender==minter);
   require(amount<1e60);
   balances[receiver]+=amount;
}
function send(address receiver, uint amount) public {
   require(amount<=balances[msg.sender], "Insufficient balance.");
   balances[msg.sender]-=amount;
   balances[receiver]+=amount;
   emit Sent(msg.sender, receiver, amount);
}
}
```

The token exchange, or crypto currency exchange, 220 is operatively coupled to the CCS 201. According to Wikipedia a cryptocurrency exchange or a digital currency exchange (DCE) is a business that allows customers to trade cryptocurrencies or digital currencies for other assets, such as conventional fiat money or other digital currencies. A cryptocurrency exchange can be a market maker that typically takes the bid-ask spreads as a transaction commission or, as a matching platform, simply charges fees. A crypto currency exchange is taught by US 2015/0170112 A1. The present invention uses the crypto currency exchange to sell, buy, and exchange its tokens. The present invention can use a plurality of third-party exchanges for its transactions, including LA Token, Bittrex and Binance.

The data storage system 221 is operatively coupled to the CCS 201. The data storage system stores the plurality of data used by the present invention.

The business intelligence system 222 is operatively coupled to the CCS 201. The business intelligence system calculates and stores a plurality of information about trends, patterns and relationships in the databases used by the present invention.

The artificial intelligence ("AI") system 223 is operatively coupled to the CCS 201. AI systems are machines that appear to have human intelligence. They ingest volumes of data, adapt to their environment, react to changing conditions, search through possible scenarios handle multiple people and systems concurrently and can even act on their own recommendations. A first embodiment of the present invention uses a commercial off the shelf artificial intelligence system. It leverages standard AI methodologies including time series prediction and reinforcement learning systems to guide user demand for gold, supplier backorders for gold that has high demand provenance, warehouse optimization and inventory distribution. The time series prediction model estimates demand for natural resources over time. It leverages long short-term memory (lstm)/recurrent neural network (rnn) models with sliding windows and traditional logistic regression techniques with a few adaptations. These models receive a plurality of inputs, including external data, such as the local exchange rate, which has a significant correlationship with demand for gold in certain regions. The reinforcement learning system has simulation models that make predictions, or classifications, then acts on those predictions autonomously without human intervention. Whenever the actual inventory levels fall toward the minimum target or increases toward the maximum target for any given location, the CCS provides feedback to the model to help it improve its predictive capabilities. Although a commercial off the shelf system is used, a number of artificial intelligence systems are available that can meet the needs of the present invention, such as the one taught in U.S. Pat. No. 4,670,848A.

The workflow and document management system 224 is operatively coupled to the CCS 201. The workflow and document management system enables users to create and evolve workflows that guide users through the best practice to complete an activity. A first embodiment of the present invention uses a modified version of the WMS taught in co-owned application Ser. No. 10/716,747 (11/18/2003). However, a number of commercial workflow management systems are available that can meet the needs of the present invention, including ProcessMaker and Integrify.

The notification management system 225 is operatively coupled to the CCS 201. The CCS sends an alert to the notification management system whenever an event occurs that requires the attention of a user or other entity. For example, after a supplier sells a first natural resource to the market maker the CCS will instruct the notification management system to alert other users, including buyers, investors and stakeholders by sending an email, text message or alternative notification. The present invention uses a specific notification management system. However, Google and web hosts such as GoDaddy and Host Gator provide tools that support alerts that can be used by the present invention.

The messaging system 226 is operatively coupled to the CCS 201. The messaging system enables users to exchange communication messages in real time. For example, a buyer can send a question to a seller and that seller can respond immediately. In addition, multiple stakeholders can participate in a group conversation using real time messaging where they can exchange communications in multiple formats including text and files. The present invention uses a specific messaging system. However, Google and web hosts such as GoDaddy and Host Gator provide messaging system that can be used by the present invention.

The forum system 227 is operatively coupled to the CCS 201. The forum system enables users to create a bulletin board where multiple users can exchange communication messages about a topic specified by the user who created and manages the forum. For example, an investor may be facing an issue related to a derivative product. That investor can create a forum to explain the issue. Other stakeholders with the relevant expertise can respond with information to help resolve the issue. Forums allow users to exchange information in multiple formats including text and files. The present invention uses a specific forum system. However, web hosts such as GoDaddy and Host Gator provide forum solutions that can be used by the present invention. For example, GoDaddy's Website Builder solution supports forums. Other forum software solutions that can be used by the present invention include MyBB, pphbb and punbb.

The marketing system 228 is operatively coupled to the CCS 201. Marketing software is generally categorized into three groups: advanced workflow automation, marketing intelligence, and marketing automation. It allows the management of marketing campaigns, optimization of resources, and has features for data collection, analytics, team collaboration, branding, phone call tracking, social media marketing, content distribution, SEO, lead scoring and nurturing, and email marketing. The present invention's marketing system enables users to market their offerings to other users. For example, suppliers can market their offerings to buyers and the market maker can market its derivative offerings to investors. In a first embodiment of the present invention, a commercial off the shelf marketing system is operatively coupled to the CCS. However, a number of commercial off the shelf marketing systems can be used with the present invention including, Salesforce and Hubspot.

The accounting system 229 is operatively coupled to the CCS 201. In general, businesses use accounting systems for financial close, revenue management, fixed assets, order management, billing, inventory management, expense management and management of its other financial activities. Modules include billing and payroll, accounts receivable, accounts payable, budget and forecast, fixed assets, inventory and general ledger. The present invention uses a specific accounting system. However, a number of commercial accounting systems are available that can meet the needs of the present invention, including Workday, NetSuite ERP, Quickbooks Enterprise and Microsoft Dynamics GP.

Figure 3:
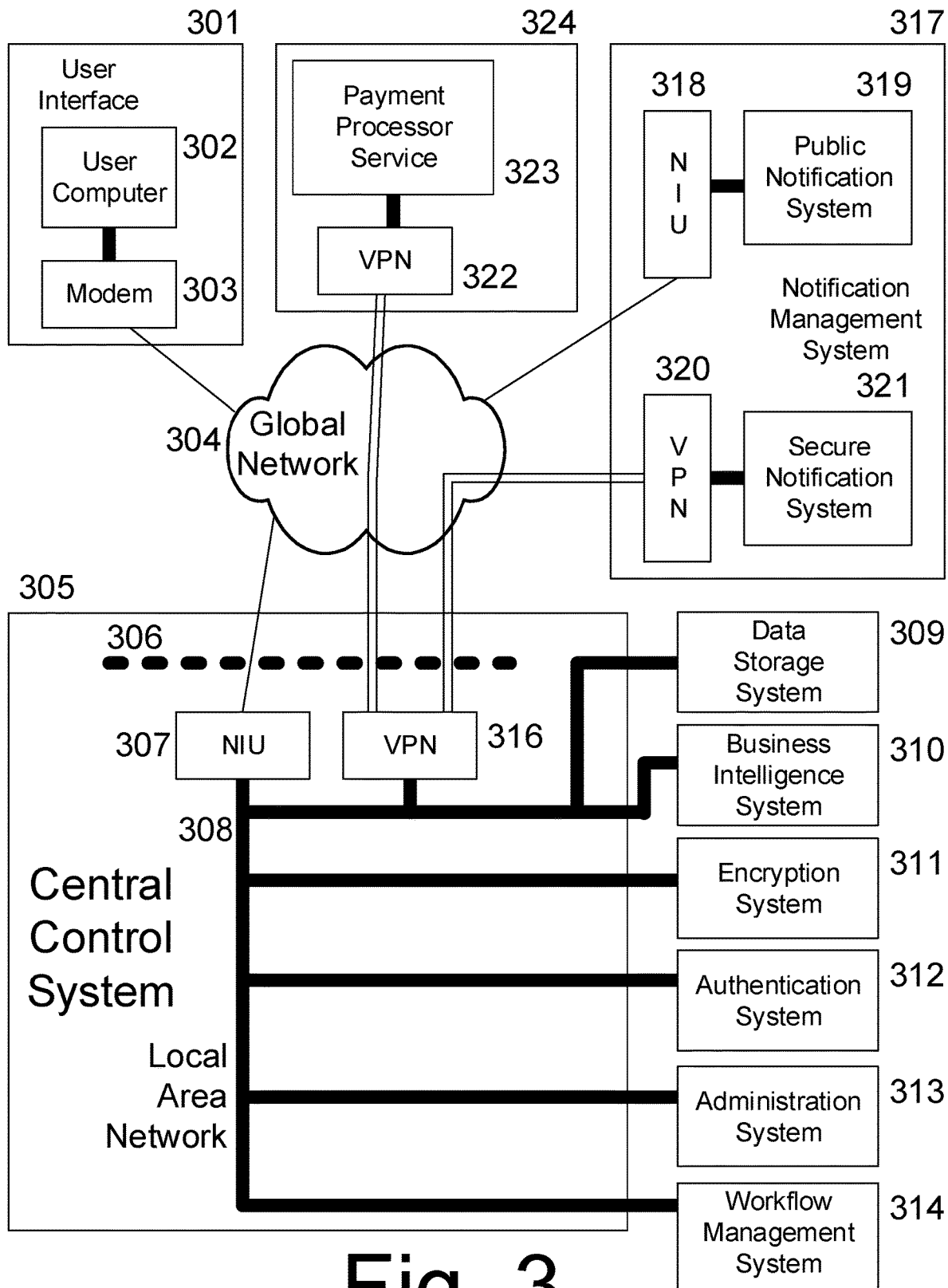
FIG. 3 illustrates a first embodiment of the integration among the central control system and selected components of the present invention.

FIG. 3 illustrates the network connectivity of a first embodiment of the apparatus and method of the present invention.

The user interfaces 301 include a computer 302 and a modem 303. Many companies make mobile and desktop computers that a user can use to access the CCS including Apple, Samsung, Hewlett Packard, and Toshiba. In addition, many companies make modems that can connect to the CCS including 3Com Corp., D-Link Systems, Inc., and US Robotics. The user's computer is connected to the CCS via the modem and a Global Network 304, such as the Internet. The user's modem can be connected to the Global Network using at least one of a plurality of services including public or private networks such as the public switched telephone network, dedicated data line, cable service, cellular service, WiFi service, personal communication system ("PCS"), satellite network, and a microwave connection. These types of connections are provided by a plurality of organizations including local and regional telephone operating companies, cable TV companies and other providers of private and public networks.

The CCS 305 includes a local area network 308 that is connected to the global network 304 via a network interface unit ("NIU") 307 and a firewall 306. The CCS is also connected to other systems via the local area network 308 including the Data Storage System 309, Business Intelligence System 310, Encryption System 311, Authentication System 312, Administration System 313, and the Workflow Management System 314.

The CCS 305 also includes a Virtual Private Network ("VPN") modem 316 that is connected to the Secure Notification System 321 and the Payment Processor System 323. Many companies make VPN modems that can be used with the present invention including Netgear, Linksys and Cisco. The Secure Notification System 321 is connected to the CCS via the Global Network using a Virtual Private Network modem 320. In addition to the Secure Notification System 321, the Notification Management System 317 includes a Public Notification System 319. The Public Notification System 319 is connected to the Global Network using a Network Interface Unit 318. The preferred embodiment of the present invention can use a plurality of Public Notification Systems including email services and mobile services. The present invention can operate with many such email services including Yahoo, Hotmail and Gmail. Many organizations provide such email services including Yahoo, Microsoft and Google. The Payment Processor System 324 includes a Payment Processor Service 323 that is connected to the Global Network via a VPN modem 322. Many organizations provide such Payment Processor Services that can be used with the present invention including Paypal, Western Union, WePay, Stripe and Verisign.

Figure 4:
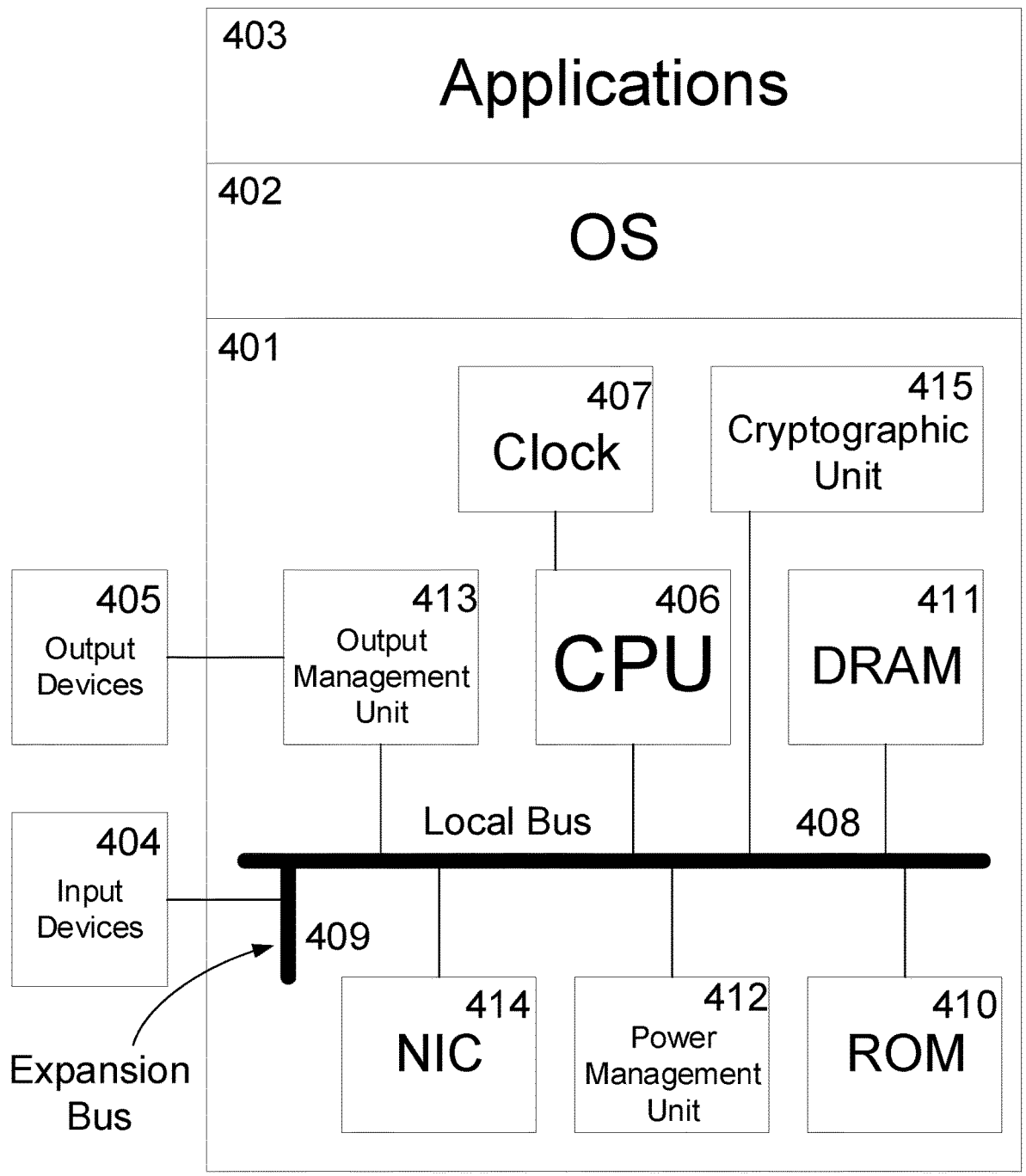
FIG. 4 illustrates a first embodiment of the technical platform for the central control system of the present invention.

FIG. 4 illustrates the key components of the CCS in a first embodiment of the apparatus and method of the present invention.

The Central Control System ("CCS") includes a number of key components including the main hardware 401, the operating system 402, software applications 403, input devices 404 and output devices 405. The operating system 402 is the interface between the applications and the hardware. It controls the execution of computer applications and provides services to those applications. The preferred embodiment of the present invention can use one of a plurality of standard commercial operating systems, such as Microsoft windows, Linux and UNIX. The applications 403 include software tools such as commercial antivirus software available from companies such as McAfee and Norton, and a browser, such as Microsoft Internet Explorer, Chrome and Firefox. The CCS also includes some unique code that implements some of its unique functions described in this disclosure, such as coordinating data interchange among the different systems illustrated in FIG. 2. This unique code is programmed using a combination of programming languages including java, javascript, PHP, HTML, C, C+, and visual basic. Input devices 404 include a plurality of commercial options such as a smartphone, keyboard, a camera, a mouse, and a microphone. Output devices 405 include a plurality of commercial options such as a smartphone, monitor and speakers. These standard commercial input devices 404 and output devices 405 are available from a plurality of vendors such as CompUSA and Office Depot.

The main hardware 401 in the CCS is a combination of at least one conventional smartphone, personal computer and server each with sufficient memory and processing power. To one skilled in the art, it will be evident that the functionality of the CCS can be distributed over multiple interconnected smartphones, multiple inter-connected personal computers or multiple inter-connected servers. The main hardware includes a number of key components including the central processing unit ("CPU") 406, clock 407, local bus 408, expansion bus 409, read only memory ("ROM") 410, dynamic random access memory ("DRAM") 411, power management unit 412, output management unit 413, network interface card 414 and cryptographic unit 415.

The central processing unit ("CPU") 406 is the component of the CCS that performs most of the data processing. It interprets instructions, performs logical and arithmetic operations on data, and controls input and output functions. The preferred embodiment of the present invention can use a commercial CPU from a plurality of vendors, such as a Pentium G3258 supplied by Intel and the FX-9590 supplied by AMD. The clock 407 regulates the rate at which the CPU processes instructions. The CCS also uses the clock to synchronize the operation of its key components. A CPU such as a Pentium G3258 can operate at a clock speed of 3.2 GHz. The CCS uses the local bus to inter-connect its key components. These key components exchange data via the local bus. The CCS uses the expansion bus 409 to enable expansion cards to exchange data with the CPU and memory. Examples of commercial expansion cards are sound cards and graphics cards. The expansion bus also enables input devices 404, such as a mouse, to input data that can be used by the key components of the CCS. The read only memory ("ROM") 410 includes the instructions that the CPU executes to perform its basic operations. The vendor of the computer platform that comprises the hardware component of the CCS provides the instructions that are stored in the ROM. When the CCS's power is removed then restored, the instructions in the ROM remain unchanged. The dynamic random access memory ("DRAM") 411 includes instructions that the CPU executes to perform selected tasks. The DRAM also stores the data that is used by the instructions executed by the CPU. When the CCS's power is removed then restored, the information in the DRAM is lost. The CCS uses the power management unit 412 to supply and regulate the power required to operate the key components of the CCS. The CCS uses the output management unit 413 to interface with output devices, such as a monitor. The CCS uses the network interface card ("NIC") 414 to interface with external networks, including an Ethernet network, public switched telephone network and a wireless network. The CCS uses the cryptographic unit 415 to support secure communications with external systems, such as the payment processor system and secure notification management system. The vendor of the computer platform, which is used by the CCS, provides the local bus, expansion bus, ROM, DRAM, power management unit, output management unit, network interface card, clock, CPU and cryptographic unit. Specific components, including the NIC, can be obtained from alternate commercial vendors including CompUSA and Office Depot.

Figure 5:
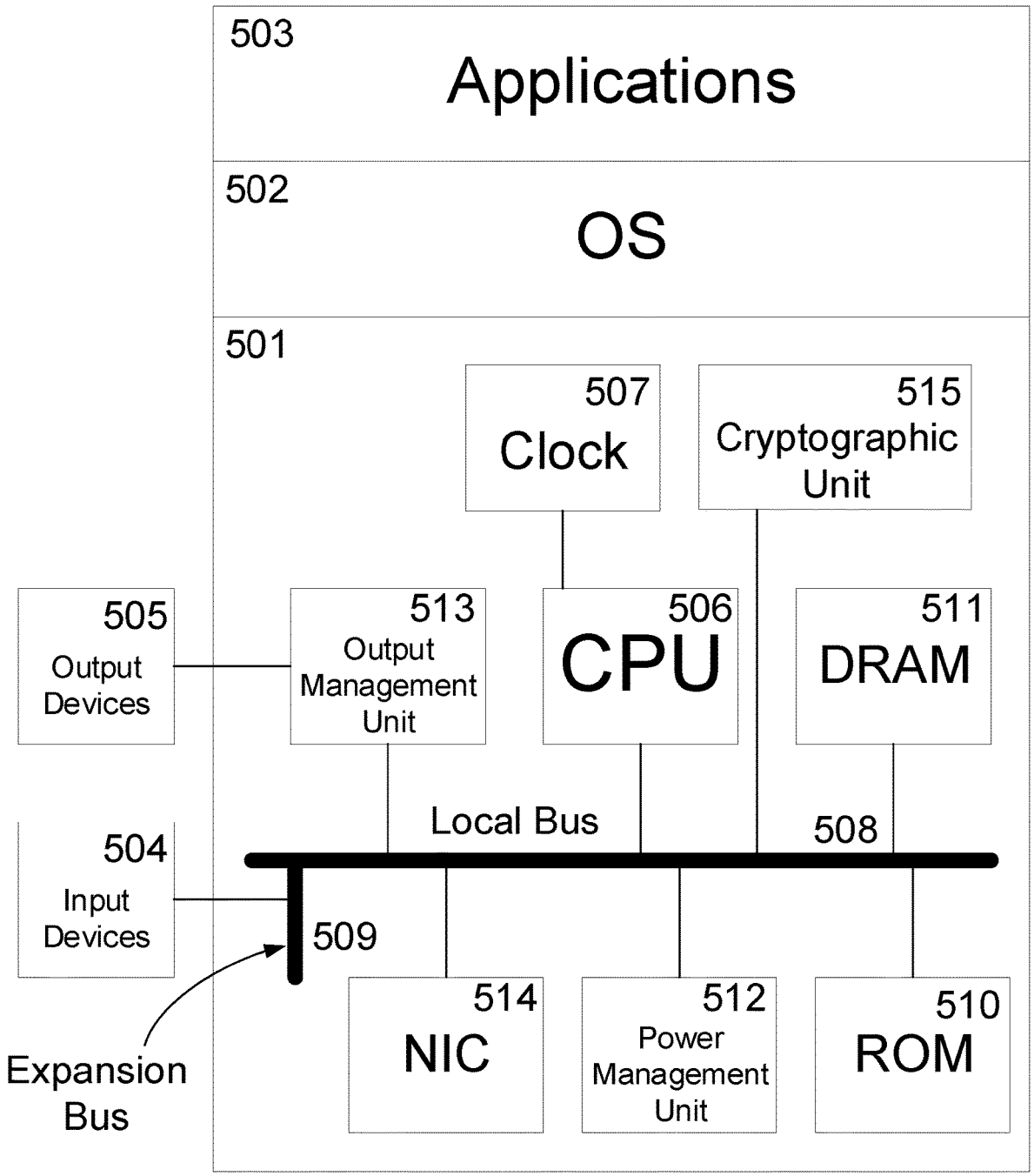
FIG. 5 illustrates a first embodiment of the user interface to the present invention.

FIG. 5 illustrates the key components of the user interface in a first embodiment of the apparatus and method of the present invention.

In a preferred embodiment of the present invention the user interface device 301 is at least one of a smartphone and conventional personal computer that includes, the main hardware 501, the operating system 502, software applications 503, input devices 504 and output devices 505. The main hardware 501 in the user interface device includes a number of key components including the central processing unit ("CPU") 506, clock 507, local bus 508, expansion bus 509, read only memory ("ROM") 510, dynamic random access memory ("DRAM") 511, power management unit 512, output management unit 513, network interface card ("NIC") 514 and cryptographic unit 515. These components are substantially the same as the similarly named components in the CCS as illustrated in FIG. 4. They also perform substantially the same functions and are available from the same vendors. The key differences are that the components in the CCS have higher performance requirements than the equivalent components in the user interface device. In addition, the user interface device includes, commercial software applications such as a word processor application and graphical design application. An example of a word processor application that can be used by the present invention is Microsoft Word. An example of a graphical design application that can be used by the present invention is Microsoft Visio. Examples of higher performance components for the CCS are a faster clock speed, a more powerful CPU and higher capacity DRAM.

Figure 6:
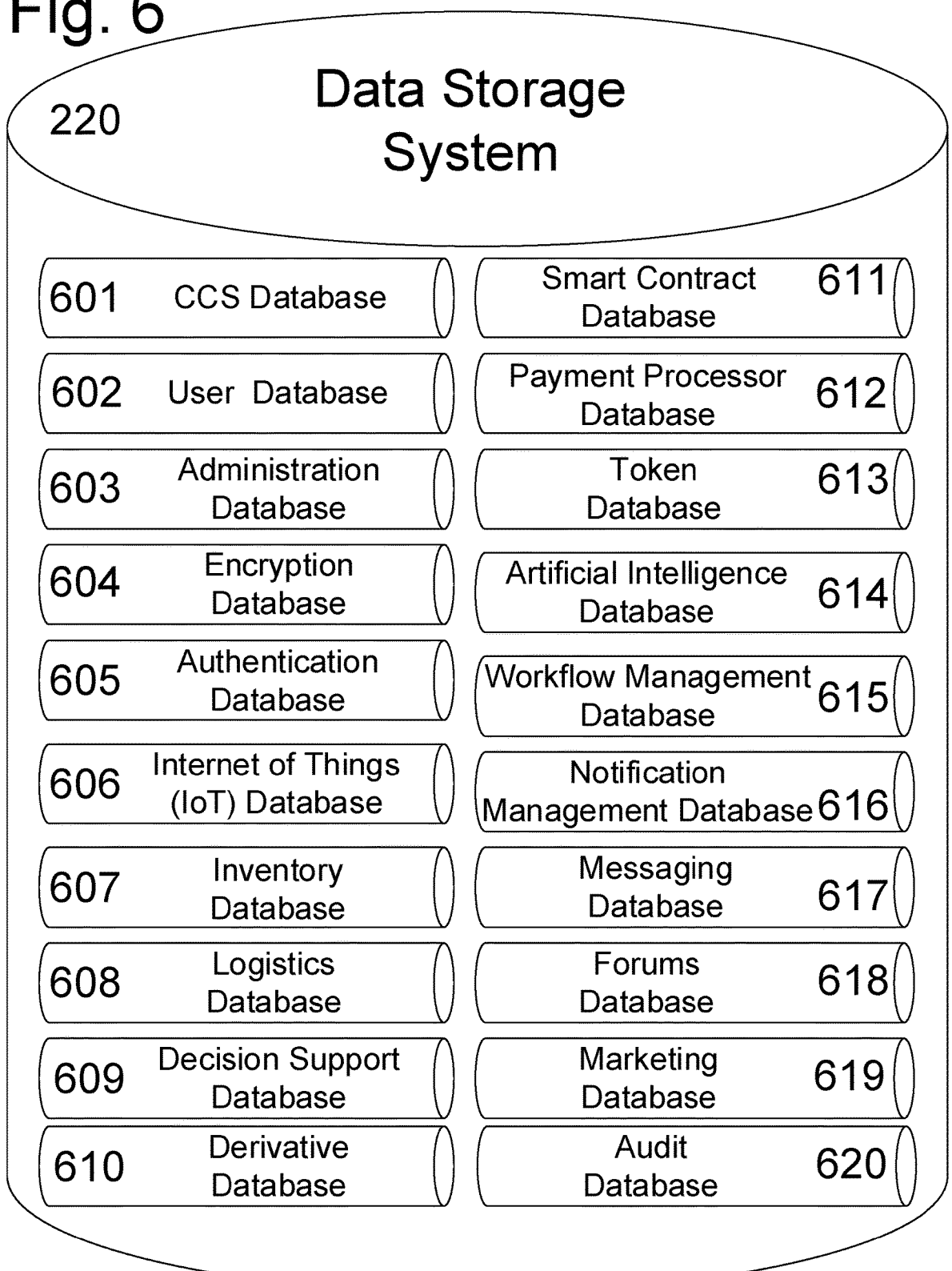
FIG. 6 illustrates a first embodiment of the data storage system ("DSS") for the present invention.

FIG. 6 illustrates the key components of the Data Storage System in a first embodiment of the apparatus and method of the present invention.

The data storage system 207 is a conventional hard disk drive that includes non-volatile, magnetic-based hard disk storage that stores digitally encoded data. The data is retained in the data storage system after power is removed then restored. A plurality of suppliers manufacture data storage systems that can be used by the present invention including EMC, Western Digital, Seagate, Maxtor, and Hitachi. The data storage system is comprised of a plurality of databases that are described below. The present invention can use one of a plurality of database systems to house the databases including Oracle and SQL database systems. The CCS stores the data in the Data Storage System in an encrypted format.

The CCS uses the CCS database 601 to store information about how users are using of the CCS. The CCS database contains a plurality of fields including a unique reference key for each record in the CCS database, the unique reference key of each user who has logged into the CCS and tracking information about the functions of the CCS used by each user during each login session.

The CCS uses the user database 602 to store information about users. For each user, the user database contains a plurality of fields including a unique reference key for each record in the user database, type of user, the user's name, role, location, contact phone numbers, email address, social media account IDs, notes, qualifications, organization, type of organization, industry, target market, user authentication information and login credentials for the CCS.

The CCS uses the administration database 603 to store information about the website, the mobile website, and the mobile application for the CCS as well as information about the maintenance and support of the CCS. The administration database contains a plurality of fields including a unique reference key for each record in the administration database, the type of information, the actual information, and corresponding meta data.

The CCS uses the encryption database 604 to store information about the symmetric encryption keys, private encryption keys, and public encryption keys. The encryption database contains a plurality of fields including a unique reference key for each record, the unique reference key for each user and information about the encryption keys. This information does not give the CCS access to the actual encryption keys.

The CCS uses the authentication database 605 to store authentication information about users, systems and devices. The authentication database is distributed across a number of member computers. It stores authentication information that has been encrypted and decomposed into subcomponents. Users can use a biometric signature to initiate and reverse this secure authentication process.

The CCS uses the Internet of Things (IoT) database 606 to store information about IoT devices and their connectivity. For each IoT device, the Internet of Things (IoT) database contains a plurality of fields that include a unique reference key for each record in the Internet of Things (IoT) database, the type of device, infrastructure, identification, communications/transport, discovery, data protocols, device management, semantic and multi-layer framework.

The CCS uses the inventory database 607 to store information about its distributed inventory. For each unit of inventory, the inventory database contains a plurality of fields that include a unique reference key for each record in the inventory database, the type of inventory, the form, size, weight, shape, finish, purity, location, packaging, special shipping and handling instructions, source, destination, preferred mode of transport, history, provenance, ask price, bid price and current value.

The CCS uses the logistics database 608 to store information about its logistical options. For each logistical option, the logistics database contains a plurality of fields that include a unique reference key for each record in the logistics database, the type of transportation option, the cost, timetable, duration, restrictions, source, destination, historical performance, inputs, outputs, risks, user feedback and current ranking.

The CCS uses the decision support database 609 to store information about its value stream optimization and decision-making criteria. For each decision point, the decision support database contains a plurality of fields that include a unique reference key for each record in the decision support database, the type of decision, decision inputs, optimization goals, options, risks, impacts, work arounds, value streams, decision outputs, decision timeframe, limitations, external factors, decision maker, contributors, stakeholders, historical factors, historical success and historical success drivers.

The CCS uses the derivative database 610 to store information about its asset-backed derivative products. For each derivative, the derivative database contains a plurality of fields that include a unique reference key for each record in the derivative database, the type of derivative, the underlying asset, terms and conditions, rights, owner, history, price and current value.

The CCS uses the smart contract database 611 to store information about its smart contracts. For each smart contract, the smart contract database contains a plurality of fields that include a unique reference key for each record in the smart contract database, the type of smart contract, the purpose of the smart contract, the input conditions, the procedure, the output conditions, terms and conditions, owner, risks, version control, language, blockchain and script.

The CCS uses the payment processor database 612 to store information about payments between buyers and sellers. The payment processor system has its own database. However, each payment that is submitted to the CCS is stored in the payment processor database. For each payment submitted to the CCS, the payment processor database contains a plurality of fields including a unique reference key for each record, the user's payment credentials, the amount of the payment, the payment method, the type of transaction, the date and time that the payment was submitted, whether the payment was accepted or rejected and the date and time that the payment was confirmed or rejected. Payments can be for a number of purposes included payments from the market maker to suppliers and payments from buyers and investors to the market maker. Payments may be made using a plurality of methods, including fiat currency, crypto currency, digital cash, cash equivalents, credit card, debit card, prepaid card, direct debit, mobile payments, barter, debt, financing, automated buying, ACH, letter of credit, check, money orders and crowd buying.

The CCS uses the token database 613 to store information about its tokens. For each token, the token database contains a plurality of fields that include a unique reference key for each record in the token database, the type of token, the purpose of the token, the previous owner, the current owner, terms and conditions, risks, current value, language, version control, blockchain and script.

The CCS uses the artificial intelligence database 614 to store information that supports the artificial intelligence system. For each record, the artificial intelligence database contains a plurality of fields that include a unique reference key for each record in the artificial intelligence database, the user reference key, authentication reference key, internet of things reference key, inventory reference key, logistics reference key, decision support reference key, derivative reference key, smart contract reference key, payment processor reference key, token reference key, workflow reference key and notification reference key.

The CCS uses the workflow management database 615 to store information about different workflows, procedures and best practices. For each workflow, the workflow management database contains a plurality of fields including a unique reference key for each record, a name for the workflow, a description of the workflow, the steps in the workflow and the unique reference key for the type of workflow.

The CCS uses the notification management database 616 to save and archive information about notifications. The notification database also stores links to templates for the different types of notifications. A notification is a message sent to a user to inform that user that an event has occurred, such as a purchase. For each notification, the notification database contains a plurality of fields including a unique reference key for each record, the type of event that caused the notification (e.g., a purchase), the unique reference key for the event that has caused the notification (e.g., the unique reference key for a specific purchase), the type of template to use for the notification, the unique reference key for the recipient to be notified (e.g., unique reference key for the destination user or system), the date and time of the event that caused the notification, the date and time that the notification was sent, the title of the notification, the message within the notification, the unique reference key for each user who shall receive a carbon copy of the notification and the unique reference key for each user who shall receive a blind copy of each notification.

The CCS uses the messaging database 617 to save and archive messages. The messaging database also stores links to templates for the different types of messages. A message is a communication from one user to another user or a note saved by a user. For each message, the messaging database contains a plurality of fields including a unique reference key for each record, the unique reference key for the messaging thread (e.g., text messaging between two users), the sequence in the thread for the message, and the date and time for the message.

The CCS uses the forums database 618 to store information about forums. The forums database contains a plurality of fields including a unique reference key for each record, the name of the forum, the purpose of the forum, the topic, and the audience who can see the forum and participation rights.

The CCS uses the marketing database 619 to store information about marketing campaigns. The marketing database contains a plurality of fields including a unique reference key for each record, the name of the marketing campaign, a description for the marketing campaign, the target audience, links to information that supports the marketing campaign, the terms and conditions for the offer, the timeframe for the marketing campaign, the approved budget for the marketing campaign, the actual spend for the marketing campaign, the success criteria, the key performance indicators and the partners used to execute the marketing campaign.

The CCS uses the audit database 620 to save and archive transactional information about CCS activities such as transactions between suppliers and market makers. The audit database contains a plurality of fields including a unique reference key for each record, information about each activity performed by the CCS, the time that the activity occurred, and the unique reference key of the person who initiated the activity.

Figure 7:
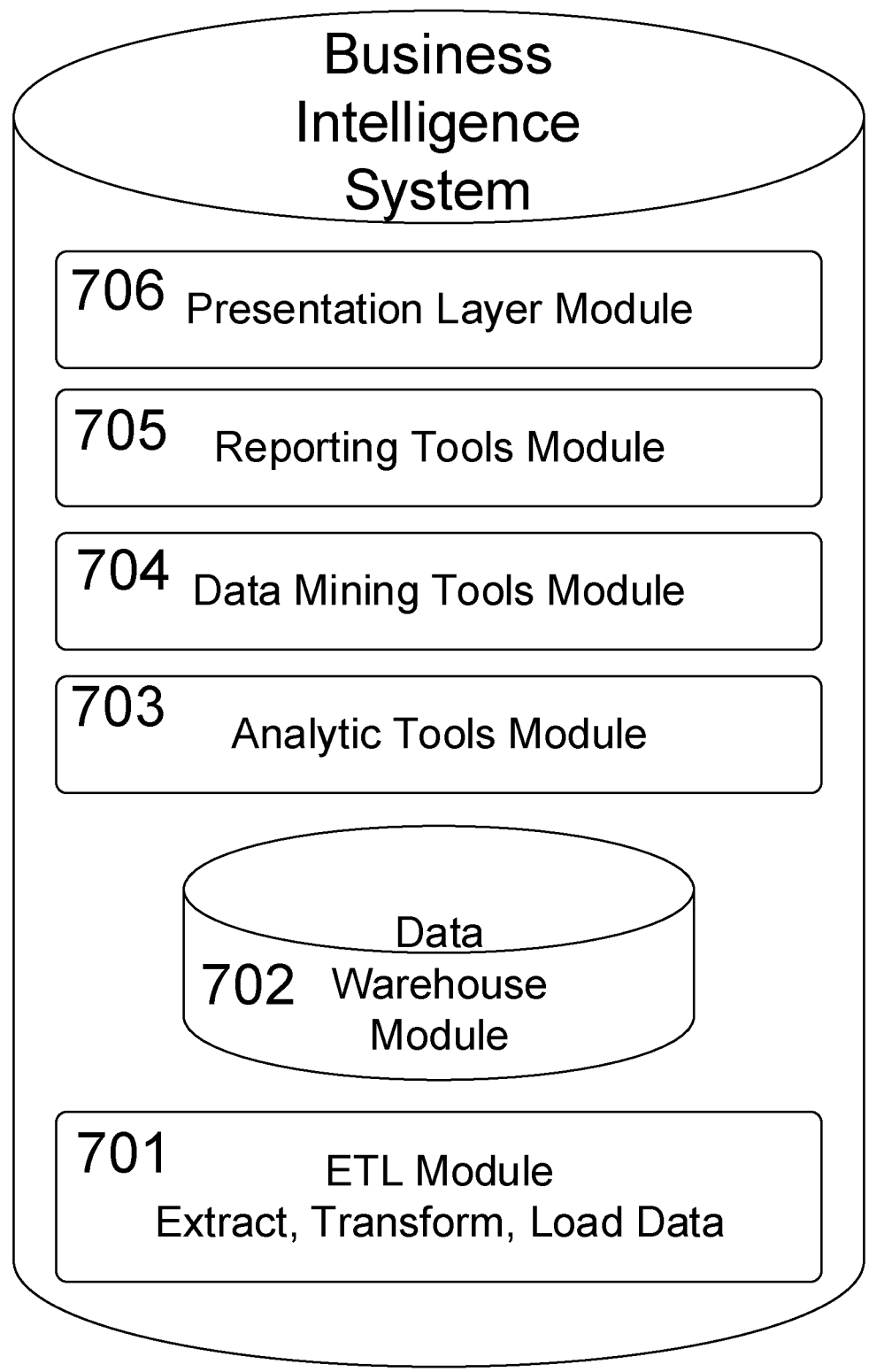
FIG. 7 illustrates a first embodiment of the business intelligence system ("BIS") of the present invention.

FIG. 7 illustrates the key components of the Business Intelligence System in a first embodiment of the apparatus and method of the present invention.

The Business Intelligence System is operatively coupled to the CCS. Many companies supply business intelligence systems that can be used by the present invention including Microstrategy and Oracle. The CCS uses the business intelligence system to analyze data stored in the plurality of databases that comprise the data storage system. The purpose of the analysis by the business intelligence system is to identify trends, patterns and relationships that may be hidden in the data stored in the data storage system.

The present invention uses a commercial Business Intelligence System that is illustrated in FIG. 7. It includes a plurality of modules including an extract, transform and data load "ETL" module 701, a data warehouse module 702, an analytic tools module 703, a data mining module 704, a reporting tools module 705 and a presentation layer module 706. The main purpose of a business intelligence system is to enable organizations to capture, process and analyze vast amounts of data from a plurality of sources then identify trends, patterns and relationships that can facilitate business decision-making.

The ETL module 701 is the interface between the Business Intelligence System and the CCS. The main purpose of the ETL module is to transfer data from the CCS to the data warehouse. Using ETL tools to operatively couple a system, such as the Business Intelligence System, to the CCS is explained above in the description of FIG. 2.

The data warehouse module 702 is a database built in a commercial storage system substantially the same as the data storage system described in FIG. 6. The data warehouse module contains a copy of a pre-determined subset of the total data that is available in the data storage system. The system administrator user specifies the data in the data storage system that the system administrator wants to use for business analysis. The installation engineer configures the ETL module to extract that pre-determined data from the source database in the data storage system, then configures the ETL module to transform that data into a format that is compatible with the data warehouse, then configures the ETL module to load the transformed data into the pre-determined database locations in the data warehouse module. The installation engineer also configures the ETL module to repeat this extract, transform and data load procedure periodically. Many vendors offer commercial data warehousing solutions including Hyperion, Microstrategy and Oracle.

The analytic tools module 703 includes standard on-line analytical processing ("OLAP") functionality. OLAP software enables users to create various views and representations of data in the data warehouse. OLAP functionality enables the system administrator user to access, analyze and model business issues and share the information that is in the data warehouse. Many vendors offer commercial data warehousing and OLAP solutions including Hyperion, Microstrategy and Oracle. The OLAP council creates OLAP standards.

The data mining tools module 704 enables the system administrator user to discover trends, patterns and relationships in the data stored in the data warehouse module. Data mining software is designed to analyze large volumes of data using sophisticated data search techniques then apply statistical methods to discover trends, patterns and relationships in the data. Many vendors offer commercial data mining software including Baan Software, Oracle, SAP, Sybase and Tableau Software. The Data Mining Group is an independent, vendor led consortium that develops data mining standards.

The reporting tools module 705 enables the system administrator user to create reports that display the data stored in the data warehouse as well as information that illustrates the trends, patterns and relationships in the data stored in the data warehouse module. Many vendors offer commercial reporting software including Business Objects, Cognos, Crystal Reports and Microstrategy.

The presentation layer module 706 includes graphics and multimedia interfaces that enable information and reports to be displayed in a user-friendly manner. The reporting tools described above all include a presentation layer module.

Figure 8:
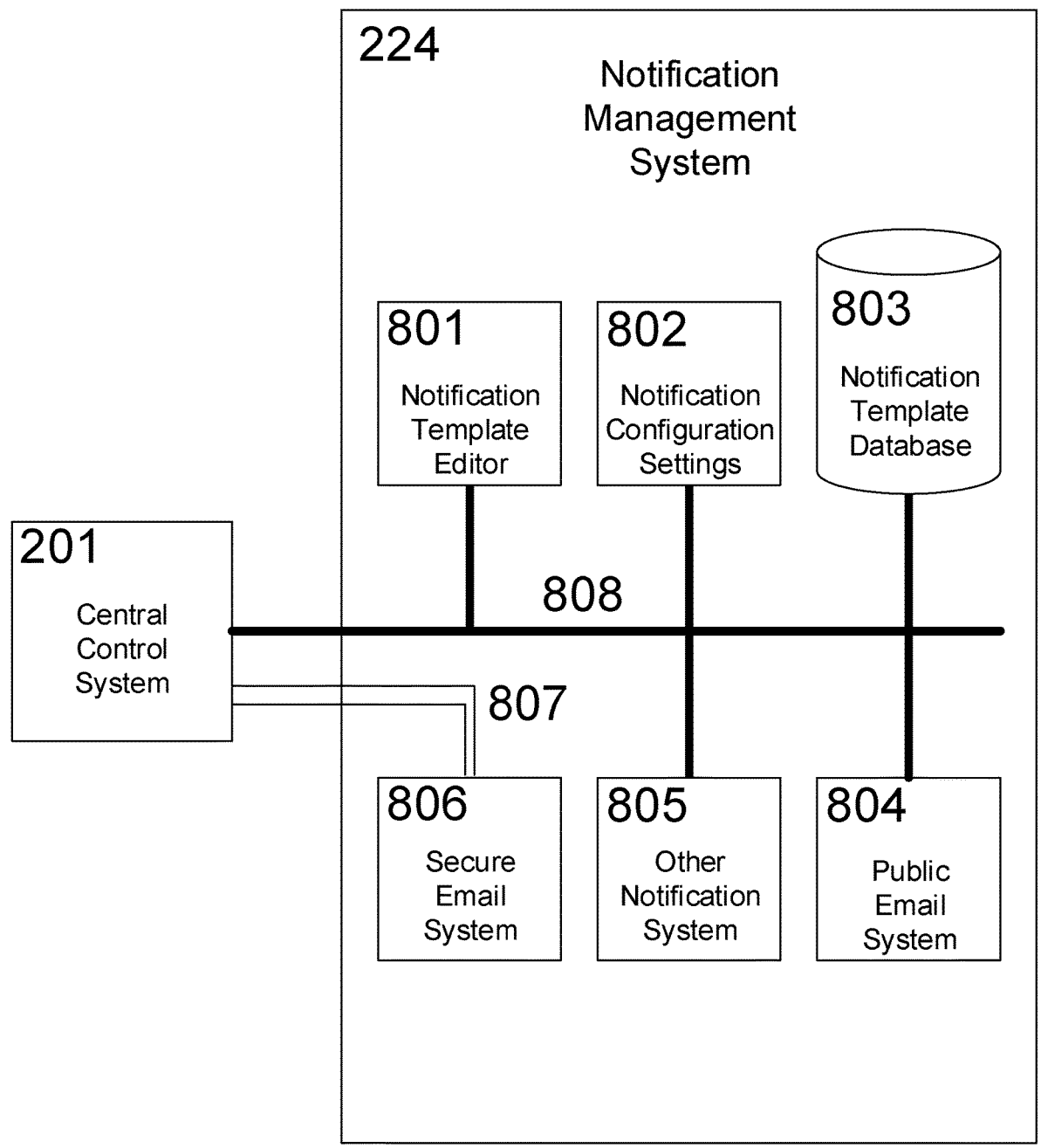
FIG. 8 illustrates a first embodiment of the notification management system ("NMS") of the present invention.

FIG. 8 illustrates the key components of the notification management system in a first embodiment of the apparatus and method of the present invention.

The notification management system 209 is operatively coupled to the CCS. The purpose of the notification management system is to send a notification whenever an event occurs that requires the attention of a user. The CCS sends a notification message via the notification management system to inform the recipient of the notification that a key event has occurred such as a payment has been made. The system administrator user configures the notification management system to monitor a plurality of other events then alert the pre-determined user when the specific event occurs.

FIG. 8 illustrates the Notification Management System used by the present invention. This Notification Management System includes a plurality of modules including a notification template editor 801, a notification configuration settings module 802, a notification template database 803, at least one public email system 804, at least one other notification system 805, a secure email system 806, a virtual private network (VPN) 807 and a wide area network 808.

The notification template editor 801 is a standard commercial word processor that the system administrator user can use to draft notification templates. The system administrator user then saves those templates into the notification template database 803. The system administrator inserts bookmarks into the notification template where information must be added to convert the template into an actual notification message. For example, the system administrator inserts a bookmark for the notification address (such as an email address) of the pre-determined user to whom the notification shall be sent.

The system administrator user uses the notification configuration settings module 802 to configure and enable the notifications. For example, in one embodiment of the present invention the system administrator user will configure a notification to be sent whenever a transaction is completed. The configuration information will include a plurality of information including the event (e.g., a completed deliverable), the contact information for the user to be notified, the title of the notification, information about the deliverable, and related meta data.

The notification template database 803 is used to store notification templates. For each notification template, the notification template database contains a plurality of fields including a unique reference key for each record, the unique reference key for the type of event for which the notification template shall be used, the title of the event, the standard message in the notification, the unique reference key for each user who shall receive the notification, the unique reference key for each user who shall receive a carbon copy of the notification and the unique reference key for each user who shall receive a blind copy of the notification. When a predetermined event occurs, the CCS will identify the pre-determined users to whom the notification shall be addressed, the predetermined users who shall receive a copy of the notification and the predetermined users who shall receive a blind copy of the notification. The CCS passes this information and a plurality of other information, such as the predetermined template to use for the specific event, to the notification management system that extracts information from the notification management database to fill in the blanks in the predetermined notification template.

The public email system 804 enables users to receive notifications from the CCS by email. It also enables users to send emails to the CCS. A plurality of public email systems are available to users including yahoo mail, hotmail, and gmail. When a user registers with the CCS, that user must input an email address that the CCS will use to send notifications.

To one skilled in the art, it will be evident that the CCS can use other notification systems 805 to notify users that an event has occurred. Other possible notification systems include instant messaging, text messages, telephone service, and wireless services. When the user registers with the CCS, the user can input their contact information for their alternative notification systems.

The secure email system 806 enables users to receive secure notifications from the CCS by email. It also enables users to send secure emails to the CCS. A plurality of vendors provide secure email services, such as Zix mail. When a user registers with the CCS, the CCS will give that user a secure email address. The CCS is connected to the secure email system by a virtual private network (VPN) 807. Commercial telephone companies such as Verizon provide virtual private networks.

These VPN circuits provide more security than a regular telephone circuit. The other components of the notification management system are interconnected by a combination of wide and local area networks 808. Such networks are described above in the discussion of FIG. 3.

When an event occurs that requires a notification that does not include sensitive information, the CCS will send the notification to the user's secure email address and also to the user's public email address. When an event occurs that requires a notification that does include sensitive information then the CCS will send the notification to the user's secure email address. The CCS will also send a different notification to the user's public email address informing that user that a secure notification message has been sent to that user's secure email address. The user will then log in to the CCS to access the secure notification.

Figure 9:
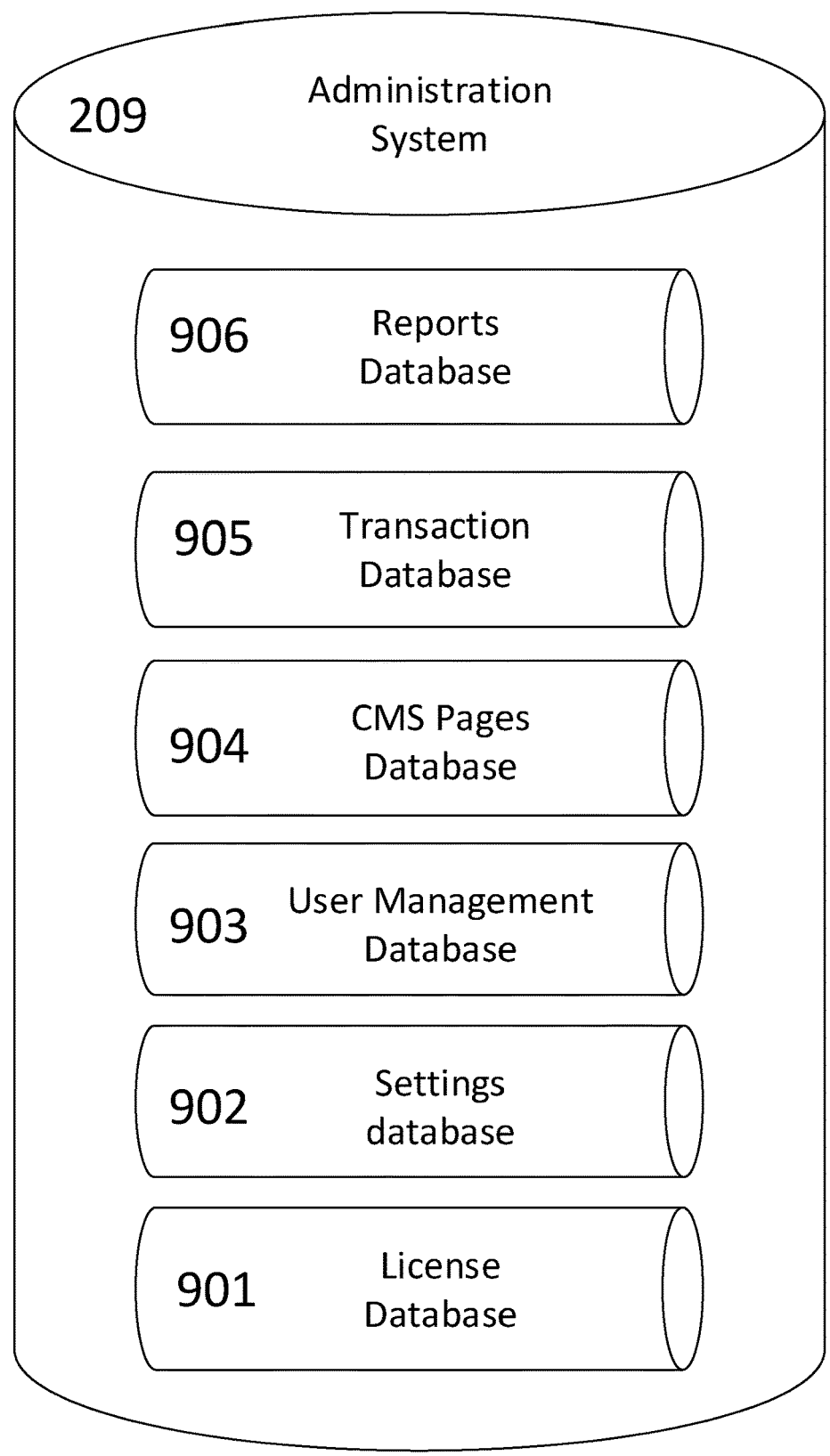
FIG. 9 illustrates a first embodiment of the administration system of the present invention.

FIG. 9 illustrates the key components of the Administration System which is operatively coupled to the Central Control System. The Administration System used by the present invention is comprised of a plurality of modules including a license database 901, a settings database 902, a user management database 903, a CMS pages database 904, a transactions database 905, and a reports database 906.

The license database 901 stores information about which users are authorized to use the present invention. The license database contains a plurality of fields including a unique reference key for each record in the license database, the unique reference key of each user, and licensing and payment information for each user.

The settings database 902 stores configuration information for the present invention.

The user management database 903 stores information about users. This information includes the type of user, contact information, and the user's status such as active or inactive.

The CMS pages database 904 stores information about the web site pages and mobile user interface for the present invention. This module enables the system administrator to edit the content on these pages. Example pages include "About Us", "Frequently Asked Questions", "Home", and the "User Agreement".

The transactions database 905 stores information about system transactions in the present invention.

The reports database 906 stores information about reports in the present invention. These reports help the system administrator manage the present invention. Example reports include the amount of the available storage used, peak and average CPU utilization in system servers, and peak and average number of users.

Preferred Embodiment of the Present Invention

Figure 10:
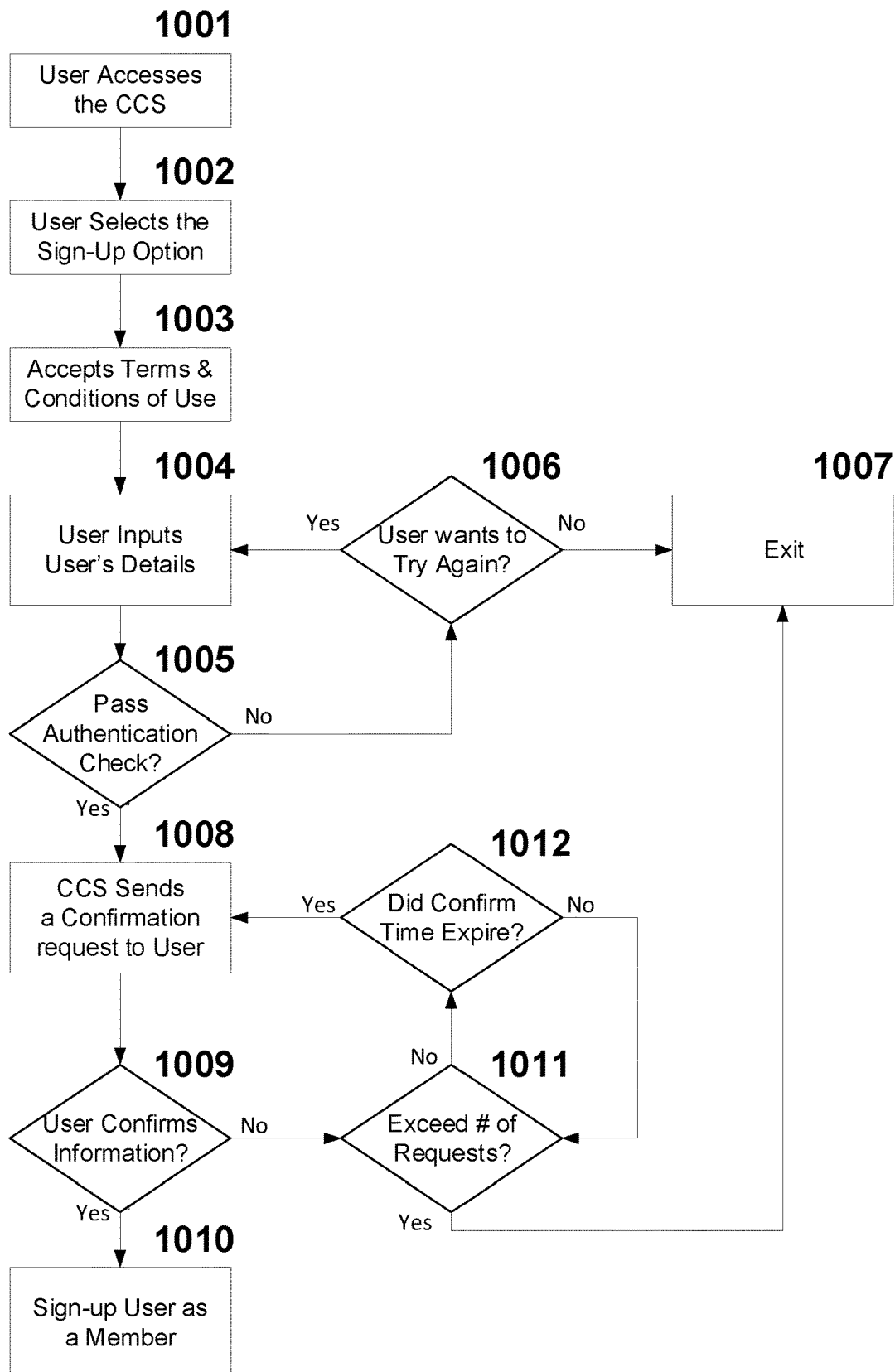
FIG. 10 illustrates a first embodiment of the sign-up procedure for the present invention.

FIG. 10 illustrates the procedure for users to sign-up in a first embodiment of the apparatus and method of the present invention.

The user accesses the CCS 1001 then selects the sign-up option 1002. The user then accepts the predetermined terms and conditions of use 1003. The user then inputs the requested user details 1004. These details include name, contact information, user name, password and the other meta data specified above for the user database illustrated in FIG. 6. When the user accesses the CCS after signing up, that user will have to input the user name and password to log into the CCS. The user can also select at least one of a plurality of multi factor authentication options, such as a biometric signature, an email confirmation or a text message to supplement, or replace, the standard login credentials. The CCS authenticates the information entered by the user at step 1004 for completeness. If the information is incomplete 1005, the CCS will offer the user the opportunity to complete the information 1006. If the user chooses to try again to complete the information, the CCS returns to step 1004. If the user chooses not to complete the sign-up information, the CCS exits the sign-up procedure 1007.

If the information entered by the user is complete 1005, the CCS sends a confirmation request to the user 1008. The CCS will send this confirmation request to the email address, or other validation option, entered by the user at step 1004. For example, the user can also select to authenticate using a text message rather than an email. The CCS asks the user to confirm receipt of this request 1009. If the user confirms receipt of the confirmation request as requested by the CCS, the CCS will sign-up the user as a member 1010. If the user does not confirm receipt of the confirmation request, the CCS will determine whether the predetermined maximum number of reminder requests have been exceeded 1011. If the CCS has already sent the predetermined maximum number of confirmation requests, then the CCS will exit the sign-up procedure 1007. If the CCS has sent fewer than the predetermined maximum number of confirmation requests, then the CCS will determine whether the predetermined wait time has been exceeded 1012 before sending another confirmation request to the user. After the predetermined wait time between reminders has been exceeded 1012, the CCS will send another confirmation request to the user 1008. This will return the CCS to step 1008 in the sign-up procedure.

Figure 11:
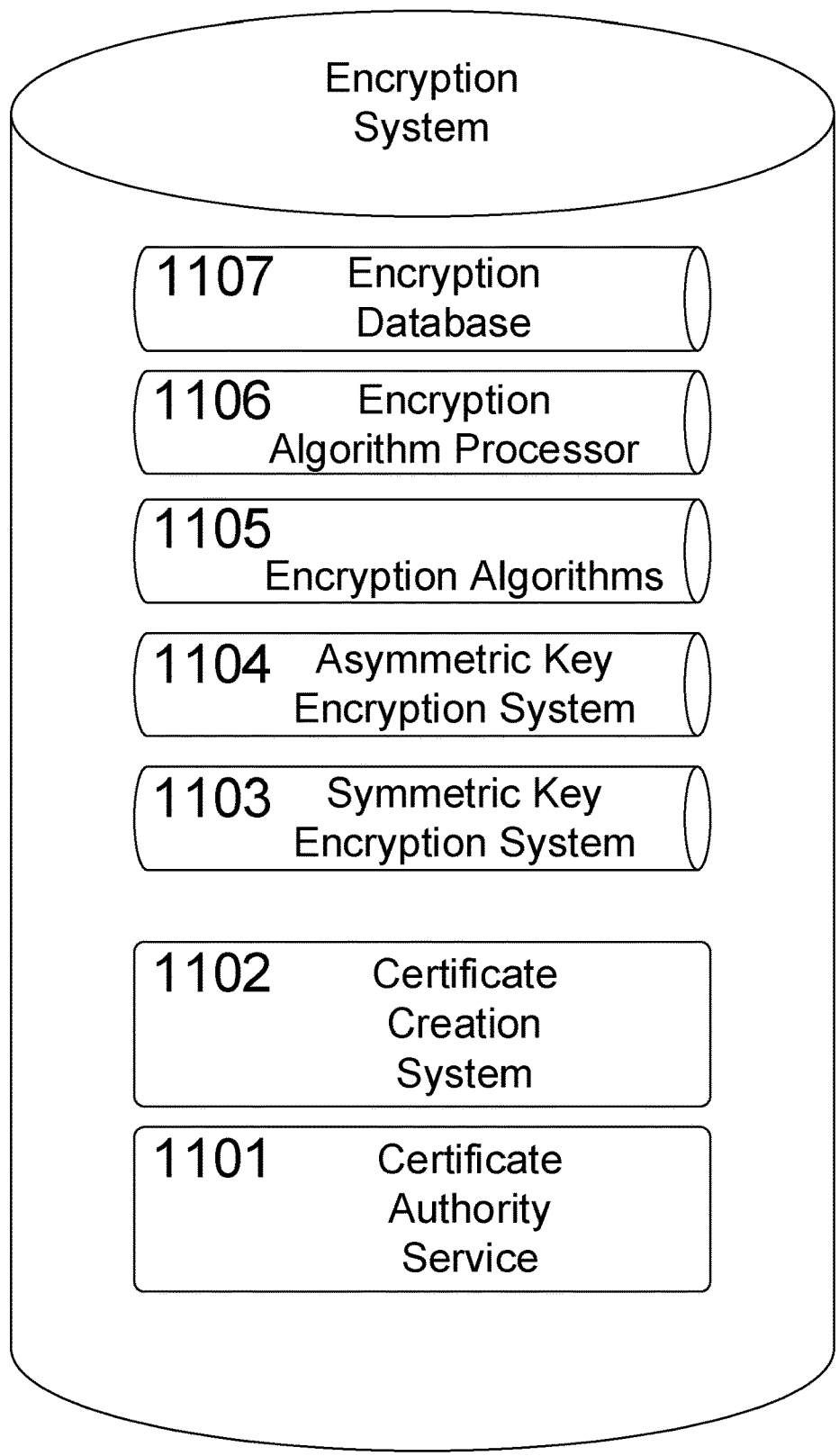
FIG. 11 illustrates a first embodiment of the encryption system of the present invention.

FIG. 11 illustrates the key components of the Encryption System which is operatively coupled to the Central Control System. The Encryption System used by the present invention is comprised of a plurality of modules including a certificate authority service 1101, a certificate creation system 1102, a symmetric encryption key encryption system 1103, an asymmetric key encryption system 1104, encryption algorithms 1105, an encryption algorithm processor 1106, and an encryption database 1107.

The certificate authority service 1101 is independent of both users who want to communicate. However, it is a source that is trusted by both users and confirms that they both are who they say they are. In addition, the certificate authority service provides the public encryption keys to each user. In summary, the certificate authority service authenticates the users and the fact that the authorization has not been altered.

Authentication is used with encryption to create a secure communication environment. Standard authentication systems include user name and password, pass cards that use a magnetic strip similar to that on a credit card, smart cards that have an embedded chip, and digital signatures based on the Digital Signature Standard (DSS) that uses the Digital Signature Algorithm (DSA). More modern forms of encryption use biometrics for authentication. Biometrics use biological information to verify a user's identity. Biometric authentication methods include fingerprint scans, retina scans, face scans and voice identification. Biometric authentication eliminates many of the risks associated with not knowing who is using an authenticated input or output device. Biometric authentication therefore provides an additional level of security over device level authentication for secure personal communications.

The certificate creation system 1102 generates a certificate for each user in the form of a piece of code, or a large number, that says that the user is trusted by the certificate authority. For example, when a first user sends a secure message to a second user that first user also sends his public encryption key and certificate to the second user. This allows the second user to validate three things: 1) that the certificate comes from a trusted party; 2) that the certificate is currently valid; and 3) that the certificate has a relationship with the present invention.

The symmetric key encryption system 1103 generates a secret code for each user. The encryption system uses this secret code, or encryption key, to encrypt information. Modern encryption systems use the advanced encryption standard (AES), which uses 128-, 192- or 256-bit encryption keys. These create more than $2^{128}$ possible key combinations for the encryption key. For a hacker trying to guess the encryption key, this is like trying to find one specific grain of sand in the Sahara Desert. It would take a hacker so long to guess the correct key combination that this encryption standard is considered to be secure for the foreseeable future. For symmetric key encryption, the same key is used to encrypt and decrypt a message. The use of symmetric encryption keys and asymmetric encryption keys in the present invention is described below.

The asymmetric key encryption system 1104 generates two secret codes for each user, a public encryption key and a private encryption key. When a first user wants to send an encrypted message to a second user but does not want to risk sending the encryption key then they use the asymmetric key encryption system. The use of symmetric encryption keys and asymmetric encryption keys in the present invention is described below. For example, in the present invention, when a first user wants to send a symmetric encryption key to a second user, that first user uses the public encryption key of the selected second user to encrypt the symmetric encryption key. The second user then uses his or her private encryption key to decrypt the symmetric encryption key. This is possible because an encryption algorithm is used where the algorithm, or function "F" is such that, F(clear symmetric encryption key, first user's public encryption key)=encrypted symmetric encryption key and F(encrypted symmetric encryption key, first user's private encryption key)=clear symmetric encryption key. Therefore, by using the same algorithm ("F") a user's private encryption key can be used to decrypt the symmetric encryption key that was encrypted by the same user's public encryption key (U.S. Pat. No. 8,374,354 B2). One advantage of the present invention is that the encryption and decryption are performed at the user interface preferably initiated by biometrics. For confidential information, the present invention only has access to the encrypted version of the symmetric encryption key and cannot decrypt the symmetric encryption key. The symmetric encryption key is used to encrypt and decrypt the information. In other systems, encryption is used to secure the transmission of digital media from the user to the system. This enables confidential information to be decrypted by the system operator which creates the risk of hacking supported by rogue employees of the system operator.

The present invention uses a specific encryption algorithm however, a number of different encryption algorithms 1105 have been created that can be used by the present invention. Symmetric key encryption algorithms include The Data Encryption Standard (DES) was adopted as a U.S. government standard in 1977 and as an ANSI standard in 1981. Triple-DES is a way to make the DES dramatically more secure by using the DES encryption algorithm three times with three different keys, for a total key length of 168 bits.

Also called "3DES," this algorithm has been widely used by financial institutions and by the Secure Shell program (ssh). Blowfish is a fast, compact, and simple block encryption algorithm invented by Bruce Schneier. The algorithm allows a variable-length key, up to 448 bits, and is optimized for execution on 32- or 64-bit processors. The algorithm is unpatented and has been placed in the public domain. Blowfish is used in the Secure Shell and other programs. Asymmetric key encryption algorithms include the Rivest Shamir Adleman (RSA) public encryption key algorithm that can be used for encrypting and signing data and Elliptic Curve Cryptography (ECC) which provides similar functionality to RSA for smaller devices like cell phones. It requires less computing power than RSA. ECC encryption systems are based on the idea of using points on a curve to define the public/private encryption key pair. The present invention can use these and other standard encryption algorithms.

The encryption algorithm processor 1106 is the code that is used to encrypt and decrypt information. The present invention includes its own code for these purposes and also can use other code considered to comply with industry standards. By way of example, sample code that was published by syntx.io includes the following to encrypt a message using AES as the algorithm:

```
public static final String encrypt(final String message,
    final Key key, final IvParameterSpec iv) throws Ille-
    galBlockSizeException,
BadPaddingException, NoSuchAlgorithmException,
NoSuchPaddingException, InvalidKeyException,
UnsupportedEncodingException,
InvalidAlgorithmParameterException {
    Cipher cipher=
Cipher.getInstance("AES/CBC/PKCS5Padding");
    cipher.init(Cipher.ENCRYPT_MODE,key,iv);
    byte[ ] stringBytes=message.getBytes( );
    byte[ ] raw=cipher.doFinal(stringBytes);
    return Base64.encodeBase64String(raw);
}
```

The same example from syntx.io published the following code to decrypt the message:

```
public static final String decrypt(final String encrypted,
    final Key key, final IvParameterSpec iv) throws
    InvalidKeyException,
NoSuchAlgorithmException, NoSuchPaddingException,
IllegalBlockSizeException,    BadPaddingException,
    IOException, InvalidAlgorithmParameterException {
    Cipher        cipher=Cipher.getInstance("AES/CBC/
        PKCS5Padding");
    cipher.init(Cipher.DECRYPT_MODE, key,iv);
    byte[ ] raw=Base64.decodeBase64(encrypted);
    byte[ ] stringBytes=cipher.doFinal(raw);
    String clearText=new String(stringBytes, "UTF8");
    return clearText;
}
```

It will be evident to one skilled in the art that more robust algorithms are available for use, can be developed, and can be used by the present invention.

The encryption database 1107 is substantially the same as the encryption database in FIG. 6. It stores the encryption information required by the other modules described above that comprise the encryption system.

Figure 12:
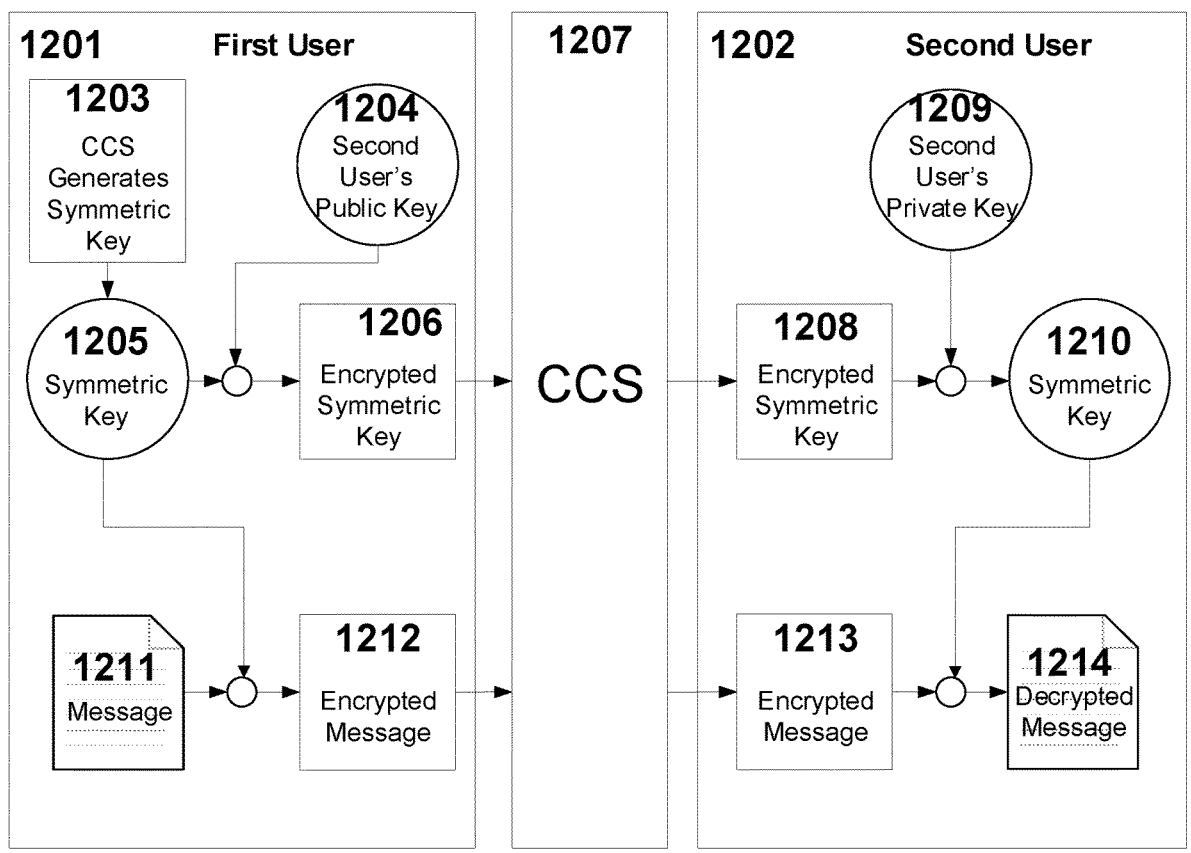
FIG. 12 illustrates a first embodiment of the high level encryption approach for the present invention.

FIG. 12 illustrates the preferred procedure to send a message from a first user 1201 to a second user 1202 through the CCS. When the first user and second user register on the system they download the CCS front end application onto their computer 301. The CCS application is created using standard programming languages such as java, javascript, PHP, HTML, C, C+, and visual basic. The CCS also gives the first user and second user their own symmetric encryption key, private encryption key and public encryption key as described above for the encryption system. The first user and the second user both use the CCS to make their public encryption keys available to other users. When the first user wants to send a message to the second user, the CCS application in the first user's computer 301 generates a new symmetric encryption key 1203 for this transaction. The CCS then uses the second user's public encryption key 1204 to encrypt the symmetric encryption key 1205 and create an encrypted symmetric encryption key 1206. The CCS 1307 then transfers the encrypted symmetric encryption key from the first user to the second user. The CCS front end application on the second user's computer receives the encrypted symmetric encryption key 1208 then uses the second user's private encryption key 1209 to decrypt the encrypted symmetric encryption key and recover the symmetric encryption key 1210 that was generated by the CCS application on the first user's computer for this transaction.

The CCS application on the first user's computer also uses the same symmetric encryption key 1205 to encrypt the target message 1211 and form an encrypted message 1212. The CCS 1207 then transfers the encrypted message from the first user to the second user. The CCS's front end application on the second user's computer receives the encrypted message 1213 then uses the second user's symmetric encryption key 1210 to decrypt the encrypted message and recover the original message 1214 that was sent by the CCS application on the first user's computer. The symmetric encryption key and message cannot be accessed by employees or partners of the CCS platform which minimizes the risk of unauthorized decryption.

Asymmetric encryption is slower than symmetric encryption. The CCS application therefore uses the public encryption key and private encryption key to encrypt and decrypt the symmetric encryption key because the symmetric encryption key is typically much smaller than the user's message. This is a secure method for the CCS to transfer the symmetric encryption key from the first user to the second user. This solution also enables the CCS application to use the faster symmetric key encryption method to encrypt and decrypt the target message that is typically much larger than the symmetric encryption key.

FIG. 13 illustrates the preferred procedure to input and output a secure authorization 1301, such as a user password, crypto currency address including the private and public encryption keys, an authentication certificate for digital media or a reference file for biometric authentication. The CCS application on a first user's computer generates a unique symmetric encryption key 1302 to encrypt each authorization message 1303. The CCS front end application on the user's device generates a different symmetric encryption key for each message. The CCS application on the first user's computer then decomposes the authorization message into a number of subcomponents 1304. A number of tools are available to split a file into subcomponents, such as WinRar and HJSplit. For example, WinRar allows the user to specify the size of each subcomponent. The example in FIG. 13, decomposes the message 1304 into 5 subcomponents Sub1 1305, Sub2 1306, Sub3 1307, Sub4 1308, and Sub5 1309 in that order. It also sets the "last subcomponent flag" to "False" for Sub1 1305, Sub2 1306, Sub3 1307, and Sub4 1308 but sets the "last subcomponent flag" to "True" for Sub5 1309 because Sub5 1309 is the last subcomponent of message 1304. It also sets the counter=1 for Sub1 1305, counter=2 for Sub2 1306, counter=3 for Sub3 1307, counter=4 for Sub4 1308 and counter=5 for Sub5 1309. The CCS application on the first user's computer randomly selects three computers, Comp412 1314, Comp987 1319, and Comp682 1324, from a predetermined list of member computers. Each organization that wants to use this dynamic process to decompose encrypted messages can propose a computer to participate in the consortium of member computers. After the system administrator vets the organization and vets the proposed computer, for performance, security and other features, then the vetted computer is added to the list of member computers. The CCS application on the first user's computer, writes the first subcomponent 1305 of the decomposed encrypted authorization message and the counter value (e.g., 1) and the "last subcomponent flag" (e.g., "False") from subcomponent1 (Sub1) to computer 412 (Comp412) 1314. It also writes the same subcomponent1 (Sub1), counter value and "last subcomponent flag" to computer 987 (Comp987) 1319 and the same subcomponent1 (Sub1), counter value and "last subcomponent flag" to computer 662 (Comp662) 1324.

Computer 412 (Comp412) 1314 then randomly selects another computer from the predetermined list of member computers, namely computer (Comp993) 1315 and remembers that next computer in sequence. Computer 412 (Comp412) 1314 then instructs the CCS application on the first user's computer to copy subcomponent2 (Sub2), the counter value (e.g., 2) and the "last subcomponent flag" (e.g., "False") 1306 to computer 993 (Comp993) 1315. When Computer 412 (Comp412) 1314 makes this request, it increments its own counter by 1 (e.g., 1+1=2) to know which subcomponent (e.g., Sub2) to request from block 1304 to be sent to computer 993 (Comp993) 1315. Similarly, Computer 987 (Comp987) 1319 randomly selects another computer from the predetermined list of member computers, namely computer 199 (Comp199) 1320 and remembers that next computer in sequence. Computer (Comp987) 1319 then instructs the CCS application on the first user's computer to copy subcomponent2 (Sub2), the counter value (e.g., 2) and the "last subcomponent flag" (e.g., "False") 1306 to computer 199 (Comp199) 1320. Further, Computer 662 (Comp662) 1324 randomly selects another computer from the predetermined list of member computers, namely computer (Comp111) 1325 and remembers that next computer in sequence. Computer 662 (Comp662) 1324 then instructs the CCS application on the first user's computer to copy subcomponent2 (Sub2), the counter value (e.g., 2) and the "last subcomponent flag" (e.g., "False") 1306 to computer 111 (Comp 111) 1325. Computers 987 (Comp987) 1319 and 662 (Comp662) 1324 both increment their own counter+1 (e.g., 1+1=2) to determine which subcomponent (e.g., Sub2) to request from block 1304.

Computer 993 (Comp993) 1315 then randomly selects another computer from the predetermined list of member computers, namely computer (Comp567) 1316 and remembers that next computer in sequence.

Computer 993 (Comp993) 1315 then instructs the CCS application on the first user's computer to copy subcomponent3 (Sub3), the counter value (e.g., 3) and the "last subcomponent flag" (e.g., "False") 1307 to computer 567 (Comp567) 1316. When Computer 993 (Comp993) 1315 makes this request, it uses its own counter+1 (e.g., 2+1=3) to determine which subcomponent (e.g., Sub3) to request from block 1304 to be sent to computer 567 (Comp567) 1316. Similarly, Computer 199 (Comp199) 1320 randomly selects another computer from the predetermined list of member computers, namely computer 867 (Comp867) 1321 and remembers that next computer in sequence. Computer (Comp199) 1320 then instructs the CCS application on the first user's computer to copy subcomponent3 (Sub3), the counter value (e.g., 3) and the "last subcomponent flag" (e.g., "False") 1307 to computer 867 (Comp867) 1321. Further, Computer 111 (Comp 111) 1325 randomly selects another computer from the predetermined list of member computers, namely computer (Comp573) 1326 and remembers that next computer in sequence. Computer 111 (Comp111) 1325 then instructs the CCS application on the first user's computer to copy subcomponent3 (Sub3), the counter value (e.g., 3) and the "last subcomponent flag" (e.g., "False") 1307 to computer 573 (Comp573) 1326. Computers 199 (Comp199) 1320 and 111 (Comp111) 1325 both increment their own counter+1 (e.g., 2+1=3) to determine which subcomponent (e.g., Sub3) to request from block 1304.

Computer 567 (Comp567) 1316 then randomly selects another computer from the predetermined list of member computers, namely computer (Comp 113) 1317 and remembers that next computer in sequence. Computer 567 (Comp567) 1316 then instructs the CCS application on the first user's computer to copy subcomponent4 (Sub4), the counter value (e.g., 4) and the "last subcomponent flag" (e.g., "False") 1308 to computer 113 (Comp 113) 1317. When Computer 567 (Comp567) 1316 makes this request, it uses its own counter+1 (e.g., 3+1=4) to determine which subcomponent (e.g., Sub4) to request from block 1304 to be sent to computer 113 (Comp 113) 1317. Similarly, Computer 867 (Comp867) 1321 randomly selects another computer from the predetermined list of member computers, namely computer 188 (Comp188) 1322 and remembers that next computer in sequence. Computer (Comp867) 1321 then instructs the CCS application on the first user's computer to copy subcomponent4 (Sub4), the counter value (e.g., 4) and the "last subcomponent flag" (e.g., "False") 1308 to computer 188 (Comp188) 1322. Further, Computer 573 (Comp573) 1326 randomly selects another computer from the predetermined list of member computers, namely computer (Comp333) 1327 and remembers that next computer in sequence.

Computer 573 (Comp573) 1326 then instructs the CCS application on the first user's computer to copy subcomponent4 (Sub4), the counter value (e.g., 4) and the "last subcomponent flag" (e.g., "False") 1308 to computer 333 (Comp333) 1327. Computers 867 (Comp867) 1321 and 573 (Comp573) 1326 both increment their own counter+1 (e.g., 3+1=4) to determine which subcomponent (e.g., Sub4) to request from block 1304.

Computer 113 (Comp 113) 1317 then randomly selects another computer from the predetermined list of member computers, namely computer (Comp123) 1318 and remembers that next computer in sequence.

Computer 113 (Comp 113) 1317 then instructs the CCS application on the first user's computer to copy subcomponent5 (Sub5), the counter value (e.g., 5) and the "last subcomponent flag" (e.g., "True") 1309 to computer 123 (Comp123) 1318. When Computer 113 (Comp 113) 1317 makes this request, it uses its own counter+1 (e.g., 4+1=5) to determine which subcomponent (e.g., Sub5) to request from block 1304 to be sent to computer 123 (Comp123) 1318. Similarly, Computer 188 (Comp188) 1322 randomly selects another computer from the predetermined list of member computers, namely computer 777 (Comp777) 1323 and remembers that next computer in sequence. Computer (Comp188) 1322 then instructs the CCS application on the first user's computer to copy subcomponent5 (Sub5), the counter value (e.g., 5) and the "last subcomponent flag" (e.g., "True") 1309 to computer 777 (Comp777) 1323. Further, Computer 333 (Comp333) 1327 randomly selects another computer from the predetermined list of member computers, namely computer 331 (Comp331) 1328 and remembers that next computer in sequence. Computer (Comp333) 1327 then instructs the CCS application on the first user's computer to copy subcomponent5 (Sub5), the counter value (e.g., 5) and the "last subcomponent flag" (e.g., "True") 1309 to computer 331 (Comp331) 1328. Computers 188 (Comp188) 1322 and 333 (Comp333) 1327 both increment their own counter+1 (e.g., 4+1=5) to determine which subcomponent (e.g., Sub5) to request from block 1304.

Block1 1310 is a copy of the encrypted authorization message distributed across five random computers. Block2 1311 is a second copy of the encrypted authorization message distributed across five different random computers. Block3 1312 is a third copy of the encrypted authorization message distributed across five more random computers. None of the computers in each block know all of the other computers in the block. For example, Comp993 1315 only knows that Comp567 1316 is the next computer in the chain after itself for Block1. It does not know that Comp 113 1317 is the next computer after Comp567 1316. This makes the solution more secure because a hacker would have to break into many independent computers to recover the encrypted information then that hacker would need to figure out how to reconstruct the messages and also figure out how to decrypt the information. This additional security is appropriate for the storage of referenceable personal identifiable information such as customer biometrics and crypto currency addresses. After a pre-determined period of time, one day say, the CCS application on the first user's computer randomly selects another computer 1329 from a predetermined list of member computers. The CCS application on the first user's computer, writes the first subcomponent of the decomposed encrypted authorization message from subcomponent1 (Sub1), the counter value (e.g., 1) and the "last subcomponent flag" (e.g., "False") 1305 to computer 772 1329. Similar to above, computer 772 (Comp772) 1329 randomly selects another computer from the predetermined list of member computers, namely computer 623 (Comp623) 1330, and remembers that next computer in sequence, then instructs the CCS application on the first user's computer to copy subcomponent2 (Sub2), the counter value (e.g., 2) and the "last subcomponent flag" (e.g., "False") 1306 to computer 623 (Comp623) 1330. Similar to above, computer 623 (Comp623) 1330 randomly selects another computer from the predetermined list of member computers, namely computer 327 (Comp327) 1331, and remembers that next computer in sequence, then instructs the CCS application on the first user's computer to copy subcomponent3 (Sub3), the counter value (e.g., 3) and the "last subcomponent flag" (e.g., "False") 1307 to computer 327 (Comp327) 1331. Similar to above, computer 327 (Comp327) 1331 randomly selects another computer from the predetermined list of member computers, namely computer (Comp449) 1332, and remembers that next computer in sequence, then instructs the CCS application on the first user's computer to copy subcomponent4 (Sub4), the counter value (e.g., 4) and the "last subcomponent flag" (e.g., "False") 1308 to computer 449 (Comp449) 1332. Similar to above, computer 449 (Comp449) 1332 randomly selects another computer from the predetermined list of member computers, namely computer 563 (Comp563) 1333, and remembers that next computer in sequence, then instructs the CCS application on the first user's computer to copy subcomponent5 (Sub5), the counter value (e.g., 5) and the "last subcomponent flag" (e.g., "True") 1309 to computer 563 (Comp563) 1333. This flag indicates that subcomponent5 is the final subcomponent that comprises the authorization message 1301.

Block4 1313 is a fourth copy of the encrypted authorization message distributed across five random computers. The CCS instructs the CCS application on the first user's computer to delete Bock 1 1310 by discarding subcomponent1 (Sub1) from computer 412 (Comp412) 1314. Computer 412 (Comp412) 1314 then instructs Computer 993 (Comp993) 1315 to discard subcomponent2 (Sub2) from computer 993 (Comp993) 1315. Computer 993 (Comp993) 1315 then instructs Computer 567 (Comp567) 1316 to discard subcomponent3 (Sub3) from computer 567 (Comp567) 1316. Computer 567 (Comp567) 1316 then instructs Computer 113 (Comp 113) 1317 to discard subcomponent4 (Sub4) from computer 113 (Comp 113) 1317. Computer 113 (Comp113) 1317 then instructs Computer 123 (Comp123) 1318 to discard subcomponent5 (Sub5) from computer 123 (Comp123) 1318. In the example illustrated in FIG. 13, on Day 1 Block1, Block2 and Block3 form three copies of the decomposed messages. On Day 2, Block4 is created and Block1 is deleted. This process of creating a new block and deleting an old block continues until the message is no longer required. This causes the three copies of the decomposed message to keep moving dynamically throughout the network of member computers making the information more difficult to find for a hacker.

In order for the CCS application on the second user's computer (such as a pharmacist reviewing a prescription, an intellectual property user reviewing an authentication certificate, a user authenticating a biometric parameter or a user accessing the blockchain address for their digital currency) to reconstruct the authorization message, the CCS application on the first user's computer (such as the prescribing doctor or intellectual property owner of payment sender for a digital currency) sends a unique authorization identifier ("authorization ID") to the second user (pharmacist or intellectual property user or payment receiver). Alternatively, the first user (e.g., the doctor or intellectual property owner or payment sender) can give the authorization identifier to the patient or intellectual property reseller or payment receiver who can forward it to the pharmacist or intellectual property user or keep it for themselves. The pharmacist or intellectual property user or payment receiver uses the unique authorization identifier to request the authorization (e.g., request the prescription or authentication certificate or blockchain address). User 1 and user 2 can be the same person for applications, such as warm storage for a crypto currency blockchain address. The CCS verifies the unique authorization identifier, which can be a biometric signature if user 1 and user are the same person, then copies subcomponent1 (Sub1) from computer 772 (Comp772) 1329 to the second user's computer 1335. Similarly, computer 772 (Comp772) 1329 knows that computer 623 (Comp623) 1330 is the next computer in Block4 and instructs computer 623 (Comp623) 1330 to write subcomponent2 (Sub2) to the second user's computer 1336. Similarly, computer 623 (Comp623) 1330 knows that computer 327 (Comp327) 1331 is the next computer in Block4 and instructs computer 327 (Comp327) 1331 to write subcomponent3 (Sub3) to the second user's computer 1337. Similarly, computer 327 (Comp327) 1331 knows that computer 449 (Comp449) 1332 is the next computer in Block4 and instructs computer 449 (Comp449) 1332 to write subcomponent4 (Sub4) to the second user's computer 1338. Similarly, computer 449 (Comp449) 1332 knows that computer 563 (Comp563) 1333 is the next computer in Block4 and instructs computer 563 (Comp563) 1333 to write subcomponent5 (Sub5) to the second user's computer 1339. Computer (Comp563) 1333 knows that it is the final computer in the chain because its "last subcomponent flag" is set to "True" indicating that subcomponent5 is the final subcomponent that comprises the authorization message 1301. The second user can alternatively reconstruct the message from the computers in Block3 or Block2 in addition to Block4. For more robust applications, the solution can be configured to recover all three versions of the message and take a consensus of the three copies to minimize even further the possibility of data corruption impacting the results.

The CCS application on the second user's computer then uses the same decomposition application, such as WinRar or HJSplit, to reconstruct the encrypted authorization message 1340. The CCS application on the first user's computer uses the second user's public encryption key 1341 to encrypt the symmetric encryption key 1302. The first user then uses the CCS to send the encrypted symmetric encryption key to the second user. The CCS application on the second user's computer then uses her private encryption key 1342 to decrypt the symmetric encryption key 1343. The CCS application on the second user's computer then uses the symmetric encryption key 1343 to decrypt the authorization message 1344.

The example in FIG. 13, illustrates three copies of the authorization message one in each of Block1 1310, Block2 1311 and Block3 1312. In the present invention, the number of replicated messages can be reduced to 1 or 2 or increased to more than 3 to provide more or less redundancy in order to match the specific needs of each business requirement. In addition, the encrypted message can be decomposed into fewer than 5 subcomponents or more than 5 subcomponents. Also, user 1 and user 2 can be the same user, such as in the case of warm storage of a crypto currency address. In this case, the user can use a biometric signature to initiate the encryption and decomposition process then use their biometric signature to initiate the reconstruction and decryption process. Steps 1341 and 1342 would not be required because the symmetric key in step 1302 could be seeded from user 1's biometric signature and the symmetric key in step 1343 could be seeded from user 2's biometric signature but user 1 and user 2 are the same person.

A user can create a bitcoin address, or address for an alternative crypto currency, by using the standard process they follow for cold storage. That user can then use his finger print, or other biometric signature, to initiate the process for the present invention's authentication system to encrypt and decompose that bitcoin address. The user can then use the public key to add digital currency (e.g., bitcoin) to that bitcoin address. When the user wants to spend the bitcoin, the user will use his fingerprint to initiate the present invention's authentication system to recombine then decrypt the bitcoin address. The user can then access the address and spend the bitcoin. For security purposes, the user should not use that bitcoin address again. The most secure approach is to create a new bitcoin address and repeat the process. To one skilled in the art, it will be evident that this enhanced security process has applications beyond crypto currency authentication to include any application where an authentication code, or critical data string, requires additional security. In the present invention, this authentication information is used to access a sealed container that contains a valuable authenticated natural resource, such as a gold bar.

FIG. 13 illustrates the unique solution that secures authentication information by encrypting that information, decomposing it into subcomponents then distributing those subcomponents across member computers. This works well when all of the member computers are mostly available for intercommunication. However, in the present invention, each member computer and database is embedded into a sealed container that contains a valuable authenticated natural resource, such as a gold bar. At times, this sealed container will be disconnected from the network of member computers. For example, this may occur when the container, that contains the natural resource, is being transported from a source warehouse in a first country to a destination warehouse in a second country. The period in transit creates an opportunity for a hacker to hack into the container's computer and database without the knowledge of the other member computers. To prevent this, the antihacking solution described in FIG. 13 is replicated within the database of each container that comprises one node in the distributed database. To achieve this, each container's database is configured as a plurality of independent, logical partitions. U.S. Pat. No. 8,271,545B2 teaches a method to partition databases. Each partition in a container's database plays the role of a member computer, or more precisely a member computer's database, as illustrated in FIG. 13. This variation that leverages logical partitions within a single container is illustrated in FIG. 13A. An authorization message relevant to a given container 13a01 is encrypted using a symmetric key 13a02 to create an encrypted version of that authorization message 13a03. This information could be user authentication information, it could be authentication information about the enclosed natural resource, such as its authenticated provenance, or it could be other critical information, such as the purity of the natural resource. The authenticated provenance information could include indisputable tracking information about each step in the journey taken by the authenticated natural resource, from the source mine to its current location. The embedded database node in each container must track the location information of that container and its enclosed authenticated natural resource precisely in order to have a high level of trust in its provenance information. The tracked information can include authenticated signatures of authorized custodians at each point of intervention along the journey for each container. Just like in FIG. 13, FIG. 13a illustrates that the encrypted version of the authorization message, or messages, is decomposed into a plurality of subcomponents 13a04. These subcomponents are then copied to a plurality of blocks comprised of independent partitions within the container's database. For example, in FIG. 13A, block 1 13a10 is comprised of a single container's database partition 123 (Part123) 13a18, partition 113a (Part 113a) 13a17, partition 567 (Part567) 13a16, partition 993 (Part993) 13a15 and partition (Part412) 13a14. Each individual database patrician such as partition 412 (Part412) 13a14 stores information about the next patrician in sequence, this case partition 993 (Part993) 13a1. This enables the message to be recomposed from the blocks so long the user has access to each subcomponent. In addition, each database partition has its own independent access security and hardware level encryption just like the database for a separate independent computer. A hacker would have to hack into each individual database partition separately to reconstruct the message. This a substantial enhancement of data security over the prior art. This added security is essential to safeguard the valuable provenance information for the authenticated natural resource enclosed in the container. Similar to FIG. 13, the encrypted subcomponents of the authorization message are also copied to the database partitions in block 2 13*a*11 and block 3 13*a*12. After a period of time, e.g., on day 2 in the example illustrated FIG. 13A, the encrypted subcomponents are copied to the database partitions in block 4 13*a*13 and deleted from block 1 13*a*10. This is repeated over time to ensure the blocks in use move dynamically through the container's database partitions making it more difficult for a hacker to focus on hacking a specific database partition. However, an authenticated user can access the authorization message by applying their biometric signature that the system translates into the private key 13*a*43 required to access the symmetric key 13*a*41 that is required to recover the authorization message 13*a*44. The private key must match the public key 13*a*42 that was used to encrypt the symmetric key 13*a*02. When a user registers their biometric signatures, the present invention issues a matching public key and private key for that user. The receiving user can use at least one of his biometric signatures that he previously registered with the present invention to initiate the reconstruction of the authorization message 13*a*34 from its subcomponents. In FIG. 13A, this is illustrated as sub1 13*a*35, sub2 13*a*36, sub3 13*a*37, sub4 13*a*38 and sub5 13*a*39. The system then uses the same symmetric key that was used to encrypt the authentication message 13*a*02 to decrypt 13*a*41 the encrypted reconstructed message 13*a*40 and recover the original authorization message 13*a*44. The sender user uses the public key 13*a*42 of the receiver user to transmit the symmetric key. The receiver user uses his biometric signature, or other authorized key, to invoke his private key 13*a*43 which the system uses to decode the symmetric key 13*a*41. Then the system uses the symmetric key 13*a*41 to decrypt the authorization message 13*a*44. This process makes a container that is isolated from the network much more difficult to hack. It also secures the database against physical theft of, or changes to, the authorization message. For example, if the authorization message was stored in the container's database as clear text and the container was stolen then the user could recover the authorization message directly from the disk drives. The present invention prevents this by encrypting the authorization message. However, the present invention further enhances protection against physical hacking when compared with the prior art by decomposing the encrypted authorization message into sub components that are distributed randomly across a plurality of database partitions. This solution makes physical theft and direct recovery of an authorization message from the disk drive practically impossible. A mobile container in transit typically has a higher risk of physical theft than a relatively immobile computer located in a secure data center. Also, a hacker may only want to change the authorization message that may represent provenance information about the enclosed authenticated natural resource. For example, the hacker's goal may be to commit fraud by changing the provenance information to either increase or decrease the value of the authenticated natural resource in the container. The present invention's secure solution makes this type of fraud practically impossible. This enhanced security enables buyers to trust the provenance information about the authenticated natural resource that is stored in the distributed database even if the container has been disconnected from the network of member computers. This additional distributed trust could elevate the value of this authenticated natural resource over similar natural resources that are not hallmarked with the same level of distributed trust. In this application, distributed and more secure authentication adds value. It should be noted that FIG. 13A illustrates enhanced security within a container that comprises a node within a distributed database and FIG. 13 illustrates enhanced security among nodes within a distributed network of computers. An authentication message is encrypted and decomposed within a container and that same authentication message is also encrypted and decomposed among member computers. This enables an authorized user to recover a secure authentication message from database partitions in a stand-alone scenario for a container as illustrated in FIG. 13A. That authorized user could also recover a secure authentication message from a network of member computers in a networked solution. However, the user must be authenticated to gain access to the system and authorized to access this information by invoking the private key that matches the original public key that was used to encrypt the symmetric key. In FIG. 13A, the present invention enables the administrator user to adjust the number of subcomponents, which can be more of fewer than five. It also enables the administrator user to select the number of blocks, which can be more or fewer than three. It also enables the administrator user to adjust the dynamic time, this is not limited to rolling over the blocks on a daily basis. The administrator user can configure the dynamic roll over frequency to be more or less than one day.

The present invention uses the authorization identifier as a file name. In the example illustrated in FIG. 13B, box 13*b*01, illustrates the encryption and decomposition of a secure authorization (e.g., confidential message), such as a password. In this example, the value of the password is "12345" 13*b*02. The present invention encrypts this password 13*b*03. For simplicity, let's assume the encrypted form is "ABCDE 13*b*04. The present invention decomposes 13*b*05 the encrypted secure authorization into five subcomponents. Again, for simplicity, let's assume these five subcomponents are "A". "B", "C", "D" and "E" 13*b*06. Box 13*b*07 illustrates that the present invention reconstructs or recombines 13*b*09 the decomposed subcomponents "A". "B", "C", "D" and "E" 13*b*08 into the encrypted version of the secure authorization "ABCDE 13*b*10. The present invention then decrypts 13*b* 11 the secure authorization into its original form "12345" 13*b*12.

Figure 13B:
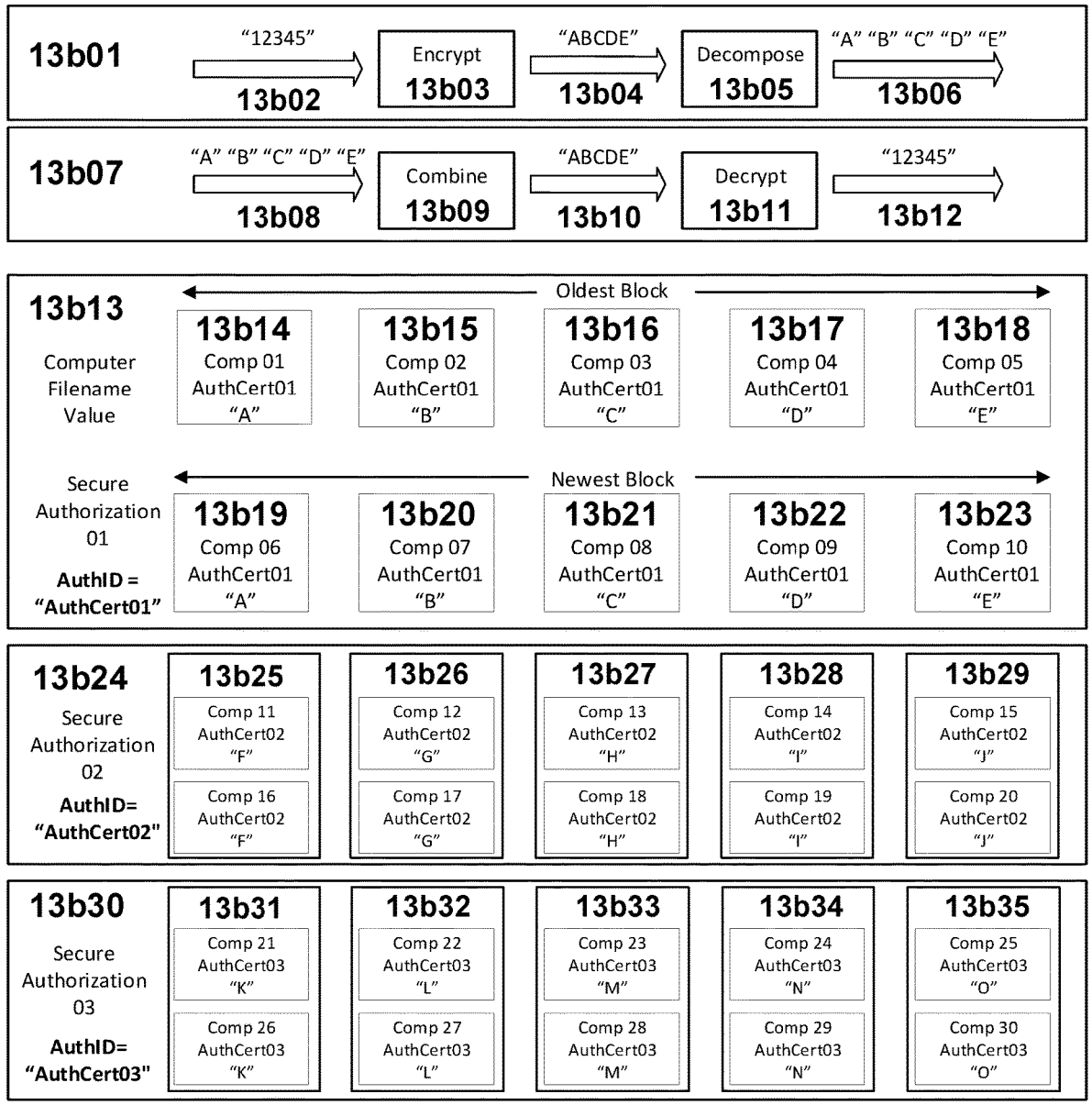
FIG. 13B illustrates the use of the authorization identifier as a file name for individual subcomponents.

Box 13*b*13 illustrates how the present invention uses the authorization identifier as a file name for each individual subcomponent and a distributed file name for the linked subcomponents that comprise an encrypted secure authorization. In this example, the value of the authorization identifier (e.g., "AuthID") is AuthCert01. Let's assume the first computer that is selected randomly by the present invention is computer 01 (e.g., "Comp 01"). In this example, the present invention uses the filename "AuthCert01" to write the first subcomponent "A" to computer 01 (e.g., "Comp 01") 13*b*14. The present invention then uses the same filename "AuthCert01" to write the second subcomponent "B" to computer 02 (e.g., "Comp 02") 13*b*15, wherein computer (e.g., "Comp 02") is selected randomly by computer 01 (e.g., "Comp 01"). The present invention then uses the same filename "AuthCert01" to write the third subcomponent "C" to computer 03 (e.g., "Comp 03") 13*b*16, wherein Computer 03 is selected randomly by Computer 02. The present invention then uses the same filename "AuthCert01" to write the fourth subcomponent "D" to computer (e.g., "Comp 04") 13*b*17, wherein Computer 04 is selected randomly by Computer 03. The present invention then uses the same filename "AuthCert01" to write the fourth subcomponent "E" to computer 05 (e.g., "Comp 05") 13*b*18, wherein Computer 05 is selected randomly by Computer 04. The present invention sets the LastSubcomponent Flag to "True" for Computer 05 but sets the LastSubcomponent Flag to "False" for Computer 04, Computer 03, Computer 02 and Computer 01. All of the computers in FIG. 13B are selected randomly from the plurality of member computers.

Periodically, the present invention creates a new block of subcomponents then deletes the oldest block. In the example, in block 13*b*13 the present invention uses the filename AuthCert01 to write the first subcomponent "A" to computer 06 (e.g., "Comp 06") 13*b*19, to write the second subcomponent "B" to computer 07 (e.g., "Comp 07") 13*b*20, to write the third subcomponent "C" to computer 08 (e.g., "Comp 08") 13*b*21, to write the fourth subcomponent "D" to computer 09 (e.g., "Comp 09") 13*b*22, and to write the fifth subcomponent "E" to computer 10 (e.g., "Comp 10") 13*b*23.

The present invention enables the same user to store a second secure authorization (e.g., "Secure Authorization 02") as illustrated in box 13*b*24. In this example, the value of the authorization identifier is "AuthCert02". The present invention uses the filename "AuthCert02" to write the first subcomponent, of the second secure authorization, "F", to computer 11 (e.g., "Comp 11"), then periodically to computer 16 (e.g., "Comp 16") 13*b*25. The present invention also uses the same filename "AuthCert02" to write the second subcomponent, of the second secure authorization, "G", to computer 12 (e.g., "Comp 12"), then periodically to computer 17 (e.g., "Comp 17") 13*b*26. The present invention also uses the same filename "AuthCert02" to write the third subcomponent, of the second secure authorization, "G", to computer 13 (e.g., "Comp 13"), then periodically to computer 18 (e.g., "Comp 18") 13*b*27. The present invention also uses the same filename "AuthCert02" to write the fourth subcomponent, of the second secure authorization, "H", to computer 14 (e.g., "Comp 14"), then periodically to computer 19 (e.g., "Comp 19") 13*b*28. The present invention also uses the same filename "AuthCert02" to write the fifth subcomponent, of the second secure authorization, "I", to computer 15 (e.g., "Comp 15"), then periodically to computer 20 (e.g., "Comp 20") 13*b*29.

The present invention enables the same user to store a third secure authorization (e.g., "Secure Authorization 03") as illustrated in box 13*b*30. In this example, the value of the authorization identifier is "AuthCert03". The present invention uses the filename "AuthCert03" to write the first subcomponent, of the third secure authorization, "K", to computer 21 (e.g., "Comp 21"), then periodically to computer 26 (e.g., "Comp 26") 13*b*31. The present invention also uses the same filename "AuthCert03" to write the second subcomponent, of the third secure authorization, "L", to computer 22 (e.g., "Comp 22"), then periodically to computer 27 (e.g., "Comp 27") 13*b*32. The present invention also uses the same filename "AuthCert03" to write the third subcomponent, of the third secure authorization, "M", to computer 23 (e.g., "Comp 23"), then periodically to computer 28 (e.g., "Comp 28") 13*b*33. The present invention also uses the same filename "AuthCert03" to write the fourth subcomponent, of the third secure authorization, "N", to computer 24 (e.g., "Comp 24"), then periodically to computer 29 (e.g., "Comp 29") 13*b*34. The present invention also uses the same filename "AuthCert03" to write the fifth subcomponent, of the third secure authorization, "O", to computer 25 (e.g., "Comp 25"), then periodically to computer 30 (e.g., "Comp 30") 13*b*35.

The example in FIG. 13*b* illustrates that the present invention can store a plurality of secure authorizations for each user in an encrypted dynamic distributed decomposed database. The present invention uses the authorization identifier is a file name for each individual subcomponent, as a distributed file name for linked subcomponents and as a reference identifier for each record in the database of secure authorizations.

Each member computer includes an operating system. Standard operating systems like Windows, Linux and UNIX include a file system. A file system or filesystem, controls how data is stored and retrieved. U.S. Pat. No. 8,156,090 B1 Curles 4/10/2012 teaches "a computer system comprises an operating system that provides a file system for storage of objects . . . the compile manager automatically creates the repository within the file system with a unique file name based at least in part on an object name". See the Abstract. The file system provided by the operating system enables a user to use a file name to save and retrieve files from memory and storage devices. The present invention transforms a conventional file system, provided by a conventional operating system, into a distributed database that relocates confidential messages randomly and dynamically among a plurality of member computers to prevent robo hacking of critical information. The problem solved is computer vulnerability to hacking. The solution is therefore rooted in computer technology rather than being a computer implementation of human behavior. Robo hacking does not apply to human memory. In addition, this solution is a technological improvement over convention computer file systems that are vulnerable to robo hacking devices. It converts a standard static file system into a dynamic randomized distributed database that prevents hackers from locating confidential messages.

Each client organization can use their own naming convention for the authorization identifier. For example, a first organization may have a first user, named John Smith. John Smith can use a confidential message as a password to login to a system, such as a website or enterprise system. John Smith may have a unique ID such as an email address like John_Smith_22@xyz.org. John Smith may have created a password to access the ABC document management system on Jun. 21, 2016 at 2:20 pm (14:20 PDT). In this example, a client can configure the present invention to create the following file name to store a password for John Smith that will enable access to the document management system Org0001_AuthID_Pword_JohnSmith_22_xyz.org_ABC_Doc_Man_2016_06_21_14_20_PDT_0001_sub0001. The present invention will store that file name in the authorization identifier. If the same user creates another password on the next day at 3:36 pm (6/22/2016 at 15:36 PDT) to access the same system then the authorization identifier will be Org0001_AuthID_Pword_JohnSmith_22_xyz.org_ABC_Doc_Man_2016_06_22_1 5_36_PDT_0002_sub0001. The date and time component of the file name has changed. The client can configure the present invention to construct the authorization identifier based on the system access specified by the user. In this case, "Org0001" indicates client organization and the "AuthID_Pword" indicates that this authorization identifier is a password. The next component of the authorization identifier "JohnSmith_22_xyz.org" indicates that this password is used by John Smith. The next component of the authorization identifier "ABC_Doc_Man" indicates that this is the user's password to access the ABC Document Management system. The next component of the authorization identifier indicates the date and time that John Smith created the password "2016_06_22_15_36_PDT". The next component of the authorization identifier "0002" indicates that this is the second password that has been setup for John Smith to access the ABC Document Management system. The last component of the filename shown above "sub0001" indicates the subcomponent of the decomposed confidential message. This last component is not included in the authorization identifier. This naming convention is exemplary. Each client can specify their own naming convention after the organization component (Org0001). One of ordinary skill in the art will recognize that the present invention can use the authorization identifier to support many other possible naming conventions. Moreover, the present invention can store the meta data, such as the date and time or user ID, in a lookup table rather than configuring it into the file name. Also, the present invention can use different meta data to construct the authorization identifier. For example, instead of including the user's name in the authorization identifier, a unique reference ID can be used for each user. In this case, if a user changes her name the reference ID will remain the same so the name change will not impact the authorization identifier.

For additional security, the present invention can be configured to recover the password, or other confidential message, from multiple blocks. For example, in FIG. 13, the present invention can recover the password from each of Block2, Block3 and Block4 then compare the outputs. They should all be the same "ABCDE". However, if the output from one block is corrupted then two out of three will be correct which would enable the system to overcome the corruption by using the predominant decrypted value for the password or by retrying until all decrypted values are the same. If a client wants to protect against permanent corruption then that client can configure the present invention to use the predominant value. If a client wants to protect against corruption caused by intermittent transmission errors then that client can configure the present invention to use the retry option.

The present invention also enables a first user to send a confidential message to a second user. For example, if the first user wants to send bitcoin to a second user, the first user can input the blockchain address for that bitcoin into the present invention's warm storage distributed database. The first user can send the authorization identifier to the second user securely. For example, the first user's computer can use the second user's public cryptographic encryption key to encrypt the authorization identifier then the second user's computer can use the second user's private cryptographic encryption key to decrypt the authorization identifier.

The present invention also enables a first user to present a confidential message to a second user. A third user can authenticate the confidential message then store the confidential message in the warm storage distributed database with an authenticated signature. A second user can then access the confidential message and validate that the confidential message has been authenticated by the third user. For example, the first user may have a birth certificate, or a University Degree, or a citizenship certification, or a social security number, or some other official document. A second user may be a potential employer, for example, who wants access to a validated version of the official document. The first user will take the official document to a third user who is a validation authority, such as a notary public. That third user will validate the official document then upload an electronic version as a confidential message to the warm storage distributed database. In this case, the present invention uses the third user's (e.g., notary public) private encryption key to encrypt the confidential message 1301. The first user (e.g., job candidate) will send the authorization identifier and the third user's (e.g., notary public) public encryption key to the second user (e.g., employer). The second user will use the authorization identifier to reconstruct then decrypt the university degree. In this embodiment, the present invention performs an additional function at step 1301 in FIG. 13 where the confidential message is encrypted by the third user's private encryption key. Consequently, at step in FIG. 13, the present invention will use the third user's public encryption key to decrypt the first user's university degree. Since the confidential message is encrypted by the third user's private encryption key, the second user knows that the university degree has been validated and signed cryptographically by the notary public.

When the computers depicted in FIG. 13 communicate with each other they use service accounts. Patent U.S. Ser. No. 10/044,756B2 discloses a method that enables computers to interoperate via a public cloud. This is a standard concept that is used by internet computers, blockchain computers and enterprise computers to interoperate over public networks. To secure the communication channel between any two member computers, the source member computer can use the public cryptographic encryption key of the destination member computer to encrypt the transmission. The destination member computer then uses its private cryptographic encryption key to decrypt the incoming information.

A first user can use a biometric signature to initiate the process to enter confidential information into the warm storage distributed database taught herein. First the user must register each biometric signature with the present invention, such as fingerprints, retina scans and voice prints. US patent application US 2019/0013931 A1 Benini teaches a biometric solution that meets the biometric requirements of the present invention. Benini teaches the comparison of biometric templates to verify the identity of a user (see the detailed description on page 2). When the first user navigates to a website or an enterprise system, such as a document management system, that system displays its login page. The first user can use a device, such as a fingerprint reader, to enter a biometric signature. The present invention will verify the biometric signature against the registered biometric signature for the first user then locate the password in the warm storage distributed database then login the user into to the document management system. The user must also enable biometric login for that system, such as a document management system. This enables a user to log into the document management system from any device by using his registered biometric signature to retrieve the secure password from the warm storage distributed database taught herein.

Also a first user can register at least one biometric signature in the present invention. Similarly, a second user can register at least one biometric signature with the present invention. The first user can then use a biometric signature to initiate the storage of a confidential message, such as a blockchain address for bitcoin, or other currency, in the warm storage distributed database taught herein. In FIG. 13, the present invention will use the second user's public key 1341 and private key 1342 in the encryption and decryption process for the confidential message (e.g., blockchain address for bitcoin). The present invention also enables the first user to encrypt the authorization identifier, send it to the second user then the present invention enables the second user to decrypt the authorization identifier. The present invention then enables the second user to use a pre-registered biometric signature to initiate the decryption of the confidential message (e.g., blockchain address for bitcoin). This enables the second user to access and spend the currency associated with that blockchain address. For security purposes, the user should not use that bitcoin address again. The most secure approach is to create a new bitcoin address and repeat the process. To one skilled in the art, it will be evident that this enhanced security process has applications beyond crypto currency authentication to include any application where an authentication code, or critical data string, or other confidential message, requires enhanced security.

Figure 14:
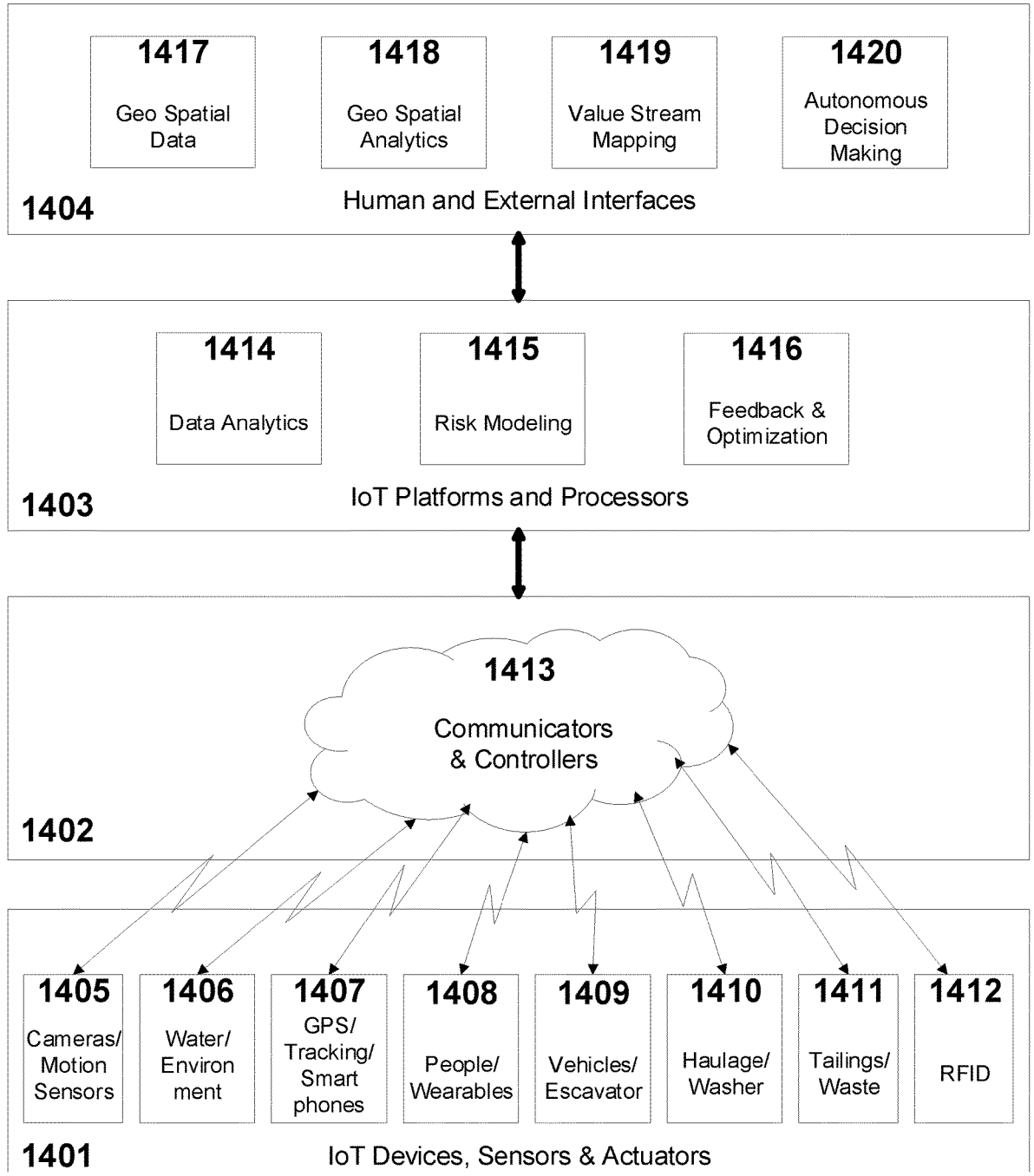
FIG. 14 illustrates a first embodiment of the internet of things system for the present invention.

FIG. 14 illustrates the internet of things architecture for a first embodiment of the apparatus and method of the present invention.

The Internet of Things (IoT) is a fairly nascent technology enabled by the convergence of data, connectivity and analytics. The objective is to deliver the right data, at the right time, to the right people to drive the right business outcomes. The IoT is the connection of objects such as computing machines, embedded devices, equipment, appliances, and sensors to the Internet for access, processing and decision making by analytical tools and management. The technology involves connecting equipment, fleets, and people based on radio frequency identification devices (RFID) and sensor technologies.

The present invention uses the IoT to automate the maintenance and operations of mining equipment, standardize mining procedures, improve the traceability and visibility of assets and activities, improve the safety of people and equipment, transition from preventive to predictive maintenance and to provide real-time access to data and analytics for decision support and optimization.

In a first embodiment of the present invention, IoT devices 1401 include sensors that capture data from their surroundings and IoT actuators the give out data to their surroundings and initiate actions, such as control devices for autonomous vehicles. The IoT automatically receives and transfers this data over a network of communicators and controllers 1402 without requiring human intervention. This data is transformed into useful information by the IoT platforms and processors 1403. The human and external interfaces layer, transforms this IoT information into knowledge for decision support and autonomous actions.

This data management and analytics solution provides a number of benefits. It facilitates inventory and asset tracking, asset utilization, loss prevention, energy management, predictive maintenance, integrated remote operations centers and geostability modeling and decision making.

The IoT devices 1401 enable remote monitoring of operations which helps to optimize efficiency, improve safety, decrease variability and reveal performance issues. For example, video cameras and motion detectors 1405 are used to help secure the perimeter of a mine as well as the most sensitive locations within a mine, such as the gold vault. Water quality sensors and soil moisture sensors generate data that is used to trigger alerts when readings are out of compliance 1406. Workers are issued with smartphones and GPS sensors 1407. Also tracking devices are used to track valuable assets such as inventory. Workers are also issued with wearable sensors 1408. This enables their vital signs to be monitored and their location to be tracked. Vehicles and excavators 1409 are equipped with infrared radar and video systems to improve safety. Driver-less vehicles add another layer of safety. Airborne exploration drones also capture data that facilitates the prospecting process. In addition, the IoT collects data from sensors on equipment, such as haulage vehicles and washers 1410, people, geological assets and environmental assets to create a real-time, multi-dimensional model that it uses to optimize and coordinate the mine's layout, operation, and vehicle paths. This optimizes efficiency and safety. The present invention also leverages maintenance history to enable preventative maintenance by using machine to machine (M2M) sensors that detect the status of the equipment, such as temperature, pressure, vibration and speed. Its analytics enable the present invention to predict failures before they occur. This enables spare parts to be ordered well in advance which avoids downtime and express shipping costs. When a truck can produce $15,000 in revenue per hour, the loss of that truck for any reason quickly becomes very costly. Sensors in trucks allow operations staff to contact a driver if a truck is not operating at maximum capacity so that yield rates can be increased, which increases revenues. Tailings are the fine-grained waste material that remains after the metals and minerals are extracted from the ore. This material is rejected at the "tail end" of the process. IoT sensors are used to monitor tailing materials and waste products 1411 for potentially hazardous materials and pollution. This enables preventative environmental care. Radio frequency identification ("RFID") 1412 is the identification technology for IoT sensors and actuators. Each device has a unique RFID that enables the IoT network to distinguish it.

The IoT communicators and controllers 1402 include a plurality of networks including, satellite, ethernet, wireless area network, personal area network and the global system for mobile radio. In a preferred embodiment of the present invention, the key components of the IoT communicators and controllers layer include, IoT Routers, IoT gateways and IoT switches.

Each IoT gateway is a physical device and software program that serves as the connection point between the cloud and the plurality of controllers, sensors and intelligent devices. In a first embodiment of the present invention, each gateway transfers and interprets data between IoT systems. These gateways, also known as protocol converters, use encryption to increase network security. They also aggregate, summarize and analyze data at the edge of the cloud. This functionality minimizes the volume of data that is transferred to the cloud. Reducing the data in the cloud improves network response times and reduces network transmission costs.

IoT routers are similar to gateways. However, in the present invention, routers provide an interface between two dissimilar networks. The IoT routers enable network level interoperability whereas the IoT gateways are used as a bridge between similar networks. Moreover, the IoT routers are network layer devices that route data packets based on their IP addresses. They interconnect LANs and WANs.

Conversely, the present invention uses a plurality of IoT switches in the data link layer to perform error checking before forwarding any data. Each IoT switch is a multi-port bridge with a buffer that improves performance.

The IoT platforms and processors 1403 filter the large volumes of raw data into critical data then transforms this critical data into useful information. The data analytics module 1414 examines these IoT data sets then draws conclusions about the information they contain. This helps users make more-informed business decisions often by verifying or disproving models, theories and hypotheses. Data analytics methodologies include exploratory data analysis (EDA), which aims to find patterns and relationships in data, and confirmatory data analysis (CDA), which applies statistical techniques to determine whether a hypothesis about a data set is true or false. The present invention also separates data analytics into quantitative data analysis and qualitative data analysis. The former involves analysis of numerical data with quantifiable variables that can be compared or measured statistically. The qualitative approach is more interpretive and focuses on understanding the content of non-numerical data like text, images, audio and video, including common phrases, themes and points of view. The present invention also supports more advanced types of data analytics including data mining, which involves sorting through large data sets to identify trends, patterns and relationships; predictive analytics, which seeks to predict customer behavior, equipment failures and other future events; and machine learning, which is an artificial intelligence technique that uses automated algorithms to churn through data sets more quickly than data scientists can do via conventional analytical modeling. Big data analytics applies data mining, predictive analytics and machine learning tools to sets of big data that often contain unstructured and semi-structured data. Data analytics initiatives help increase revenues, improve operational efficiency, optimize marketing campaigns and customer service efforts, respond more quickly to emerging market trends and gain a competitive edge. The risk modeling module 1415 examines a number of uncertain factors to predict the likelihood of each possible outcome. For example, after a geological survey is completed, there is still some uncertainty about the size of the orebody. This translates into an uncertain project lifetime. Uncertain reserves are compounded by other uncertainties including, uncertain capital, mining and milling costs, working capital, production rates, the price of gold and ore grades. In this case, a user can use the risk modeling module 1415 to estimate the value of a mining project by taking into account the impact of geological and economic uncertainties.

The feedback and optimization module 1416 collects and interprets data, then applies models to gain insight before making actionable recommendations that improve mining operations. The results are measured by the IoT sensors and then fed back into the feedback and optimization module 1416. This is a continuous improvement process aimed at optimizing a specific goal for the mining operation, such as return on investment.

The IoT processors also use encryption techniques to secure the data. The key components include, data processing, device configuration, data analytics, risk modeling, optimization via feedback loops, data security and SCADA. Features include, automated enrollment and provisioning of gateways and endpoints, over-the-air lifecycle management, dynamic and customizable dashboards, device inventory, configuration management, network management for constrained bandwidth, network troubleshooting, Role Based Access Control ("RBAC") user management, rich APIs for integration with third party applications, active monitoring and alerts for critical events, real-time location tracking of assets and geofencing, and rich Geographic Information System ("GIS") map overlays. Geofencing creates a virtual geographic boundary around the mine, using GPS and RFID technology. It triggers an alert whenever a mobile device enters or leaves a particular area. The present invention uses a specific commercial off the shelf solution that includes the features listed above. However, the present invention can use any one of a plurality of commercial off the shelf solution options including, Cisco IoT Field Network Director, Ericsson IoT Accelerator and the Pelion IoT Platform from Arm. Other options include SymBot® from Symboticware, which is a monitoring and data solution that delivers standardized information-based technology that enhances the productivity, safety and efficiency of mobile and fixed assets. Synertrex® technology collects critical data to provide operators with insight into equipment functionality. It can be used to predict issues for downtime prevention and predictive maintenance as well as optimize machinery for enhanced performance and throughput. NRG1-ECO, from BESTECH, is a mine-wide ventilation control system that can reduce annual energy costs.

The IoT human and external interfaces 1404 use intelligent computing technologies such as cloud computing, fuzzy recognition, data mining and semantic. This enables integrated remote control centers, promotes compliance with safety and environment regulations, and facilitates management decision making.

The present invention uses visualization tools to provide 3D displays of the mine and other related data for use by pit controllers, geologists, drilling/blasting teams, mine planners, and supervisors. Mining vehicles have built-in sensors to measure oil temperature, contamination, tire pressure, bearing rotation, vibration, frame rack, bias and pitch, engine speed, and brake pressure. This data is captured and analyzed to recommend maintenance schedules and alert teams proactively about potential issues.

The geospatial data module 1417 intelligently and automatically transforms geographic data into information and then synthesizes geographic knowledge. The goal is to extract useful information from massive amounts of data to support decision-making. The geospatial data module extracts new, insightful information embedded within large heterogeneous databases to formulate knowledge. The process for knowledge discovery in databases includes data warehousing, target data selection, data cleansing, preprocessing, transformation and reduction, data mining, model selection, evaluation and interpretation, and then consolidation and use of the extracted knowledge. The geospatial analytics module 1418 is designed to gather, display, and manipulate imagery, GPS, satellite photography and historical data. It describes this data explicitly in terms of geographic coordinates or implicitly, in terms of a street address and postal code, or forest stand identifier. The geospatial analytics module applies this data to geographic models. Spatial analysis allows users to solve complex location-oriented problems and better understand where and what is occurring. In the present invention, spatial analysis lends new perspectives to decision-making. It uses statistical analysis to help users determine if visual patterns are significant. This spatial analysis also helps users determine relationships, understand and describe locations and events, detect and quantify patterns, make predictions and find the best locations and paths. Although the present invention uses a specific commercial off the shelf geospatial information system, for geospatial data and geospatial analytics, any one of a number of commercial off the shelf geospatial information systems can meet the needs of the present invention, such as Simple GIS Software, ArcGIS and QGIS. The value stream mapping module 1419 is designed to transform geospatial knowledge into a story, or journey map. For example, a story may explain the motion patterns of workers or equipment over time. This enables paths in the mine and junctions to be optimized to facilitate the free flow of workers, equipment and other assets. This increases efficiency and can increase revenues, by improving haulage, and also reduce costs, by minimizing ineffective motion. Patent application US 2008/0195433 A1 teaches value stream mapping. Although the present invention uses a specific commercial off the shelf IoT value mapping solution, any one of a number of commercial off the shelf platforms can meet the needs of the present invention, such as SmartDraw, LucidChart and eDraw. The value stream maps are the optimal paths that maximize return on investment. The autonomous decision-making module 1420 assesses the optimal value stream maps then decides the optimal value stream for each inventory asset to navigate. For example, this enables vehicles to follow the most cost-effective route whether that vehicle is driven or autonomous. The optimal routes are updated in real time based on changing source data and performance feedback.

Figure 15:
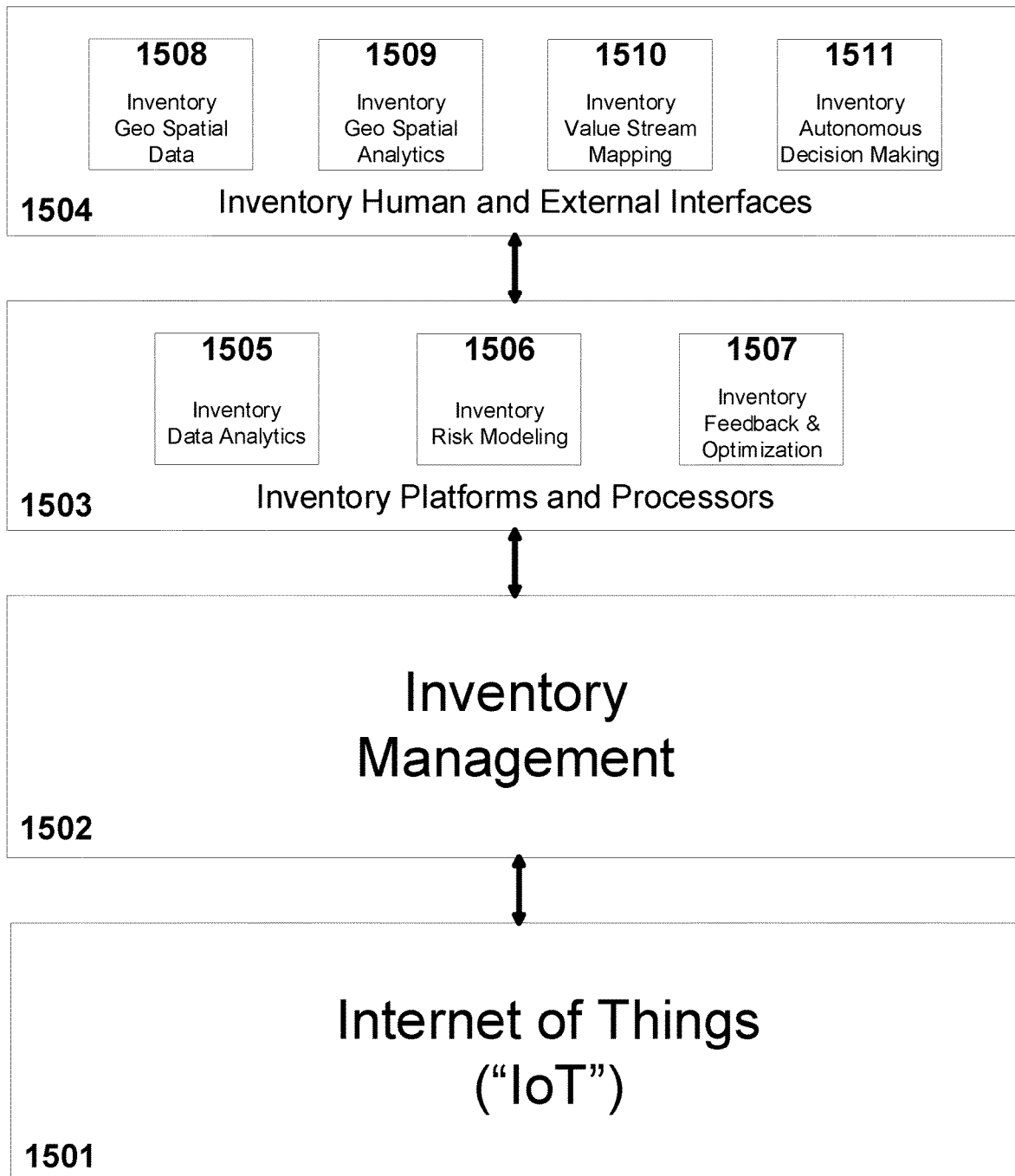
FIG. 15 illustrates a first embodiment of the inventory management system for the present invention.

FIG. 15 illustrates the architecture of the inventory management solution. This system manages the market maker's inventory of processed raw materials, such a gold bullion. The market maker leverages this inventory to make money from a plurality of channels, including monetizing derivative products and from the outright sale of units of inventory.

The Internet of Things ("IoT") solution 1501, illustrated in FIG. 15 but described in FIG. 14, provides inventory sourcing and distribution data to a commercial off the shelf inventory management platform 1502. Although the present invention uses a specific commercial off the shelf inventory management platform, any one of a number of commercial off the shelf platforms can meet the needs of the present invention, such as Logisuite, SAP and Xero. The Inventory Platforms and Processors 1503 layer is similar to the IoT platforms and processors 1403 layer but it transforms inventory data into useful information rather than transforming mining data into useful information. Similarly, the Inventory Human and External Interfaces 1504 layer is similar to the IoT Human and External Interfaces 1404 layer, except the former transforms inventory information, rather than mining information, into knowledge for decision support and autonomous actions.

In a first embodiment of the present invention, the inventory management platform 1502 includes a specific commercial off the shelf logistics system. However, a number of commercial off the shelf logistics systems can be used with the present invention, including Pacejet, Kuebix and Phalanx. The logistics system leverages transportation information from commercial transportation companies, such as airlines and delivery companies. It also leverages information from the intelligent transportation system (ITS) that combines information from national, local, and commercial transportation sources. The logistics system is a subset of the inventory management system. It analyzes a plurality of logistical information including, transportation costs and inventory storage costs.

Similar to the IoT platforms and processors 1403 layer, the inventory platforms and processors 1503 layer filters the large volumes of raw inventory source data into critical impact data then transforms this critical impact data into useful information about the inventory. Similar to the IoT data analytics module 1414, the inventory data analytics module 1505 examines sets of inventory data then draws conclusions about the information they contain. Similar to the IoT risk modeling module 1415, the inventory risk modeling module 1506 examines a number of uncertain factors to predict the likelihood of each possible outcome. However, the inventory risk modeling module examines risk factors that impact supply, demand and monetization of the inventory. This includes risk factors that impact supply, such as weather conditions around a mine. It also includes risk factors that can impact demand, such as economic factors in a buyer's local economy that drive purchase decisions. In addition, it includes risk factors that can impact derivatives, such as the relative strength of an investor's local stock market.

Similar to the IoT feedback and optimization module 1416, the inventory feedback and optimization module 1507 collects and interprets inventory data, then applies models to gain insight before making actionable recommendations that improve the distribution of inventory to better match projected demand. The system predicts purchase demand then determines whether to ship inventory proactively to the prospective buyer's closest warehouse in anticipation of satisfying that demand. In this case, the measured results include the actual demand relative to the anticipated demand and the subsequent impact on local inventory levels. The demand variance is fed back into the inventory feedback and optimization module 1507 to improve predictive accuracy. This is also a continuous improvement process aimed at optimizing return on investment based on inventory costs and revenues.

Similar to the IoT human and external interfaces 1404 layer, the inventory human and external interfaces 1504 layer also uses intelligent computing technologies such as cloud computing, fuzzy recognition, data mining and semantic. The present invention also uses visualization tools to provide 3D displays of the inventory around the world.

Similar to the IoT geospatial data module 1417, the inventory geospatial data module 1508 intelligently and automatically transforms geographic data into information and then synthesizes geographic knowledge. The goal is to extract useful information from massive amounts of inventory data to support decision-making.

Similar to the IoT geospatial analytics module 1418 the inventory geospatial analytics module 1509 is designed to gather, display, and manipulate imagery, GPS, satellite photography and historical data. This data is described explicitly in terms of geographic coordinates or implicitly, in terms of a street address and postal code for warehouses. The inventory geospatial analytics module applies this information to geographic models. In the present invention, spatial analysis allows users to solve complex location-oriented problems for distributed inventory and better understand what is occurring and where it is occurring. It also uses spatial analysis to lend new perspectives to decision-making that drives inventory optimization. The output of the inventory optimization assessment and geospatial analytics evolves in real time as new input data is received from each new transaction that impacts the inventory. The present invention also uses statistical analysis to help determine if visual patterns are significant and uses spatial analysis to help users determine relationships, understand and describe locations and events, detect and quantify patterns, make predictions and find the best locations and paths for inventory warehousing and distribution.

The inventory value stream mapping module 1510 is very different to the IoT value stream mapping module 1419. The goal of standard value stream mapping solutions, like the IoT value stream mapping module, is to transform geospatial knowledge into a journey map for units of inventory. The value stream maps are the optimal paths and destinations for units of inventory to be transferred from suppliers to buyers in order to maximize return on sales. Usually the goal is to minimize the amount of inventory in order to minimize inventory carrying costs and maximize net income from sales of inventory. Conversely, the goal of the inventory value stream mapping module 1510 is to maximize the amount of inventory and to optimize the monetization of that inventory by selling derivatives, collateralized by the inventory, not by selling the inventory itself. The inventory is treated more like renting a hotel room than selling a widget. Just like a hotel room, if a unit of inventory is not monetized today then the opportunity is lost forever. Daily utilization of derivatives is a first key success factor for the inventory in the present invention. Also, just like a hotel will adjust pricing of an available room to avoid an unused day, the market maker will adjust the leasing fee for inventory-backed collateral to maximize daily monetization. Daily derivative monetization is the product of daily utilization and daily lease fees. Value capture is the aggregation of the actual daily derivative monetization versus the maximum possible daily derivative monetization. For example, if the maximum lease fee for a given unit of inventory is $15 for each weekday and $5 for each weekend day then the maximum weekly fee is 5×$15+2×$5=$85. If that unit of inventory is only leased for 2 week days and no weekend days then the actual lease fee is $30 for that week. The actual value captured is 100×30/85=35%. The inventory value stream mapping module 1510 has the same functionality as a standard value stream mapping module but the memory and display are modified to visualize projected and actual value capture for inventory derivatives. Similar to the IoT autonomous decision-making module 1420, the inventory autonomous decision-making module assesses the optimal value capture then decides the optimal location and use for each unit of inventory. The location is important because it can increase the probability of an actual sale of a specific unit of inventory, if it is physically close to a prospective buyer. The aggregate derivative revenue may be unchanged if a new unit of inventory is added by a supplier in time to replace the sold unit of inventory. The advantage to the buyer is they do not have the typical lead time to negotiate contracts and ship the unit of inventory from the supplier to the buyer. Meanwhile, the lessor still has the same amount of collateral backing his derivative products so is not impacted. The optimal monetization locations and transportation routes are updated in real time based on changing source data, including warehouse costs, transportation costs, schedules, predictive analysis and performance feedback.

Figure 16:
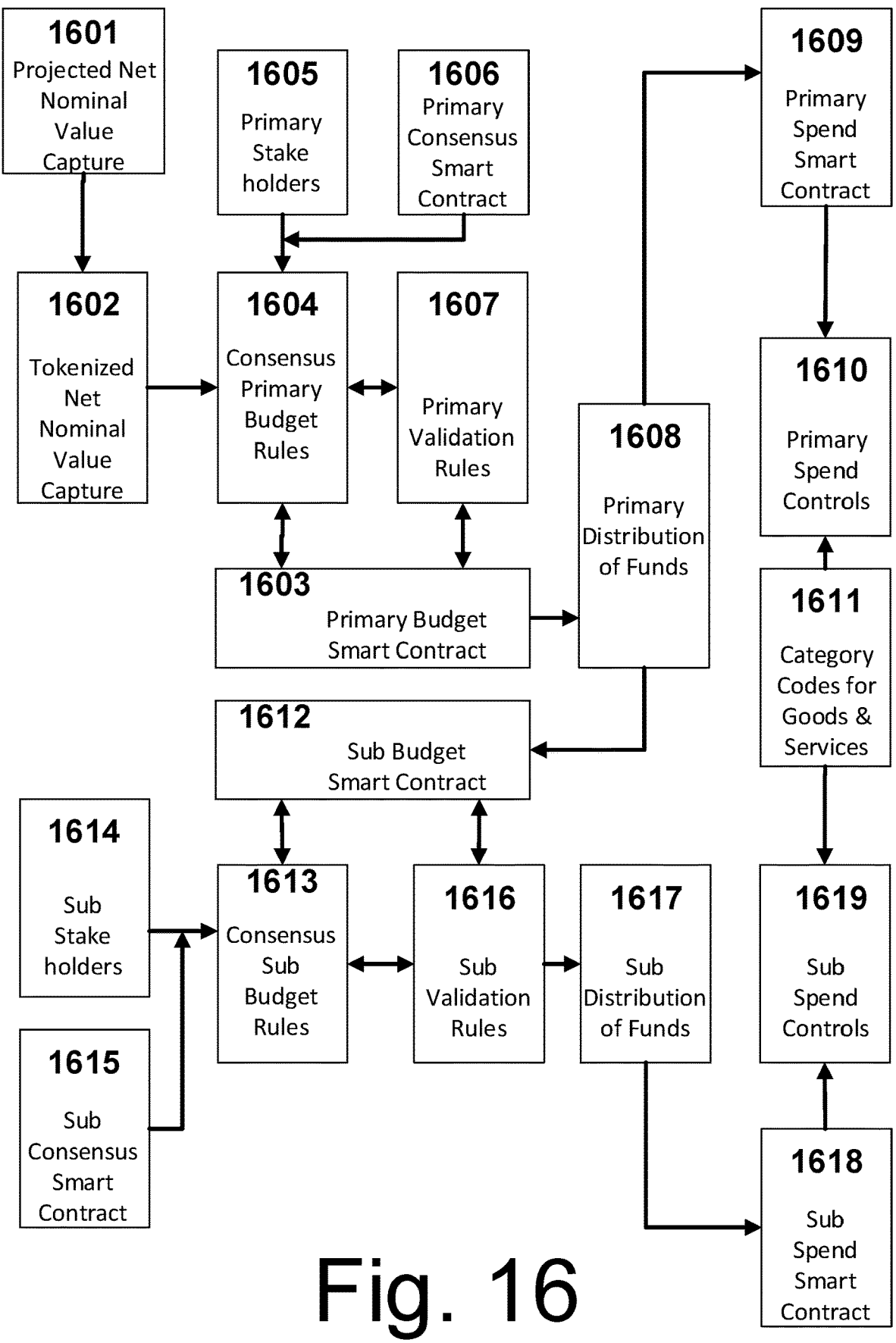
FIG. 16 illustrates a first embodiment of the budget management procedure for the present invention.

FIG. 16 illustrates how the present invention monetizes its projected nominal value capture 1601 that is described above. The nominal value captured from derivative products is the actual revenues generated from derivative sales. The net nominal value capture is the profits from derivative sales or derivative revenues less associated costs. The projected net nominal value capture is the expected profits from derivative sales and from projected inventory sales. The present invention uses the Token System to tokenize 1602 the projected profits (e.g., projected net nominal value capture) from derivative products and from inventory sales. This tokenization of net nominal value capture 1602 creates an electronic representation of the present invention's future value from derivative sales and inventory sales. These tokens represent shares in the present invention's future profits from tokenization. Typical organizations project their revenues and expenses then create a budget for future expenditures. The present invention uses a smart contact for budgeting. This primary budget smart contract 1603 enforces the rules that comprise the consensus primary budget rules 1604. These budget rules determine how the projected value is allocated to various beneficiaries, which may be departments within organizations, workers, independent people or other entities. The purpose of this budget is to ensure expenditures and other costs align with revenue projections. The inputs to the consensus primary budget rules 1604 include the tokenized projected net nominal value capture 1602 as well as proposed budget inputs from primary stakeholders 1605, inputs from the primary consensus smart contract 1606, inputs and rules from the primary budget smart contract 1603 and also validation rules 1607. Proposed budgets from primary stakeholders 1605 can be manual or, in the case of a distributed autonomous organization (DAO), it can be automated by a smart contract 1606 that captures the opinion of different stakeholders, determines a consensus then allocates the budget to the beneficiaries according to that consensus. This is the primary consensus smart contract 1606. At step 1604, the present invention applies validation rules 1605 to ensure the budget allocation complies with business objectives, policies, laws and regulations. For example, there may be a rule that specifies the budget for a first beneficiary must always be more than that of a second beneficiary. Another rule may be that the total allocated budget cannot exceed a predetermined percentage of the total projected value capture to drive profitable operations. A further rule may be that the amount allocated to each beneficiary must exceed the payroll obligations for each beneficiary. This list of rules is exemplary. Anyone skilled in the art will recognize the rationale for these and other compliance rules that the present invention applies at this step. After the budget allocation consensus rules, and other compliance rules, are validated for the primary budget, the primary budget smart contract 1603 distributes the allocated funds to the agreed beneficiaries in the primary distribution of funds 1608. Each beneficiary, who is eligible to receive funds from the primary budget, also has a primary spend smart contract 1609. This smart contract enforces controls that ensure workers spend funds in accordance with primary spend controls 1610. This places restrictions on how workers and automated bots, that are programmed to acquire goods and services in the place of workers, can spend the distributed funds. For example, if a specific pool of funds is allocated for office expenses then the primary spend smart contract 1609 will only authorize a transaction if the product and service codes match those for office supplies 1611. These codes are scanned at the point of sale or accessed via the vendor's eCommerce platform for authorization by the primary spend smart contract 1609.

Each eligible beneficiary has a sub budget smart contract 1612 that is largely the same as the primary budget smart contract 1603. This sub budget smart contract 1612 allocates funds according to an agreed sub budget and applies consensus sub budget rules 1613. This is similar to step 1604. This sub budget receives proposed budgets from sub stakeholders 1614. Step is similar to step 1605. The input from these sub stakeholders can be manual or, in the case of a distributed autonomous organization (DAO), it can be automated by a sub consensus smart contract 1615 that captures the opinion of different sub stakeholders 1614, determines a consensus then allocates the funds to the beneficiaries according to that consensus. Step 1615 is similar to step 1606. The present invention then applies sub validation rules to ensure the sub budget allocation complies with business objectives, policies, laws and regulations. This is similar to step 1607. After the consensus sub budget rules, and other compliance rules, are validated, the sub budget smart contract 1612 distributes the allocated funds to the agreed beneficiaries in the sub distribution of funds 1617. This is similar to step 1608. Each beneficiary, who is eligible to receive funds from the sub budget, also has a sub spend smart contract 1618. This smart contract enforces controls that ensure beneficiaries spend funds in accordance with sub spend controls 1619. This places restrictions on how workers and automated bots, that are programmed to acquire goods and services, can spend the distributed funds. This step is similar to step 1610. For example, if a specific pool of funds is allocated for office expenses then the sub spend smart contract 1618 will only authorize a transaction if the product and service codes match those for office supplies 1611. These codes are scanned at the point of sale or accessed via the vendor's eCommerce platform for authorization by the sub spend smart contract 1618.

The capabilities described in FIG. 16 are implemented in the accounting system 229 described above. However, the budget management features can also be implemented by a customized version of the system taught in U.S. Pat. No. 6,418,420B1. Similarly, the point of sale payment authorization features can also be implemented by a customized version of U.S. Pat. No. 7,213,750B1. The required customization can be implemented using standard programming languages and technologies.

FIG. 17 illustrates the key components of the distributed inventory and the display of tracking information for the distributed inventory 1702. The authenticated natural resource is transported and stored in a sealed container 1701. This sealed container contains the authenticated natural resource 1703, in the form of gold bullion for example. It also contains a distributed inventory IoT device 1704. This device is one of the devices in the IoT system 1407 in FIG. 14. This device is connected to the inventory consensus computer 1705 and the inventory consensus database 1706. The inventory consensus database stores meta data about the authenticated natural resource 1703 including its quality, value, provenance, certainty, value capture, current location and historical locations. The administrator user enters this information into the inventory consensus database when the container is sealed. The inventory consensus database is implemented as a specific commercial memory chip device. However, a number of commercial off the shelf memory chip devices can meet the requirements of the present invention including Transcend, SanDisk, Kingston and Samsung. The inventory consensus computer 1705 enables the IoT device to access this information and synchronize it with the central control system 201. The inventory consensus computer also enables the IoT device to update the meta data in the inventory consensus database 1706. The inventory consensus computer is substantially the same as the computer described in FIG. 5. The difference is that the present invention uses a specific miniature computer for the inventory consensus computer. However, the needs of the present invention can be met by anyone of a number of commercial off the shelf miniature computers including Intel's Compute Card, CHIP and Raspberry Pi. In addition, microscopic computers are being developed that will improve the form factor of this solution including IBM's microscopic computer. The unique code required by the present invention is coded using standard programming languages and techniques. The sealed container also includes a power unit 1707 that uses a miniature rechargeable battery to power the devices that comprise the node in the distributed inventory database. Whenever a sealed container is within one of the market maker's facilities the batteries are recharged wirelessly. Also, each radio frequency identity (RFID) tag has a transceiver that can harvest energy from near-field wireless communication signals. This enables the devices to operate when the battery power is not functioning but the device is within range of a suitable wireless signal. In addition, whenever a first sealed container is within the communication range of a second sealed container, the first node in the inventory consensus database, in the first sealed container, and the second node in the inventory consensus database, in the second sealed container, synchronize with each other to agree a shared history for all of the units of inventory that they have captured in their own memory. They exchange meta data information that the other database node does not have. They also confirm common meta data information that they both have. They also identify conflicts where they have contradictory meta data information about the distributed inventory. For example, the first database node may think a third authenticated natural resource is still in a first warehouse but the second database node may know that said third authenticated natural resource was transferred to a second warehouse. As more sealed containers encounter each other and share meta data information, they are able to resolve these types of conflicts by establishing a consensus. For example, the consensus may establish that the third authenticated natural resource was in fact moved from the first warehouse to the second warehouse on a specific date, which resolves the conflict between the first and second database nodes. In time, each authenticated natural resource will have its own copy of the entire history of the distributed inventory. Moreover, whenever more than a predetermined percentage of nodes in the distributed database agree on a historical set of meta data then a predetermined selection criterion is invoked to select a node that will write that data set to a blockchain. The present invention uses a specific blockchain. However, a public blockchain such as Ethereum can meet the needs of the present invention.

In a first embodiment of the present invention, a first user screen displays tracking information for the distributed inventory 1702. This includes an infographic of the distributed inventory 1708, and an indication of the location of the authenticated natural resource 1709 within the distributed inventory. The present invention also displays quality 1710 information, such as the number of carats for the gold bullion; value 1711 information, such as the current sale price for the authenticated natural resource; provenance information 1712, such as the source of the gold and its journey to its current location; certainty information 1713, such as the level of confidence in the recorded provenance; value capture information 1714, such as the actual revenues versus the maximum possible revenues for the authenticated natural resource; location information 1715, such as its current location and previous locations on its journey from the source mine and electronic signatures (eSignature) 1716, such as biometric authentication from agents who are authorized to witness predetermined activities such as sealing a container and entering information into the database and unsealing a container and removing the authenticated natural resource for a sale. Biometric signatures include facial recognition, voice recognition, finger print recognition and retina recognition. Anyone skilled in the art will know that other forms of recognition are being developed and are possible future options, such as the shape of an ear, DNA matching, iris recognition, finger geometry, hand geometry, gait, odour, typing and vein recognition. Whenever the market maker makes a decision to sell an authenticated natural resource, the local agent breaks the seal, in the presence of the agreed witnesses, and delivers the authenticated natural resource to the buyer. The eSignature of the agreed witnesses is captured in the distributed database. The distributed inventory IoT device monitors the seal on the container. If the seal is broken for any unauthorized reason then the distributed inventory IoT device sends an alert to the central control system 201. The administrator can switch the RF transmitter used by the distributed inventory IoT device 1704 to airplane mode but only when the container is expected to be loaded onto an airplane. The administrator user can do this remotely. Also, the administrator user can break and reestablish the seal on a container using a predetermined procedure for authorized activities, such as customs inspections. In each case, the electronic signature of each authorized witness is captured in the distributed database. When a container is delivered from a warehouse to the custody of the shipping company, the administrator user switches the distributed inventory IoT devices to airplane mode. When the administrator user receives the container from the custody of the shipping company, the administrator user switches the distributed inventory IoT devices from airplane mode to normal mode. Each device records this third-party custody in its inventory consensus database. Containers, and their payload that includes an authenticated natural resource, are usually stored in one of the market maker's warehouses. Each of these warehouses also have the IoT networking infrastructure (FIG. 14) to support data synchronization among containers and between containers and the central control system. This enables each container, which is a node in the distributed database, to update and validate its copy of the distributed inventory database based on achieving a consensus with all other database nodes within its communication reach. The distributed inventory IoT device uses its GPS tracking capability to track and report the location of each container.

Figure 18:
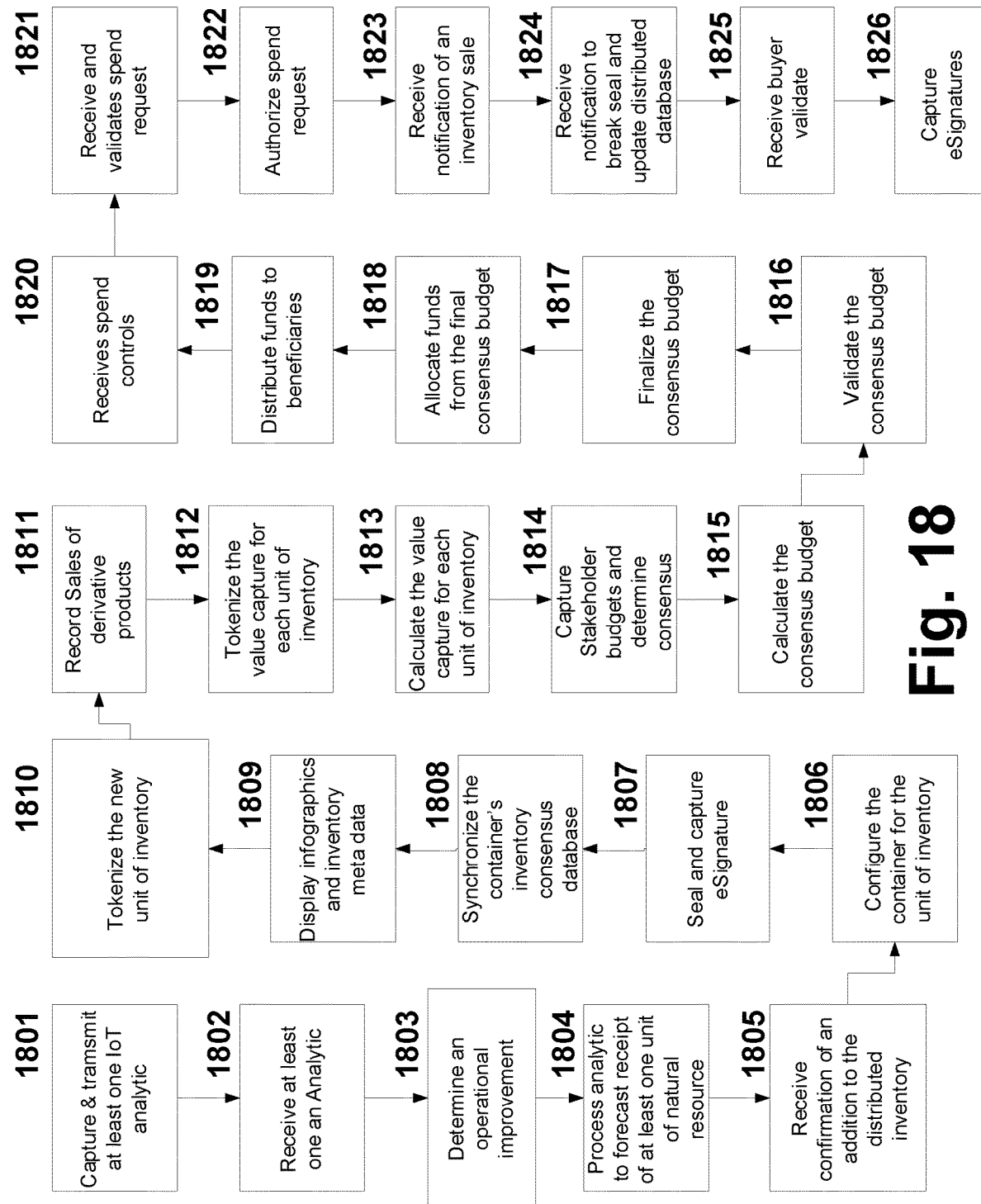
FIG. 18 illustrates a first embodiment of a preferred workflow for the present invention.

FIG. 18 illustrates a high level summary of the preferred embodiment of the present invention. At least one IoT device captures and transmits at least one IoT analytic to the internet of things system 1801. The internet of things system receives at least one IoT analytic from at least one IoT device 1802. The internet of things system processes at least one IoT analytic and determines an operational improvement 1803. The internet of things system also processes at least one IoT analytic to predict receipt of a shipment of at least one unit of natural resource 1804. The administrator user records the receipt of at least one unit of natural resource in the inventory management system and the addition of that at least one unit of natural resource to the distributed database 1805. The distributed inventory IoT device, stored in the container for the unit of natural resource, is configured as a node in the distributed database 1806. This includes configuring its RFID and its private and public encryption keys and entering meta data about the inventory, such as its quality and provenance journey. The inventory consensus computer 1705 captures the eSignature of the authorized agents in the inventory consensus database 1706 when the container is sealed 1807. Sealing the container triggers its inventory consensus computer 1705 to synchronize its inventory consensus database 1808. This includes searching for nearby nodes in the distributed inventory and exchanging data. The goal is for each node to have an accurate copy of all transactions for the distributed database. This includes additions to the inventory, sales from the inventory, derivative transactions collateralized by the inventory, movements of units of inventory and the current location of units of inventory. The inventory management system displays infographics of the inventory and meta data associated with each unit of inventory 1809. The inventory management system notifies the token system that a natural resource has been added to the distributed database. The token system tokenizes the new natural resource that represents a new unit of inventory 1810. The marketing system advertises derivative products and the payment processor system records sales of derivative products 1811. The token system tokenizes the value capture for each unit of inventory 1812. The inventory value stream mapping module calculates the value capture for each unit of inventory 1813. The smart contract system receives proposed budgets from stakeholders 1604, 1605, then determines a consensus 1814. The smart contract system then calculates the consensus budget 1815, then it applies the relevant business rules to validate the consensus budget 1816, then the smart contract system finalizes the consensus budget 1817. The smart contract system then allocates funds from the final consensus budget to beneficiaries 1818, then it distributes the funds to those beneficiaries 1819. The smart contract system receives the spend controls 1820, that governs eligible expenditures. It then receives and validates spend requests 1821. The smart contract system then authorizes all spend requests 1822 that comply with the spend controls and denies requests that are out of compliance. The inventory management system receives a notification of an inventory sale 1823. The inventory IoT device receives a notification to break the seal on the container and update its inventory consensus database 1824. The inventory management system receives a validation 1825 that inventory in the container meets the buyer's requirements. The inventory consensus computer 1705 captures the eSignature of the authorized agents in the inventory consensus database 1826. The inventory consensus computer 1705 then synchronizes its inventory consensus database with other nodes in the distributed inventory by exchanging data. This informs other nodes that the unit of natural resource that was just sold has been removed from the distributed inventory.

The present invention includes a number of novel features that combine to create a unique solution that is not taught by the prior art. Its authentication system in FIG. 13 and FIG. 13A, secures authentication information, including user authentication information, payment authentication information and provenance authentication information. This system allows a first user to use the public key of a second user in the process to encrypt a symmetric encryption key then use that symmetric key to encrypt the authentication information. It then decomposes this authentication information into subcomponents that are distributed randomly across a plurality of member computers and across database partitions within each single computer. The first user uses a biometric signature to initiate this process. The second user uses their biometric signature to initiate the process to recover the authentication information. The system recombines the subcomponents to recreate the encrypted version of the authentication information. It then uses the second user's private key to decrypt the symmetric key then uses the symmetric key to decrypt the authentication information. The second user's private key matches his public key. If the first user is the same person as the second user, the system can still use the first user's private and public key to transmit the symmetric key, see steps 1342 and 1341 in FIG. 13. Alternatively, since the first user and the second user are the same person, there is less need to transmit the symmetric key securely since the same user already has it. Consequently, steps 1342 and 1341 can be eliminated if the first user is the same person as the second user. This will be the case if a user wants to store a password, a blockchain address, provenance information or other critical information in this unique solution for warm storage, wherein that same user will recover the authentication information at a later date. If however, a user wants to transfer a password, a blockchain address or other critical information to a second user via warm storage then steps 1342 and 1341 will provide the additional security required to further reduce the threat of hacking. Note that in the case of cryptocurrencies, hot storage refers to relying on a third party, such as an exchange, to manage the blockchain address where the cryptocurrency is stored. Cold storage refers to storing the blockchain address offline, for example on a sheet of paper in a safe. However, if the user loses that sheet of paper, or a bad actor gains access to it, then the user can lose access to her cryptocurrency. Similarly, hot storage runs the risk of the exchange being hacked or a rogue employee compromising that user's account information. The warm storage solution taught by the present invention is triggered by at least one of the user's biometric signatures, so is less prone to physical loss than cold storage. Relative to the risk of losing a written crypto currency address, it is highly unlikely that any user will lose all of their biometric signatures if any. In addition, the authentication information is encrypted, decomposed into subcomponents then distributed randomly across a plurality of member computers or database partitions. This is a distributed solution compared with hot and cold storage options which are both centralized. This makes it far more resistant to hacking and employee carelessness, or dishonesty, than a centralize database managed by a token exchange for hot storage solutions or a centralized cold storage option. Also, the provenance information stored in a database node is more susceptible to fraud when it can be isolated from the network of database nodes. This will happen when an authenticated natural resource is being transported between secure locations on its journey from the mine to its current location. The risk of fraudulent changes to the provenance information can be almost eliminated by encrypting that information, decomposing it into subcomponents then distributing those subcomponents randomly among a plurality of database partitions within each single database node. This makes the present invention far more resilient to provenance fraud instigated by a bad actor or careless, or dishonest, employee. The Internet of things solution ("IoT") enables proactive management of the distributed inventory. The present invention receives inputs from IoT devices. It analyzes these inputs to project supply and demand. This enables the IoT system to recommend improvements to the supply channel. It also enables the IoT system to predict the location of future demand then make proactive decisions to transport inventory to the locations with the highest probable demand. The primary goal of IoT solutions in the prior art is to minimize inventory. The goal of the IoT system in the present invention is to maximize inventory but to distribute this inventory to the locations that maximize the life time value of each unit of inventory. The reason for this difference is that prior art solutions make money by selling their inventory. While the present invention primarily makes money by using its inventory as collateral for derivative products. Therefore, increasing the present invention's inventory will increase its revenue from inventory-based derivatives. The present invention's secondary revenue stream is selling units of inventory. In general, the location of the inventory does not impact the market maker's ability to monetize derivative products. Consequently, the IoT system takes into account a number of factors to determine the optimal location for each unit of inventory. One factor may be that an investor is willing to pay a premium for collateral that has a short lead time because it is already in a near-by location. Another factor may be that a buyer is willing to pay a premium to buy a unit of inventory that has a specific provenance signature that also has a short lead time because of its location. For example, a buyer may want to buy gold from a specific mine, or country, that has a specific provenance signature. If the market maker already has an authenticated natural resource in its distributed inventory that is in a nearby location and matches the requested provenance signature then the market maker can sell the existing unit of inventory in near real time but replenish its stock from the supplier when it is available. The market maker is monetizing its distributed inventory by selling derivatives but is simultaneously providing liquidity to facilitate sales. This is unique. Today, a buyer and seller would have to negotiate a contact; conduct due diligence; set up banking, insurance and custody arrangements; ship the product; validate the purity; adjust pricing, transfer funds then transfer custody. This typically takes months to complete. Conversely, the liquidity service provided by the present invention, enabled by the market maker monetizing derivatives products, allows the transaction to be completed in near real time. As the inventory grows, it is more likely that more diverse demands can be satisfied from that inventory in near real time. The ability to monetize inventory by using it as collateral for derivative products makes expansive, distributed inventory a profitable business model that increases in value as the size of the inventory increases. In turn, distributed inventory that can be monetized is a critical step away from centralized solutions taught by the prior art. This helps make decentralized autonomous solutions offered by decentralized autonomous organizations (DAO) more effective. When each unit of inventory is an authenticated natural resource, the average unit value can be very high relative to the cost of IoT tracking devices. This justifies the cost of encasing each unit of inventory in a container that includes an inventory IoT device and the miniature electronics that comprise a distributed database node. In this case, the distributed inventory is the distributed database. Each inventory IoT device enables the database node to transmit and receive meta data about the distributed inventory autonomously. This builds a consensus about the current status of the unit of inventory and its history. In turn, this improves the certainty of provenance information and minimizes the risk of a hacker changing, or corrupting, the database information since that hacker would have to hack a high percentage of distributed nodes to change the distributed consensus about the inventory's history and current status. That hacker would also have to hack multiple database partitions within each node in the distributed database. Also, physical theft would require the seal on a container to be broken but it is alarmed. Or, the container would have to be physically transported but it is tracked. If a bad actor tries to spoof the communication with an inventory IoT device within a container to try to disguise the fact that it is being tampered with, that bad actor would need to hack the container's private key which is very difficult to do. Also, all nodes in the vicinity of the target node are constantly exchanging information not only to update and validate their copy of the distributed database but also to perform a health check on each node that is within reach. This develops a distributed consensus of the health of each node in the distributed database. If a node is determined to have poor health then its certainty score could be reduced if the low health reflects a potential tampering risk. The present invention monitors and reports industry standard processor and database parameters that are indicative of normal or failing health. Examples include memory usage, response time, error rates and correct responses to predetermined challenge questions. When nodes are communicating with each other, they are constantly asking each other random predetermined questions and validating the answers. Whenever the seal of a container is broken for an authorized purpose, the biometric signatures of the authorized agents are captured in the distributed database and shared with other nodes. Monetizing derivative products that are collateralized by the distributed inventory is similar to monetizing a hotel room. Each day represents a unique revenue generating opportunity. A key metric is the percentage value capture. This is the actual revenue generated as a percentage of the maximum possible revenue that could have been generated. The value capture mapping system for the present invention has a unique and improved method of displaying projected inventory monetization as illustrated in FIG. 17. This helps optimize the distributed inventory by calculating the location that will maximize value capture for each unit of inventory. The present invention also enables a decentralized autonomous organization to create a budget from a projected value capture calculation. This budget is based on a consensus of inputs received from a distributed collection of stakeholders as illustrated in FIG. 16. The system validates the budget against organizational rules, policies, regulations and laws then allocates funds through a smart contract that enforces those controls. The system then enables users and bots to spend the funds only on predetermined items to prevent expenditures on items that are disallowed. This sequence of technological solutions to technical problems delivers a novel set of features that comprise a non-conventional and non-generic arrangement of steps for optimizing and monetizing the distributed inventory, calculating and optimizing the percentage value capture for each unit of that inventory, then controlling the spend of the projected value capture whereby the present invention only authorizes expenditures that comply with distributed, consensus spending budgets, allocations and applicable rules.

The present invention's applicability extends beyond authenticated natural resources. For example, fine art and other objects whose value is tied to authenticity can also be housed and transported in similar containers to that taught by the present invention.

The present invention has a plurality of potential revenue streams including future sales of inventory; sales of derivative products collateralized by the distributed inventory including insurance products; sales of IoT information and sales of information about the distributed inventory and its supply and demand. The present invention also generates revenues from subscription fees, licensing fees, advertising, and the sale of trend information generated by the business intelligence system. Payments can be made using a plurality of methods including credit cards, debit cards, electronic funds transfer, digital cash, cash, crypto currencies, checks and barter. In addition, a plurality of options exist for the timing of payments. It will be evident to one skilled in the art that one or more of the steps in the preferred procedure can be eliminated in specific situations without affecting the usefulness of the present invention.

Anyone skilled in the art will also recognize that the method and apparatus of the present invention has many applications and advantages, and that the present invention is not limited to the representative examples and variations disclosed herein. In addition, the scope of the present invention covers conventional variations and modifications, to the components of the present invention, which are known to those who are skilled in the art.

I claim:

1. A computer implemented method for tokenizing natural resources using a secure communication environment, said method comprising:
   predicting, in the secure communication environment, the receipt of a first authenticated natural resource, including an authenticated provenance, based on a first analytic associated with a first device;
   predicting, in the secure communication environment, a preferred location for said first authenticated natural resource within a distributed inventory based on a second analytic associated with a second device;
   calculating an optimal route plan to transport said first authenticated natural resource to said preferred location, to provide liquidity to facilitate sales;
   receiving, in the secure communication environment, a notification that said first authenticated natural resource has been added to said distributed inventory and said first authenticated natural resource has also been associated with a first node in a distributed database;
   storing, in said first node, a plurality of meta data about said first authenticated natural resource;
   exchanging a subset of said plurality of meta data between said first node and a second node in said distributed database to attain a consensus about the history of said distributed inventory; and
   creating a first cryptographic token based on a value of said first authenticated natural resource, where a plurality of decentralized autonomous insurance solutions and finance solutions are based on said first cryptographic token, including at least one of a derivative product, a lease product, a debt token and a token swap,
   where the secure communication environment is generated by downloading a CCS application to a plurality of user computers, from a central control system (CCS) that includes at least one processor and memory configured to store computer program code instructions, the CCS application generating secure authentication messages between the users and the CCS, and the secure authentication messages implementing authentication with encryption that perform the steps of:
      storing securely, on a sender's computer, a plurality of authentication and authorization information, based on using at least one of a cryptographic public encryption key and a cryptographic symmetric encryption key in a process that encrypts a secure authentication message;
      decomposing, by the CCS application running on the sender's computer, an encrypted version of said secure authentication message into a block of linked and ordered subcomponents that are stored randomly across a first plurality of member computers that are selected from a predetermined list of participating computers, a final subcomponent in the link of subcomponents flagged as a last subcomponent;
      randomly selecting, by the CSS application running on the sender's computer, three member computers on which to copy a first subcomponent of the secure authentication message;
      randomly selecting, by each of the three computers which have a copy of the first subcomponent of the secure authentication message, a member computer for which to copy a second subcomponent of the secure authentication message, and repeating the process of randomly selecting a member computer to copy the next ordered subcomponent of the secure authentication message by the computer that copied the ordered subcomponent that immediately precedes the next ordered subcomponent, until the final subcomponent of the block which is flagged as the last subcomponent has been copied, which generates three copies of blocks of linked and ordered subcomponents of the secure authentication message, where each computer which stores a copy of a subcomponent knows only of the computer which was randomly selected by that computer;
      periodically, by the computer storing a newest copy of the first subcomponent of the secure authentication message, randomly selecting a member computer for which to copy the first subcomponent of the secure authentication message and generating a new block of linked and ordered subcomponents of the secure authentication message;

deleting an oldest block of linked and ordered subcomponents of the secure authentication message after generating the new block of linked and ordered subcomponents of the secure authentication message;

recombining, on a receiver's computer, the encrypted version of the secure authentication message from the new block of linked and ordered subcomponents of the secure authentication message after verifying, by the receiver's computer, a unique authorization identifier transmitted by the sender's computer; and recovering said secure authentication message, based on using at least one of a cryptographic private encryption key and said cryptographic symmetric encryption key in a process that decrypts said encrypted version of said secure authentication message, where said cryptographic private encryption key matches said cryptographic public encryption key.

2. The method according to claim 1, where:

said first analytic includes a plurality of supply chain data that includes at least one of a received date, a received location, a quality value and a provenance signature of said first authenticated natural resource; and said second analytic includes a plurality of market demand data, about an area served by a first warehouse, for a unit of inventory that has a specific provenance signature.

3. The method according to claim 1, where the plurality of meta data about said first authenticated natural resource includes at least one of a quality value, a market value, an authenticated provenance signature, a location history, a plurality of authentication information and at least one electronic signature from a trusted authority.

4. The method according to claim 1, where:

said first node in said distributed database includes a plurality of components including at least one of an internet of things device, an internet of things computer, an internet of things database, an internet of things networking infrastructure that supports data synchronization among nodes, a GPS tracking unit, a RF transmitter, a radio frequency identity tag and a power unit; and said first node in said distributed database exchanges said subset of said plurality of meta data with said second node when said first node and said second node are within radio frequency communication range of each other.

5. The method according to claim 1, where said first authenticated natural resource is monetized, including while in transit, and said optimal route plan includes off peak segments that reduce a transportation and storage cost for said first authenticated natural resource.

6. The method according to claim 1, where:

said token swap enables an investor to pay an insurance premium for a right to swap a third-party token for a stable coin within a predetermined time period; and said derivative product includes a tokenization of a projected value derived from said distributed inventory and a subsequent use of a derivative token as collateral for at least one of an insurance product and a financial product.

7. The method according to claim 1, where a predetermined percentage of nodes agree on a historical set of meta data then follow a predetermined consensus rule to pick a node to write a transaction to a blockchain, where said node's participation in said consensus rule is based on a value of a natural resource, whereby said natural resource is used as a proof of stake in said consensus rule.

8. A system for tokenizing natural resources, using a secure communication environment, said system comprising:

at least one memory configured to store computer program code instructions; and at least one processor configured to execute said computer program code instructions to:

predict, in the secure communication environment, the receipt of a first authenticated natural resource, including an authenticated provenance, based on a first analytic associated with a first device;

predict, in the secure communication environment, a preferred location for said first authenticated natural resource within a distributed inventory based on a second analytic associated with a second device;

calculate an optimal route plan to transport said first authenticated natural resource to said preferred location, to provide liquidity to facilitate sales;

receive, in the secure communication environment, a notification that said first authenticated natural resource has been added to said distributed inventory and said first authenticated natural resource has also been associated with a first node in a distributed database;

store, in said first node, a plurality of meta data about said first authenticated natural resource;

exchange a subset of said plurality of meta data between said first node and a second node in said distributed database to attain a consensus about the history of said distributed inventory; and create a first cryptographic token based on a value of said first authenticated natural resource, where a plurality of decentralized autonomous insurance solutions and finance solutions are based on said first cryptographic token, including at least one of a derivative product, a lease product, a debt token and a token swap, where the secure communication environment is generated by downloading a CCS application to a plurality of user computers, from a central control system (CCS) that includes at least one processor and memory configured to store computer program code instructions, the CCS application generates secure authentication messages between the users and the CCS, and the secure authentication messages implement authentication with encryption that:

store securely, on a sender's computer, a plurality of authentication and authorization information, based on a use of at least one of a cryptographic public encryption key and a cryptographic symmetric encryption key in a process that encrypts a secure authentication message;

decompose, by the CCS application running on the sender's computer, an encrypted version of said secure authentication message into a block of linked and ordered subcomponents that are stored randomly across a first plurality of member computers that are selected from a predetermined list of participating computers, a final subcomponent in the link of subcomponents flagged as a last subcomponent;

randomly select, by the CSS application running on the sender's computer, three member computers on which to copy a first subcomponent of the secure authentication message;

randomly select, by each of the three computers which have a copy of the first subcomponent of the secure authentication message, a member computer for which to copy a second subcomponent of the secure authentication message, and repeat the process that randomly selects a member computer to copy the next ordered subcomponent of the secure authentication message by the computer that copied the ordered subcomponent that immediately precedes the next ordered subcomponent, until the final subcomponent of the block which is flagged as the last subcomponent has been copied, which generates three copies of blocks of linked and ordered subcomponents of the secure authentication message, where each computer which stores a copy of a subcomponent knows only of the computer which was randomly selected by that computer;

periodically, by the computer that stores a newest copy of the first subcomponent of the secure authentication message, select randomly a member computer for which to copy the first subcomponent of the secure authentication message and generate a new block of linked and ordered subcomponents of the secure authentication message;

delete an oldest block of linked and ordered subcomponents of the secure authentication message after the generation of the new block of linked and ordered subcomponents of the secure authentication message;

recombine, on a receiver's computer, the encrypted version of the secure authentication message from the new block of linked and ordered subcomponents of the secure authentication message after a verification, by the receiver's computer, of a unique authorization identifier transmitted by the sender's computer; and recover said secure authentication message, based on the use of at least one of a cryptographic private encryption key and said cryptographic symmetric encryption key in a process that decrypts said encrypted version of said secure authentication message, where said cryptographic private encryption key matches said cryptographic public encryption key.

9. The system according to claim 8, where:
said first analytic includes a plurality of supply chain data that includes at least one of a received date, a received location, a quality value and a provenance signature of said first authenticated natural resource; and
said second analytic includes a plurality of market demand data, about an area served by a first warehouse, for a unit of inventory that has a specific provenance signature.

10. The system according to claim 8, where the plurality of meta data about said first authenticated natural resource includes at least one of a quality value, a market value, an authenticated provenance signature, a location history, a plurality of authentication information and at least one electronic signature from a trusted authority.

11. The system according to claim 8, where:
said first node in said distributed database includes a plurality of components including at least one of an internet of things device, an internet of things computer, an internet of things database, an internet of things networking infrastructure that supports data synchronization among nodes, a GPS tracking unit, a RF transmitter, a radio frequency identity tag and a power unit; and
said first node in said distributed database exchanges said subset of said plurality of meta data with said second node when said first node and said second node are within radio frequency communication range of each other.

12. The system according to claim 8, where said first authenticated natural resource is monetized, including while in transit, and said optimal route plan includes off peak segments that reduce a transportation and storage cost for said first authenticated natural resource.

13. The system according to claim 8, where:
said token swap enables an investor to pay an insurance premium for a right to swap a third-party token for a stable coin within a predetermined time period; and
said derivative product includes a tokenization of a projected value derived from said distributed inventory and a subsequent use of a derivative token as collateral for at least one of an insurance product and a financial product.

14. The system according to claim 8, where a predetermined percentage of nodes agree on a historical set of meta data then follow a predetermined consensus rule to pick a node to write a transaction to a blockchain, where said node's participation in said consensus rule is based on a value of a natural resource, whereby said natural resource is used as a proof of stake in said consensus rule.

15. A non-transitory computer storage medium storing computer-executable instructions that, when executed, cause a processor to perform a computer-implemented operation for tokenizing natural resources, using a secure communication environment, the operation comprising:

predicting, in the secure communication environment, the receipt of a first authenticated natural resource, including an authenticated provenance, based on a first analytic associated with a first device;

predicting, in the secure communication environment, a preferred location for said first authenticated natural resource within a distributed inventory based on a second analytic associated with a second device;

calculating an optimal route plan to transport said first authenticated natural resource to said preferred location, to provide liquidity to facilitate sales;

receiving, in the secure communication environment, a notification that said first authenticated natural resource has been added to said distributed inventory and said first authenticated natural resource has also been associated with a first node in a distributed database;

storing, in said first node, a plurality of meta data about said first authenticated natural resource;

exchanging a subset of said plurality of meta data between said first node and a second node in said distributed database to attain a consensus about the history of said distributed inventory; and creating a first cryptographic token based on a value of said first authenticated natural resource, where a plurality of decentralized autonomous insurance solutions and finance solutions are based on said first cryptographic token, including at least one of a derivative product, a lease product, a debt token and a token swap, where the secure communication environment is generated by downloading a CCS application to a plurality of user computers, from a central control system (CCS) that includes at least one processor and memory configured to store computer program code instructions, the CCS application generating secure authentication messages between the users and the CCS, and the secure authentication messages implementing authentication with encryption that perform the steps of:

storing securely, on a sender's computer, a plurality of authentication and authorization information, based on using at least one of a cryptographic public encryption key and a cryptographic symmetric encryption key in a process that encrypts a secure authentication message;

decomposing, by the CCS application running on the sender's computer, an encrypted version of said secure authentication message into a block of linked and ordered subcomponents that are stored randomly across a first plurality of member computers that are selected from a predetermined list of participating computers, a final subcomponent in the link of subcomponents flagged as a last subcomponent;

randomly selecting, by the CSS application running on the sender's computer, three member computers on which to copy a first subcomponent of the secure authentication message;

randomly selecting, by each of the three computers which have a copy of the first subcomponent of the secure authentication message, a member computer for which to copy a second subcomponent of the secure authentication message, and repeating the process of randomly selecting a member computer to copy the next ordered subcomponent of the secure authentication message by the computer that copied the ordered subcomponent that immediately precedes the next ordered subcomponent, until the final subcomponent of the block which is flagged as the last subcomponent has been copied, which generates three copies of blocks of linked and ordered subcomponents of the secure authentication message, where each computer which stores a copy of a subcomponent knows only of the computer which was randomly selected by that computer;

periodically, by the computer storing a newest copy of the first subcomponent of the secure authentication message, randomly selecting a member computer for which to copy the first subcomponent of the secure authentication message and generating a new block of linked and ordered subcomponents of the secure authentication message;

deleting an oldest block of linked and ordered subcomponents of the secure authentication message after generating the new block of linked and ordered subcomponents of the secure authentication message;

recombining, on a receiver's computer, the encrypted version of the secure authentication message from the new block of linked and ordered subcomponents of the secure authentication message after verifying, by the receiver's computer, a unique authorization identifier transmitted by the sender's computer; and recovering said secure authentication message, based on using at least one of a cryptographic private encryption key and said cryptographic symmetric encryption key in a process that decrypts said encrypted version of said secure authentication message, where said cryptographic private encryption key matches said cryptographic public encryption key.

16. The non-transitory computer storage medium of claim 15, where:
said first analytic includes a plurality of supply chain data that includes at least one of a received date, a received location, a quality value and a provenance signature of said first authenticated natural resource; and
said second analytic includes a plurality of market demand data, about an area served by a first warehouse, for a unit of inventory that has a specific provenance signature.

17. The non-transitory computer storage medium of claim 15, where the plurality of meta data about said first authenticated natural resource includes at least one of a quality value, a market value, an authenticated provenance signature, a location history, a plurality of authentication information and at least one electronic signature from a trusted authority.

18. The non-transitory computer storage medium of claim 15, where:
said first node in said distributed database includes a plurality of components including at least one of an internet of things device, an internet of things computer, an internet of things database, an internet of things networking infrastructure that supports data synchronization among nodes, a GPS tracking unit, a RF transmitter, a radio frequency identity tag and a power unit;
said first node in said distributed database exchanges said subset of said plurality of meta data with said second node when said first node and said second node are within radio frequency communication range of each other; and
said first authenticated natural resource is monetized, including while in transit, and said optimal route plan includes off peak segments that reduce a transportation and storage cost for said first authenticated natural resource.

19. The non-transitory computer storage medium of claim 15, where:
said token swap enables an investor to pay an insurance premium for a right to swap a third-party token for a stable coin within a predetermined time period; and
said derivative product includes a tokenization of a projected value derived from said distributed inventory and a subsequent use of a derivative token as collateral for at least one of an insurance product and a financial product.

20. The non-transitory computer storage medium of claim 15, where a predetermined percentage of nodes agree on a historical set of meta data then follow a predetermined consensus rule to pick a node to write a transaction to a blockchain, where said node's participation in said consensus rule is based on a value of a natural resource, whereby said natural resource is used as a proof of stake in said consensus rule.

* * * * *